(12) United States Patent
Simek et al.

(10) Patent No.: US 10,848,731 B2
(45) Date of Patent: Nov. 24, 2020

(54) CAPTURING AND ALIGNING PANORAMIC IMAGE AND DEPTH DATA

(71) Applicant: Matterport, Inc., Sunnyvale, CA (US)

(72) Inventors: Kyle Simek, San Jose, CA (US); David Gausebeck, Mountain View, CA (US); Matthew Tschudy Bell, Palo Alto, CA (US)

(73) Assignee: Matterport, Inc., Sunnyvale, CA (US)

( * ) Notice: Subject to any disclaimer, the term of this patent is extended or adjusted under 35 U.S.C. 154(b) by 415 days.

(21) Appl. No.: 15/417,162

(22) Filed: Jan. 26, 2017

(65) Prior Publication Data

US 2018/0139431 A1    May 17, 2018

Related U.S. Application Data

(60) Continuation-in-part of application No. 14/070,426, filed on Nov. 1, 2013, which is a division of
(Continued)

(51) Int. Cl.
*H04N 13/106* (2018.01)
*H04N 5/265* (2006.01)
(Continued)

(52) U.S. Cl.
CPC ......... *H04N 13/106* (2018.05); *H04N 5/2258* (2013.01); *H04N 5/265* (2013.01);
(Continued)

(58) Field of Classification Search
CPC .... H04N 13/106; H04N 5/2258; H04N 5/265; H04N 5/23238; G06T 2207/20221
(Continued)

(56) References Cited

U.S. PATENT DOCUMENTS

| | | |
|---|---|---|
| 6,396,496 B1 | 5/2002 | Pfister et al. |
| 7,054,478 B2 | 5/2006 | Harman |

(Continued)

FOREIGN PATENT DOCUMENTS

WO    2007/102663 A1    9/2007

OTHER PUBLICATIONS

Xiong, Yingen. Eliminating Ghosting Artifacts for Panoramic Images, 2009 11th IEEE International Symposium on Multimedia; Jan. 2009.*

(Continued)

*Primary Examiner* — Sath V Perungavoor
*Assistant Examiner* — Kristin Dobbs
(74) *Attorney, Agent, or Firm* — Ahmann Kloke LLP

(57) ABSTRACT

This application generally relates to capturing and aligning panoramic image and depth data. In one embodiment, a device is provided that comprises a housing and a plurality of cameras configured to capture two-dimensional images, wherein the cameras are arranged at different positions on the housing and have different azimuth orientations relative to a center point such that the cameras have a collective field-of-view spanning up to 360° horizontally. The device further comprises a plurality of depth detection components configured to capture depth data, wherein the depth detection components are arranged at different positions on the housing and have different azimuth orientations relative to the center point such that the depth detection components have the collective field-of-view spanning up to 360° horizontally.

35 Claims, 27 Drawing Sheets

Related U.S. Application Data application No. 13/776,688, filed on Feb. 25, 2013, now Pat. No. 9,324,190.

(60) Provisional application No. 61/603,221, filed on Feb. 24, 2012.

(51) Int. Cl.

| | | |
|---|---|---|
| *H04N 5/225* | (2006.01) | |
| *H04N 13/254* | (2018.01) | |
| *H04N 13/239* | (2018.01) | |
| *H04N 13/232* | (2018.01) | |
| *H04N 13/271* | (2018.01) | |
| *H04N 5/232* | (2006.01) | |

(52) U.S. Cl.
CPC ......... *H04N 13/232* (2018.05); *H04N 13/239* (2018.05); *H04N 13/254* (2018.05); *H04N 13/271* (2018.05); *G06T 2207/20221* (2013.01); *H04N 5/23238* (2013.01)

(58) Field of Classification Search
USPC .......................................................... 348/46
See application file for complete search history.

(56) References Cited

U.S. PATENT DOCUMENTS

| | | | |
|---|---|---|---|
| 7,697,749 | B2 | 4/2010 | Ogawa |
| 8,957,919 | B2 | 2/2015 | Han et al. |
| 8,973,029 | B2 | 3/2015 | Deshpande et al. |
| 9,001,227 | B2 | 4/2015 | Aleksic et al. |
| 9,609,307 | B1 | 3/2017 | Lopez |
| 10,154,244 | B2 | 12/2018 | Peterson |
| 2003/0227615 | A1 | 12/2003 | Montgomery et al. |
| 2003/0231788 | A1 | 12/2003 | Yukhin et al. |
| 2004/0023612 | A1 | 2/2004 | Kriesel |
| 2005/0257748 | A1 | 11/2005 | Kriesel et al. |
| 2006/0244746 | A1* | 11/2006 | England .................. G06T 11/60 345/419 |
| 2008/0170123 | A1 | 7/2008 | Albertson et al. |
| 2008/0310757 | A1* | 12/2008 | Wolberg ............ G06K 9/00208 382/285 |
| 2010/0097444 | A1* | 4/2010 | Lablans ................. G03B 35/00 348/46 |
| 2010/0194860 | A1 | 8/2010 | Mentz et al. |
| 2011/0018973 | A1 | 1/2011 | Takayama |
| 2011/0102763 | A1 | 5/2011 | Brown et al. |
| 2011/0157696 | A1 | 6/2011 | Bennett et al. |
| 2011/0211042 | A1 | 9/2011 | Thorpe et al. |
| 2012/0105574 | A1* | 5/2012 | Baker .................... G03B 35/08 348/36 |
| 2012/0162366 | A1 | 6/2012 | Ninan et al. |
| 2012/0185094 | A1 | 7/2012 | Rosenstein et al. |
| 2012/0223937 | A1 | 9/2012 | Bendall |
| 2013/0063550 | A1 | 3/2013 | Ritchey et al. |
| 2015/0288877 | A1 | 10/2015 | Glazer |
| 2016/0005179 | A1 | 1/2016 | Petyushko et al. |
| 2016/0249039 | A1 | 8/2016 | Tran et al. |
| 2016/0291136 | A1 | 10/2016 | Lindskog et al. |
| 2018/0144555 | A1 | 5/2018 | Ford |

OTHER PUBLICATIONS

Final Office Action received for U.S. Appl. No. 14/070,426 dated Sep. 13, 2018, 52 pages.
International Search Report and Written Opinion received for International Patent Application Serial No. PCT/US2018/015330 dated Apr. 19, 2018, 11 pages.
Office Action for U.S. Appl. No. 13/776,688, dated May 29, 2015, 102 pages.
Non-Final Office Action for U.S. Appl. No. 14/070,426, dated Dec. 17, 2015, 38 pages.
Notice of Allowance for U.S. Appl. No. 13/776,688, dated Dec. 18, 2015, 28 pages.
Non-Final Office Action for U.S. Appl. No. 14/070,430, dated Jan. 21, 2016, 17 pages.
Non-Final Office Action for U.S. Appl. No. 14/070,429, dated Jan. 26, 2016, 53 pages.
Non-Final Office Action for U.S. Appl. No. 14/070,427, dated Feb. 11, 2016, 42 pages.
Non-Final Office Action for U.S. Appl. No. 14/070,428, dated Feb. 11, 2016, 44 pages.
Final Office Action for U.S. Appl. No. 14/070,426, dated Jun. 30, 2016, 38 pages.
Final Office Action for U.S. Appl. No. 14/070,427, dated Aug. 11, 2016, 40 pages.
Final Office Action for U.S. Appl. No. 14/070,428, dated Sep. 9, 2016, 41 pages.
Final Office Action for U.S. Appl. No. 14/070,429, dated Sep. 8, 2016, 52 pages.
Non-Final Office Action for U.S. Appl. No. 14/070,426, dated Oct. 11, 2016, 45 pages.
Non-Final Office Action for U.S. Appl. No. 14/070,427, dated Nov. 10, 2016, 43 pages.
Final Office Action for U.S. Appl. No. 14/070,430, dated Oct. 20, 2016, 45 pages.
Davidson, Andrew et al. MonoSLAM: Real-Time Single Camera SLAM. IEEE Transactions on Pattern Analysis and Machine Intelligence. Jun. 2007, vol. 29, IEEE Computer Society.
Yeh, Raymond et al. Semantic Image Inpainting With Perceptual and Contextual Losses. Dept. of Electrical and Computer Engineering University of Illinois at Urbana-Champaign. 2016.
Szeliski, Rick et al. A Comparative Study of Energy Minimization Methods for Markov Random Fields with Smoothness-Based Priors. IEEE Transactions on Pattern Analysis and Machine Intelligence. Jun. 2008, pp. 1068-1080 vol. 30, Issue 6. IEEE.
Birchfield, Stan et al. Depth Discontinuities by Pixel-To-Pixel Stereo. International Journal of Computer Vision. Dec. 1999. vol. 35, Issue 3 pp. 269-293.
Hirschmuller, Heiko. Accurate and Efficient Stereo Processing by Semi-Global Matching and Mutual Information. IEEE Computer Society Conference on Computer Vision and Pattern Recognition. 2005. vol. 2. pp. 807-814. IEEE Computer Society Washington, D.C.
Zabih, Ramin. et al Non-Parametric Local Transforms for Computing Visual Correspondence. European Conference on Computer Vision. 1994. vol. 3, pp. 151-158. Springier-Verlag New York, Inc., Secaucus, NJ, USA.
Hsoni Asmaa et al. Secrets of Adaptive Support Weight Techniques for Local Stereo Matching. Digital Representations of the Real World: How to Capture, Model, and Render Visual Reality. Computer Vision and Image Understanding. 2013. vol. 117, pp. 620-632. Elsevier Science Inc. New York, NY, USA.
Kolmogorov, V et al. Computing Visual Correspondence with Occlusion Using Graph Cuts. 3D-TV System with Depth-Image-Based Rendering Architectures, Techniques and Challenges. Computer Vision. 2001. ICCV, IEEE.
Sun, Jian Stereo Matching Using Belief Propogation. IEEE Transactions on Pattern Analysis and Machine Intelligence. 2003, vol. 25. Issue 7. pp. 787-800. IEEE Computer Society Washington, D.C. USA.
Non-Final Office Action for U.S. Appl. No. 14/070,428, dated Jan. 12, 2017, 35 pages.
Non-Final Office Action for U.S. Appl. No. 14/070,429, dated Jan. 12, 2017 43 pages.
Final Office Action for U.S. Appl. No. 14/070,426, dated May 4, 2017, 78 pages.
Non-Final Office Action for U.S. Appl. No. 14/070,430, dated Jun. 15, 2017, 48 pages.
Non-Final Office Action for U.S. Appl. No. 14/070,426, dated Jan. 18, 2018, 50 pages.
Final Office Action for U.S. Appl. No. 14/070,427, dated May 18, 2017, 55 pages.
Final Office Action for U.S. Appl. No. 14/070,428, dated Sep. 5, 2017, 68 pages.

(56) References Cited

OTHER PUBLICATIONS

Final Office Action for U.S. Appl. No. 14/070,429, dated Aug. 31, 2017, 77 pages.
Final Office Action for U.S. Appl. No. 14/070,430, dated Dec. 28, 2017, 58 pages.
Notice of Allowance for U.S. Appl. No. 14/070,426 dated Jul. 11, 2019, 24 pages.
Notice of Allowance for U.S. Appl. No. 14/070,427 dated Sep. 5, 2019, 20 pages.
Notice of Allowance for U.S. Appl. No. 14/070,428 dated Sep. 5, 2019, 19 pages.
Notice of Allowance for U.S. Appl. No. 14/070,429 dated Sep. 4, 2019, 20 pages.
International Search Report and Written Opinion for International Patent Application Serial No. PCT/US2019/053040 dated Jan. 6, 2020, 7 pages.
Lin, Guo-Shiang et al., "2D to 3D Image Conversion Based on Classification of Background Depth Profiles," Proceedings of the 5th Pacific Rim Symposium on Advances in Image and Video Technology (PSIVT 2011), Part II, pp. 381-392, Nov. 2011.
Peng, Lim Wen et al., "3D Object Reconstruction and Representation Using Neural Networks," Proceedings of the 2nd International Conference on Computer Graphics and Interactive Techniques in Australasia and South East Asia (Graphite '04) pp. 139-147, Jun. 2004.
Notice of Allowance for U.S. Appl. No. 14/070,430, dated Oct. 5, 2020, 10 pages.
Non-Final Office Action for U.S. Appl. No. 16/141,558 dated Sep. 25, 31 pages.

\* cited by examiner

CAPTURING AND ALIGNING PANORAMIC IMAGE AND DEPTH DATA

RELATED APPLICATIONS

This application is a continuation-in-part of U.S. patent application Ser. No. 14/070,426, filed on Nov. 1, 2013 and entitled, "CAPTURING AND ALIGNING THREE-DIMENSIONAL SCENES," which is a divisional of U.S. patent application Ser. No. 13/776,688, filed on Feb. 25, 2013 and entitled, "CAPTURING AND ALIGNING THREE-DIMENSIONAL SCENES," which claims the priority benefit of U.S. provisional patent application No. 61/603,221, filed on Feb. 24, 2012 and entitled "CAPTURING AND ALIGNING THREE-DIMENSIONAL SCENES." The entireties of the aforementioned applications are incorporated by reference herein.

TECHNICAL FIELD

This application generally relates to capturing and aligning panoramic image and depth data.

BACKGROUND

Interactive, first-person 3D immersive environments are becoming increasingly popular. In these environments, a user is able to navigate through a virtual space. Examples of these environments include first person video games and tools for visualizing 3D models of terrain. Aerial navigation tools allow users to virtually explore urban areas in three dimensions from an aerial point of view. Panoramic navigation tools (e.g. street views) allow users to view multiple 360-degree panoramas of an environment and to navigate between these multiple panoramas with a visually blended interpolation.

Such interactive 3D immersive environments can be generated from real-world environments based on photorealistic panoramic two-dimensional (2D) images captured from the environment with 3D depth information for the respective 2D images. While methods for capturing 3D spatial data for 2D imagery have existed for over a decade, such methods are traditionally expensive and require complex hardware. In addition, current alignment software remains limited in its capabilities and ease of use. For example, existing alignment methods, such as the Iterative Closest Point algorithm (ICP), require users to manually input an initial rough alignment. Such manual input typically exceeds the capabilities of most non-technical users and inhibits real-time alignment of captured imagery. Accordingly, techniques for capturing 2D images associated with 3D data using affordable, user friendly devices and for accurately and efficiently aligning the 2D images to generate immersive 3D environments are in high demand.

DETAILED DESCRIPTION

Figure 1:
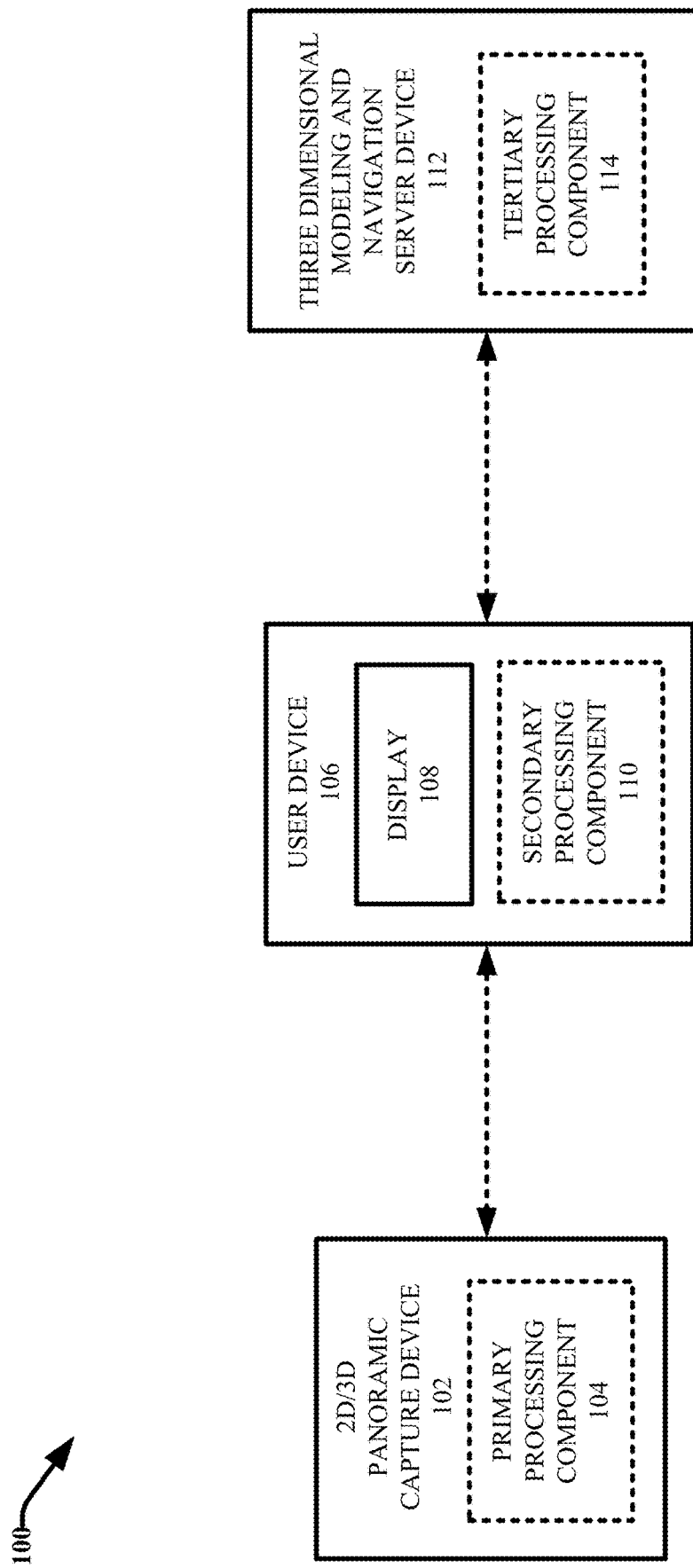
FIG. 1 presents an example system for capturing and aligning panoramic image and depth data in accordance with various aspects and embodiments described herein.

By way of introduction, the subject disclosure is directed to systems, methods, apparatuses and computer readable media that facilitate capturing and aligning panoramic image and depth data. A variety of different types of capture devices and capture device assemblies are provided with different camera and depth sensor configurations capable of generating panoramic (e.g. up to 360°) image data and panoramic depth data for creating immersive visual user experiences. In various embodiments, a 2D/3D panoramic capture device is provided that incorporates multiple cameras and depth sensors whose collective fields-of-view span up to a 360° horizontal field-of-view, allowing an entire panoramic image to be captured simultaneously and merged into a single panoramic image or video frame. In other embodiments, capture device assemblies are described that incorporate one or more color cameras and/or 3D sensors attached to a rotating stage. During rotation, multiple images and depth readings are captured which can be merged into a single panoramic 2D or 3D image. In some implementations, by rotating the stage, images with mutually overlapping fields-of-view but different viewpoints are obtained and 3D information is derived from them using stereo algorithms. Hardware can further be provided with the capture device assembly to capture additional depth data in regions where passive stereo traditionally fails. This additional depth data can be employed to assist the stereo matching algorithm to achieve better quality 3D estimates. The capture devices and capture device assemblies described herein are capable of capturing panoramic color photographs as well as more advanced panoramic data such as but not limited to: panoramic color video, panoramic 3D depth images, and panoramic 3D depth video. Also, multiple panoramic images and/or video clips captured at different nearby locations may be combined to create a global immersive 3D space model.

In one embodiment, a device is provided that comprises a housing and a plurality of cameras configured to capture 2D images, wherein the cameras are arranged at different positions on the housing and have different azimuth orientations relative to a center point such that the cameras have a collective field-of-view spanning up to 360° horizontally. The device further comprises a plurality of depth detection components configured to capture depth data, wherein the depth detection components are arranged at different positions on the housing and have different azimuth orientations relative to the center point such that the depth detection components have the collective field-of-view spanning up to 360° horizontally. In some implementations, the device can further include a memory that stores executable components and a processor that executes the executable components stored in the memory, wherein the executable components comprise a stitching component configured to generate a panoramic 2D or 3D image based on the 2D images and/or the depth data.

In another embodiment, a method is provided that includes capturing, by a capture device, two or more 2D images of an environment from a fixed location of the capture device using two or more cameras of the capture device having a combined field-of-view spanning up to 360° of the environment from the fixed location, and capturing, by the capture device, two or more sets of depth data of the environment from the fixed location of the capture device using two or more depth sensor devices of the capture device having the combined field-of-view spanning up to 360° of the environment. In one implementation, the method can further include aligning, by the capture device, the two or more 2D images based on the two or more sets of depth data and/or the cameras' relative position, and generating, by the device, a panoramic image of the environment based on the aligning. In another embodiment, the method can include sending, by the capture device, the two or more 2D images and the two or more set of depth data to an external device, wherein the external device is configured to align the two or more 2D images based on the two or more sets of depth data to generate a panoramic image of the environment. For example, the external device can employ the depth data to fix parallax issues when stitching the 2D images together.

In another embodiment, a method is provided that includes receiving, by a device comprising a processor, 2D image frames of an environment captured from a fixed location by a capture device over a defined period of time at a defined frame using two or more cameras of the capture device having a combined field-of-view spanning up to 360° of the environment from the fixed location. The method further comprises receiving, by the device, two or more sets of depth data of the environment captured from the fixed location by the capture device using two or more depth sensor devices of the capture devices having the combined field-of-view spanning up to 360° of the environment. In one or more implementations, the method further includes generating, by the device, a 2D panoramic image of the environment, comprising: aggregating overlapping image data included in the 2D image frames to generate aggregated 2D images, removing an object appearing in a portion of the aggregated 2D images, aligning the aggregated 2D images based on the two or more sets of depth data and/or the relative position of the cameras, and combining the aggregated 2D images based on the aligning. For example, the external device can be employed the depth data to fix parallax issues when stitching the 2D images together.

In another embodiment, a method is provided that includes capturing, by a capture device, images of an environment using one or more cameras of the capture device from different azimuth orientations of the one or more cameras relative to a center point in association with rotation of the capture device about a vertical axis that extends through the center point, wherein the images have a field-of-view spanning up to 360° horizontally. The method further includes capturing, by the capture device, sets of depth data of the environment using one or more depth sensors devices of the capture device and from different azimuth orientations of the one or more depth sensor devices relative to the center point in association with rotation of the capture device about the vertical axis, wherein the sets of depth data have the field-of-view spanning up to 360° horizontally, and facilitating, by the capture device, generation of a 2D panoramic image and a 3D panoramic depth map of the environment based on the images and the sets of depth data.

In another embodiment, a method is provided that includes receiving, by a device comprising a processor, images captured of an environment using one or more cameras of a capture device from different azimuth orientations of the one or more cameras relative to a center point in association with rotation of the capture device about a vertical axis that extends through the center point, wherein the images have a field-of-view spanning up to 360° horizontally and pairs of the images have partially overlapping fields-of-view. The method further includes receiving, by the device, depth data captured of the environment using one or more depth sensors devices of the capture device from different azimuth orientations of the one or more depth sensor devices relative to the center point in association with rotation of the capture device about the vertical axis, wherein the depth data comprises a plurality of 3D points having known positions relative to a common 3D coordinate space. In one or more implementations, the method further includes determining, by the device, possible positions of visual features included in the images using a passive stereo depth derivation function, determining, by the device, refined positions of the visual features based correspondences between some of the possible positions and the known positions of the 3D points, and generating, by the device, a 2D panoramic image or a 3D panoramic depth map of the environment based on the images and the refined positions of the visual features included in the images.

In another embodiment, a method is provided for capturing panoramic image data and depth data by a capture device assembly comprising a horizontal rotatable stage having a camera mounted thereon. The method can include rotating, by the capture device assembly, around a vertical axis based on rotation of the horizontal rotatable stage, and capturing, by the capture device assembly in association with the rotating, depth data from various azimuth orientations of the camera relative to a center point through which the vertical axis extends. The method can further include capturing, by the capture device assembly via the camera, respective images at defined azimuth orientations of the camera relative to a center point, wherein the rotating pauses at the defined azimuth orientations during capture of the respective images, and wherein respective images have a combined field-of-view spanning up to 360° horizontally, and facilitating, by the capture device assembly, generation of a 2D panoramic image and a 3D panoramic depth map of the environment based on the depth data and the respective images.

The above-outlined embodiments are now described in more detail with reference to the drawings, wherein like reference numerals are used to refer to like elements throughout. In the following description, for purposes of explanation, numerous specific details are set forth in order to provide a thorough understanding of the embodiments. It may be evident, however, that the embodiments can be practiced without these specific details. In other instances, well-known structures and devices are shown in block diagram form in order to facilitate describing the embodiments.

Terms such as "user equipment," "user equipment device," "mobile device," "user device," "client device," "handset," or terms representing similar terminology can refer to a device utilized by a subscriber or user to receive data, convey data, control, voice, video, sound, 3D models, gaming, and the like. The foregoing terms are utilized interchangeably herein and with reference to the related drawings. Furthermore, the terms "user," "subscriber," "customer," "consumer," "end user," and the like are employed interchangeably throughout, unless context warrants particular distinctions among the terms. It should be appreciated that such terms can refer to human entities, human entities represented by user accounts, or automated components supported through artificial intelligence (e.g. a capacity to make inference based on complex mathematical formalisms), which can provide simulated vision, sound recognition and so forth.

In various implementations, the components described herein can perform actions online or offline. Online/offline can refer to states identifying connectivity between one or more components. In general, "online" indicates a state of connectivity, while "offline" indicates a disconnected state. For example, in an online mode, models and tags can be streamed from a first device (e.g. a server device) to or from a second device (e.g. a client device), such as streaming raw model data or rendered models. In another example, in an offline mode, models and tags can be generated and rendered on one device (e.g. a client device), such that the device does not receive or send data or instructions from a second device (e.g. a server device). While the various components are illustrated as separate components, it is noted that the various components can be comprised of one or more other components. Further, it is noted that the embodiments can comprise additional components not shown for sake of brevity. Additionally, various aspects described herein may be performed by one device or two or more devices in communication with each other.

The digital 3D models described herein can include data representing positions, geometric shapes, curved surfaces, and the like. For example, a 3D model can include a collection of points represented by 3D coordinates, such as points in a 3D Euclidean space. The collection of points can be associated with each other (e.g. connected) by geometric entities. For example, a mesh comprising a series of triangles, lines, curved surfaces (e.g. non-uniform rational basis splines ("NURBS")), quads, n-grams, or other geometric shapes can connect the collection of points. In an aspect, portions of the mesh can include image data describing texture, color, intensity, and the like. In various embodiments, captured 2D panoramic images (or portions thereof) can be associated with portions of the mesh. The subject digital 3D models can thus be generated based on 2D image data, 2D sensory data, sensory data in combination with raw 2D data, 3D spatial data (e.g. spatial depth and distance information), computer generated positional data, and the like. In an aspect, data used to generate 3D models can be collected from scans (e.g. utilizing sensors) of real-world scenes, spaces (e.g. houses, office spaces, outdoor spaces, etc.), objects (e.g. furniture, decorations, goods, etc.), and the like. Data can also be generated based on computer implemented 3D modeling systems.

It is noted that the terms "3D model," "3D object," "3D reconstruction," "3D image," "3D representation," "3D rendering," "3D construct," and the like are employed interchangeably throughout, unless context warrants particular distinctions among the terms. It should be appreciated that such terms can refer to data representing an object, space, scene, and the like in three dimensions, which may or may not be displayed on an interface. In an aspect, a computing device, such as a graphic processing unit (GPU) can generate, based on the data, performable/viewable content in three dimensions. The terms "3D data," "3D imagery data," and like are employed interchangeably throughout, unless context warrants particular distinctions among the terms and can refer to data utilized to generate a 3D model, data describing a 3D model, data describing perspectives or points of view of a 3D model, capture data (e.g. sensory data, images, etc.), meta-data associated with a 3D model, and the like.

It is noted that the terms "2D model," "2D image(s)," and the like are employed interchangeably throughout, unless context warrants particular distinctions among the terms. It should be appreciated that such terms can refer to data representing an object, space, scene, and the like in two dimensions, which may or may not be displayed on an interface. The terms "2D data," "2D imagery data," and like are employed interchangeably throughout, unless context warrants particular distinctions among the terms and can refer to data describing a 2D image (e.g. meta-data), capture data associated with a 2D image, a 2D image, a representation of a 2D image, and the like. In an aspect, a computing device, such as a graphical processing unit (GPU), can generate, based on the data, performable/viewable content in two dimensions. In another aspect, 2D models can be generated based on captured image data, 3D imagery data, and the like. In embodiments, a 2D model can refer to a 2D representation of a 3D model, real-world scene, 3D object, or other 3D construct. As an example, a 2D model can comprise a 2D image, a set of 2D images, a panoramic 2D image, a set of panoramic 2D images, 2D data wrapped onto geometries, or other various 2D representations of 3D models. It is noted that a 2D model can include a set of navigation controls.

The term 2D panoramic image is used herein to refer to a 2D image of an environment that has a relatively wide field-of-view. For example, a 2D panoramic image can have a field-of-view that spans up to 360° horizontally. In various embodiments, a 2D panoramic image includes an image having a field-of-view greater than 120°. In some implementations, a 2D panoramic image can be formed via combination of two or more 2D images whose collective fields-of-view span up to about 360°. In one implementation, it is possible to capture a 360° panorama from a single image capture using a capture device that employs a cone-shaped mirror.

The term 3D panoramic image is used herein to refer to a 3D representation of an environment generated based on 3D depth data captured of the environment over a wide field-of-view (e.g. spanning up to 360°). A 3D panoramic image can include a 3D model or mesh, a 3D depth map, and the like. In various embodiments, a 2D panoramic image of an environment can be combined with 3D panoramic depth data of the environment captured from the same location to determine depth information for respective visual features (e.g. point, pixels, objects, etc.) of the 2D panoramic image. A 3D model that includes color data for respective points on the 3D model can further be generated based on the combined 2D panoramic image data and 3D panoramic depth data. In some embodiments, 3D depth data associated with respective visual features included in 2D images that are combined to generate a 2D panoramic image can be captured at the same or substantially same time as the respective 2D images using one or more of the 2D/3D panoramic capture devices as described herein. In other embodiments, the 3D depth data associated with respective visual features included in 2D images that are combined to generate a 2D panoramic image can be captured at a different time relative to the time of capture of the respective 2D images using one or more of the 2D/3D panoramic capture devices as described herein. According to these embodiments, the 3D data that is associated with a particular 2D image of the 2D images can be determined after capture of the 3D data and the 2D image, respectively, based in part on matching of the positions and orientations of the depth detection device(s) and camera that respectively captured the 3D data and the 2D image at the time of capture. 3D panoramic images may be incomplete; for example, depth data may only be detected or determined (e.g. via a stereo algorithm) for a fraction of the points on the panorama.

The term "panoramic video" is used herein to refer to a sequence of panoramic image frames. Panoramic video can be generated by combining sets of image frames captured at a high frame rate (e.g. 30 frames per second (fps) or more), wherein the images included in the sets have collectively provide a 360° panoramic view. In various embodiments, a panoramic video can be generated by aligning a limited field-of-view panoramic video captured from an environment with static panoramic imagery captured form the environment. A "3D panoramic video" refers to a sequence of panoramic depth images or (e.g. depth maps) captured over a period of time at a defined set/capture rate.

Referring now to the drawings, FIG. 1 presents an example system 100 for capturing and aligning panoramic image and depth data in accordance with various aspects and embodiments described herein. Aspects of systems, apparatuses or processes explained in this disclosure can constitute machine-executable components embodied within machine(s), e.g. embodied in one or more computer readable mediums (or media) associated with one or more machines. Such components, when executed by the one or more machines, e.g. computer(s), computing device(s), virtual machine(s), etc. can cause the machine(s) to perform the operations described.

System 100 facilitates capturing and aligning panoramic image and depth data. In the embodiment shown, system 100 includes a 2D/3D panoramic capture device 102 that is configured to capture 2D and 3D panoramic imagery. In particular, the 2D/3D panoramic capture device 102 can include one or more color cameras that can capture 2D images that when combined, provide up to a 360° (horizontal) field-of-view of an environment. In some embodiments, the 2D/3D panoramic capture device 102 can include a plurality of color cameras whose collective fields-of-view span up to 360°, thereby allowing an entire panoramic image to be captured simultaneously and merged into a single panoramic image or video. In other embodiments, the 2D/3D panoramic capture device 102 can be configured to rotate about a fixed vertical axis and capture 2D images of an environment using one or more color cameras at different azimuth angles or orientations of rotation relative to a center point through which the vertical axis passes, wherein the collective fields-of-view of the combined 2D images can provide up to a 360° view of the environment. The azimuth function is a spatial numeric measurement that generates a value between 0 and 360 (degrees) that gives the orientation or angle of rotation of a feature. As used herein, the azimuth is measured as the degrees of clockwise rotation from the positive y axis. In other words, with respect to lines provided on the same plane, the azimuth for a line pointing forward is 0°, a line pointing right is 90°, a line pointing backwards is 180°, and a line pointing left is 270°.

The 2D/3D panoramic capture device 102 can further include one or more depth sensor devices that can capture or sense depth information for visual features included in the 2D images. These depth sensor devices can include but are not limited to: time-of-flight sensor devices, structured light sensor devices, light detection and ranging (LiDAR) devices, assisted stereo devices, and passive stereo devices. For example, in some embodiments, the 2D/3D panoramic capture device 102 can include a plurality of depth sensor devices whose collective fields-of-view span up to 360°, thereby allowing an entire panoramic depth map to be captured simultaneously and merged into a single panoramic depth map for a corresponding panoramic 2D image. In other embodiments, the 2D/3D panoramic capture device 102 can be configured to rotate about a fixed vertical axis and capture 3D depth data of an environment using one or more depth sensor devices at different azimuth angles of rotation relative to the center point, wherein the collective fields-of-view of the combined 3D depth data provides a depth map of the environment that spans up to 360°. In other embodiments, the 2D/3D panoramic capture device 102 can be configured to generate stereo images or images with partially overlapping fields-of-view from which depth information can be extracted using passive stereo depth derivation techniques, active stereo depth derivation techniques, and/or machine learning based derivation techniques for depth estimation.

System 100 further includes a user device 106 and optionally a 3D modeling and navigation server device 112. In various embodiments, the user device 106 and/or the 3D modeling and navigation server device 112 can facilitate various aspects of the capture process. The user device 106 and/or the 3D modeling and navigation server device 112 can also facilitate processing of the 3D panoramic imagery captured by the 2D/3D panoramic capture device 102.

In one embodiment, the user device 106 can include a personal computing device (e.g. a tablet computer, laptop computer, a smartphone, etc.) that can be communicatively coupled to the 2D/3D panoramic capture device 102 and provide a control user interface that facilitates operation of the 2D/3D panoramic capture device 102 in association with the capture process. For example, the user device 106 can receive user input via the control user interface that controls one or more features and functionalities of the 2D/3D panoramic capture device 102. These features and functionalities can include capture of 2D imagery and/or video by the one or more cameras of the 2D/3D panoramic capture device 102 as well as capture of 3D depth data by the one or more depth sensor devices of the 2D/3D panoramic capture device 102. Based on reception of the user input commands, the user device 106 can be configured to direct the commands to the 2D/3D panoramic capture device 102 and cause the 2D/3D panoramic capture device 102 to perform the actions defined by the commands. In some implementations the 2D/3D panoramic capture device 102 can include or be mounted on a rotatable stage. With these implementations, the user device 106 can also issue control commands that control rotation of the rotatable stage. Further, in some implementations in 2D/3D panoramic capture device 102 can be mounted on robotic movable device. With these implementations, the user device 106 can also control movement of the robotic movable device to different nearby locations in the environment. The control user interface can be a graphical user interface (GUI) rendered via a display 108 of the user device 106, a tangible user interface, or another suitable user interface including hardware, software, or a combination of hardware and software. The control interface can receive user input via a variety of suitable input devices or mechanisms such as but not limited to: a touchscreen, a keypad, a mouse, a stylus, a joystick, soft or hard buttons, gesture recognition, etc.

In some embodiments, the user device 106 can be physically coupled to the 2D/3D panoramic capture device 102. The 3D modeling and navigation server device 112 can further be communicatively coupled to the 2D/3D panoramic capture device 102 and/or the user device 106 and provide for remote control of the 2D/3D panoramic capture device 102. Still in other embodiments, the 2D/3D panoramic capture device 102 can be directly operated by a user to control the capture process. For example, the 2D/3D panoramic capture device 102 can include the control user interface and a suitable input device/mechanism via which a user can directly interface with the 2D/3D panoramic capture device 102 to control data capture and/or movement of the 2D/3D panoramic capture device 102.

The 2D image data and 3D depth data captured by the 2D/3D panoramic capture device 102 can be processed in order to generate panoramic color photographs as well as more advanced panoramic data such as but not limited to: panoramic color videos, panoramic 3D depth images (e.g. 3D depth maps or models), and panoramic 3D depth video. In addition, a plurality of panoramic images and/or video clips captured by the 2D/3D panoramic capture device 102 at different nearby locations can be combined and aligned using the 3D data respectively associated therewith (as well as information regarding camera and depth sensor device capture position and orientation) to generate immersive 3D space models. For example, in some embodiments, the 2D/3D panoramic capture device 102 can be moved (e.g. manually or via a movable robotic device upon which the 2D/3D panoramic capture device 102 is mounted) around an environment to a plurality of different nearby locations in the environment and capture panoramic 2D image data and panoramic 3D depth data at each of the different locations. The panoramic 2D image data and panoramic 3D depth data captured at each location can further be aligned relative to a common 3D coordinate space to generate an immersive 3D model of the environment. In many implementations, the panoramic 2D image data and panoramic 3D depth data captured by the 2D/3D panoramic capture device 102 can be processed in real-time or substantially real-time (e.g. within seconds of data capture) to generate the panoramic color photographs, the more advanced panoramic data, and the 3D space models.

In various embodiments, some or all of the 2D and 3D panoramic data captured by the 2D/3D panoramic capture device 102 can be processed by the 2D/3D panoramic capture device 102, the user device 106, and/or at the 3D modeling and navigation server device 112. In the embodiment shown, the 2D/3D panoramic capture device 102, the user device 106 and the 3D modeling and navigation server device 112 respectively include processing components, primary processing component 104, secondary processing component 110 and tertiary processing component 114, respectively, via which the respective devices can process some or all of the 2D and 3D panoramic data captured by the 2D/3D panoramic capture device 102. For example, in one embodiment, the primary processing component 104 can perform some initial processing of 2D images and 3D depth data captured by the 2D/3D panoramic capture device to generate a 2D panoramic image, a panoramic video, a 3D panoramic depth image (e.g. a 3D depth map or model), and/or a 3D panoramic video. Such initial processing of 2D images and 3D depth data can include but not limited to:

aligning and combining 2D images using the 3D data respectively associated therewith and information regarding capture position and orientation to generate a 360° panoramic 2D image; aggregating overlapping 2D and 3D data to improve alignment accuracy, including aggregating multiple frames; projecting 2D images and 3D data to a common spatial coordinate space to determine position information for visual features included in the 2D images and to generate novel visualizations including a combination of 2D and 3D data; and removing unwanted objects included in the captured 2D and/or 3D images.

In another embodiment, some or all of the initial processing of 2D images and 3D depth data captured by the 2D/3D panoramic capture device 102 described above can be performed by the secondary processing component 110 and/or the tertiary processing component 114. According to this embodiment, raw 2D images and 3D depth data, as well as information regarding the capture position and orientation of the camera(s) and depth sensor device(s) and the capture location of the 2D/3D panoramic capture device 102, can be sent by the 2D/3D panoramic capture device 102 to the user device 106 and/or the 3D modeling and navigation server device 112 for processing by the secondary processing component 110 and/or the tertiary processing component 114, respectively.

Additional processing of 2D and 3D panoramic data to generate 3D space models can also be performed by the primary processing component 104, the secondary processing component 110, or the tertiary processing component 114. In one embodiment, the primary processing component 104 can be configured to perform the initial processing of 2D/3D data described above to generate 3D panoramic imagery and/or video and the secondary processing component 110 can be configured to receive and further process the 3D panoramic imagery and/or video to generate a 3D model of the environment. In another embodiment, the primary processing component 104 can be configured to perform initial processing of 2D and 3D panoramic data described above to generate 3D panoramic imagery and/or video and the tertiary processing component 114 can be configured to receive and further process the 3D panoramic imagery and/or video to generate a 3D model of the environment. Still in other embodiments, the primary processing component 104 can be configured to perform the initial processing of 2D/3D data described above to generate 3D panoramic imagery and/or video and further process the 3D panoramic imagery and/or video to generate a 3D model of the environment.

In various embodiments, raw and/or processed 2D images and 3D data can be presented to a user during (e.g. in real-time) and/or after the capture processes. For example, in the embodiment shown, the user device 106 includes a display 108 at which the raw and/or processed 2D images and 3D data can be presented. It should be appreciated that in other embodiments, the 2D/3D panoramic capture device 102 and/or the 3D modeling and navigation server device 112 can also include a display via which raw and/or processed 2D images and 3D data can be presented. In some implementations, the user device 106 can be configured to render (e.g. via display 108) a panoramic 2D image as well as more advanced panoramic data such a panoramic color video, a panoramic 3D depth image, a panoramic 3D depth video, and/or 3D model/mesh, as it is generated during the capture process (e.g. via primary processing component 104, secondary processing component 110, and/or tertiary processing component 114) in real-time or substantially real-real time. The graphical user interface can thus provide visual feedback during the capture process regarding the 2D and 3D data that has been captured thus far, the quality of the 2D and 3D data, and the quality of alignment of the 2D and 3D data. The graphical user interface can further serve various purposes that facilitate capturing 2D images and 3D data in association with generating a 3D space model of an environment. A capture process that involves capturing 2D and 3D data of an environment at various nearby locations in the environment to generate a 3D model of the environment is referred to herein as a "scan." For example, the graphical user interface can present a user with generated 3D panoramic imagery for the environment, a 3D mesh or map of the environment and/or a 3D model of the environment. Based on viewing aligned image data, a user can monitor what has thus far been captured and aligned, look for potential alignment errors, assess scan quality, plan what areas to scan next, determine where and how to position the 2D/3D panoramic capture device, and to otherwise complete the scan. Additional details regarding a graphical user interface that facilitates reviewing and aiding the capture process is described in U.S. Pat. No. 9,324,190 filed on Feb. 23, 2013 and entitled "CAPTURING AND ALIGNING MULTIPLE 3-DIMENSIONAL SCENES," the entirety of which is incorporated herein by reference.

In various embodiments, after a 3D space model is generated for an environment, the 3D modeling and navigation server device 112 can facilitate viewing, navigating, and interacting with the 3D space model. For example, the 3D space model as well as 2D images and 3D information associated with the 3D space model can be stored at the 3D modeling and navigation server device 112 and accessed by a user device (e.g., user device 106 or a different user device) via a network using a browser (e.g. at a website provided by the 3D modeling and navigation server device 112) or thin client application provided on the user device. In association with accessing the 3D space model, the user device can display (e.g. via display 108) an initial representation of the 3D space model from a predefined initial perspective of a virtual camera relative to the 3D space model. The user device can further receive user input (e.g., via a mouse, touch-screen, keyboard, gesture detection, gaze detection, etc.) indicating or requesting movement of the virtual camera through or around the 3D space model to view different parts of the 3D space model and/or to view different parts of the 3D space model from different perspectives and navigational modes (e.g. walking mode, dollhouse mode, feature view mode, and floor plan mode). The 3D modeling and navigation server device 112 can facilitate navigating the 3D model by receiving and interpreting the user gesture input and selecting or generating representations of the 3D model from new perspectives of the virtual camera relative to the 3D space model determined based on the user input. The representations can include 2D images associated with the 3D model as well as novel views of the 3D model derived from a combination of 2D image data and 3D mesh data. The 3D modeling and navigation server device 112 can determine or generate the representations of the 3D model based on the rich 3D data associated with respective visual features (e.g. pixels, objects surfaces, etc.) of the respective 2D panoramas relative to a common 3D coordinate space employed to generate the 3D space model (e.g. as previously determined by the primary processing component 104, the secondary processing component 110, and/or the tertiary processing component 114 in association with generation of the 3D space model). The 3D modeling and navigation server device 112 can further stream or otherwise provide respective representations of the 3D space model for rendering at the user device 106 (e.g. via display 108) during navigation.

In some embodiments, spatial metadata or tags including information about different objects or elements of the 3D space model can be applied to the 3D space model and also retained at the 3D modeling and navigation server device. For example, the tags can include text, images, audio, video, hyperlinks, etc., that can be represented by a tag icon that is spatially aligned in the 3D space model. Interaction with the tag icon as included in a rendered representation of the 3D space model can cause the server device to stream or otherwise provide the tag data/metadata to the user in a pop-up display window, a side panel, as a 2D or 3D object inside the 3D model, as a 2D overlay to the 3D model, or other suitable visual and/or audible form.

In accordance with one or more embodiments, the 3D modeling and navigation server device 112 and the user device 106 can be configured to operate in client/server relationship, wherein the 3D modeling and navigation server device 112 provides the user device 106 access to 3D modeling and navigation services via a network accessible platform (e.g. a website, a thin client application, etc.) using a browser or the like. However, system 100 is not limited to this architectural configuration. For example, in some embodiments, one or more features, functionalities and associated components of the 3D modeling and navigation server device 112 can be provided on the user device 106 and/or the 2D/3D panoramic capture device 102, and vice versa. In another embodiment, the features and functionalities of the 2D/3D panoramic capture device 102, the user device 106 and the 3D modeling and navigation server device 112 can be provided on a single device. Further, the 3D modeling and navigation server device 112 can include any suitable device and is not limited to a device that operates as a "server" in a server/client relationship.

The various components and devices of system 100 can be connected either directly or via one or more networks. Such network(s) can include wired and wireless networks, including but not limited to, a cellular network, a wide area network (WAN, e.g. the Internet), a local area network (LAN), or a personal area network (PAN). For example, the 2D/3D panoramic capture device 102, the user device 106 and the 3D modeling and navigation server device 112 can communicate with one another using virtually any desired wired or wireless technology, including, for example, cellular, WAN, Wi-Fi, Wi-Max, WLAN, Bluethooth™, near field communication, etc. In an aspect, one or more components of system 100 are configured to interact via disparate networks. For example, in one embodiment, the 2D/3D panoramic capture device 102 and the user device 106 can be configured to communication using a PAN (e.g. short range wireless communications), and the user device 106 and the 3D modeling and navigation server device 112 can be configured to communicate using a WAN (e.g. a cellular network, the Internet, etc.). In some embodiments, the 3D modeling and navigation server device 112 is included in a cloud-computing network. "Cloud computing" is a kind of network-based computing that provides shared processing resources and data to computers and other devices on-demand via a network. It is a model for enabling ubiquitous, on-demand access to a shared pool of configurable computing resources (e.g. networks, servers, storage, applications and services), which can be rapidly provisioned and released with minimal management effort. Cloud computing and storage solutions provide users and enterprises with various capabilities to store and process their data in third-party data centers.

The user device 106 can include any suitable computing device associated with a user and configured to facilitate processing 3D panoramic imagery and/or displaying a 3D model or representation of the 3D model and interacting with the 3D model. For example, user device 106 can include a desktop computer, a laptop computer, a mobile phone, a smartphone, a tablet personal computer (PC), a personal digital assistant PDA, a heads-up display (HUD), virtual reality (VR) headset, augmented reality (AR) headset, or another type of wearable computing device. User device 106 can include a presentation component (not shown) to generate and present a 3D model and associated representations (e.g. which can include 2D images and combined 2D image data and 3D reconstructions or meshes) as described herein. In some implementations, the presentation component can be or include a GUI. In other implementations, the presentation component can be configured to generate 3D models and associated representations of the 3D models for a 3D display (e.g., a stereo, holographic, or volumetric display). As used in this disclosure, the terms "content consumer," "user," "author," and the like refer to a person, entity, system, or combination thereof that interfaces with system 100 (or additional systems described in this disclosure).

Figure 2A:
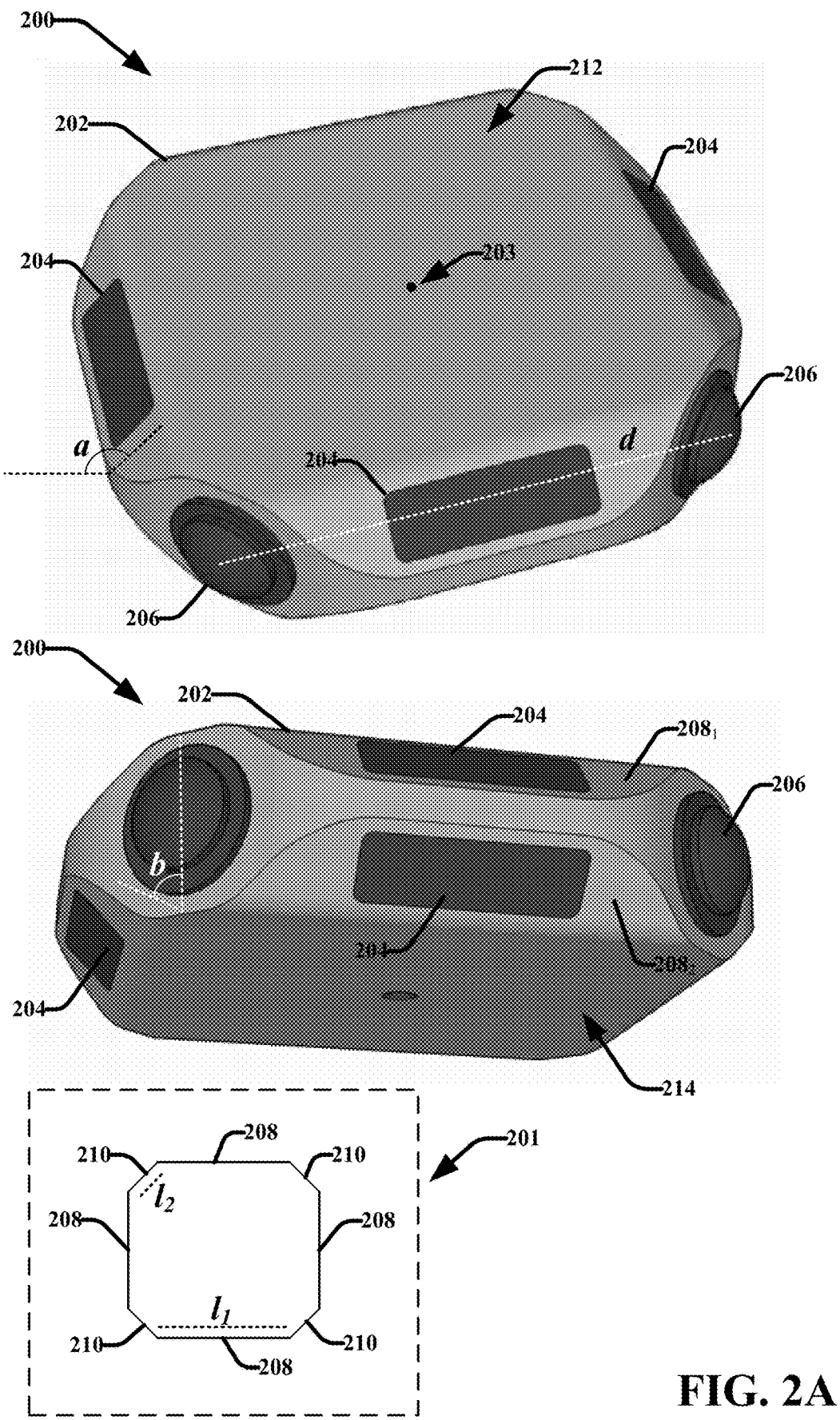
FIG. 2A illustrates an example 2D/3D panoramic capture device in accordance with various aspects and embodiments described herein.

FIG. 2A illustrates different perspectives of an example 2D/3D panoramic capture device 200 in accordance with various aspects and embodiments described herein. The upper figure depicts a top down view of the capture device 200 and the lower figure depicts a view of the capture device 200 including the bottom surface 214 of the capture device 200. In one or more embodiments, the 2D/3D panoramic capture device 102 of system 100 can be or include one or more features and functionalities of 2D/3D panoramic capture device 200. Repetitive description of like elements employed in respective embodiments is omitted for sake of brevity.

The 2D/3D panoramic capture device 200 incorporates a plurality of cameras and depth sensor devices whose collective fields-of-view span up to 360° horizontally, allowing an entire panoramic image to be captured simultaneously and merged into a single panoramic image or video frame using processing software provided on the 2D/3D panoramic capture device 200 and/or provided at an external device (e.g. user device 106 and/or 3D modeling and navigation server device 112). The 2D/3D panoramic capture device 200 provides a novel depth sensor device configuration that addresses shortcomings of previous solutions, and a novel color camera configuration that allows panoramic capture more quickly than previous solutions. The 2D/3D panoramic capture device 200 is capable of capturing and/or generating panoramic color photographs as well as more advanced panoramic data such as but not limited to: panoramic color video, panoramic 3D depth images (e.g. a 3D depth map or model) and panoramic 3D depth video. Multiple panoramic images and/or video clips captured by the 2D/3D panoramic capture device 200 at different nearby locations may further be combined using additional processing software (e.g. additional software provided on the 2D/3D panoramic capture device 200, the user device 106 and/or 3D modeling and navigation server device 112), to generate a larger, immersive 3D space model.

The 2D/3D panoramic capture device 200 includes a housing 202 within which electrical components and one or more power sources are housed. The electrical components can be powered via the one or more power sources. The electrical components can vary depending on the particular features and functionality of the 2D/3D panoramic capture device 200. In various embodiments, these electrical components can include, but are not limited to, one or more processors, memories, transmitters, receivers, transceivers, cameras, camera circuitry, depth sensor devices, depth sensor device circuitry (e.g. light emitters, lasers, scanners photodetectors, image sensors, stereo cameras, etc.), sensing circuitry, antennas and other components. In an embodiment, the electrical components can be formed on or within a substrate that is placed inside the housing 202. The housing 202 can be formed from conductive materials, non-conductive materials or a combination thereof. For example, housing 202 can include a conductive material, such as metal or metal alloy, a non-conductive material such as glass, plastic, ceramic, etc., or a combination of conductive and non-conductive materials. In some embodiments, the housing 202 can also include a display panel, a power button, a charging port, and other similar features (not shown).

In various embodiments, the 2D/3D panoramic capture device 200 includes a plurality of cameras 206 configured to capture 2D image data and arranged at different positions on the housing 202 and having different azimuth orientations relative to a center point (e.g. point 203). For example, in the embodiment shown, the 2D/3D panoramic capture device can have four cameras 206, one located in each of the four corners of the housing 202. It should be appreciated that only two cameras 206 are visible in the respective figures of the 2D/3D panoramic capture device 200 based on the perspectives shown. However, the non-visible corners or sides of the 2D/3D panoramic capture device 200 can also include cameras 206. In addition, the 2D/3D panoramic capture device 200 includes a plurality of depth detection components 204 configured to capture 3D depth data. Each of the depth detection components 204 can include one or more depth sensor devices configured to capture depth or distance information. The depth detection components 204 are arranged at different positions on the housing 202 and have different azimuth orientations relative to the center point (point 203). For example, in the embodiment shown, the 2D/3D panoramic capture device can have eight depth detection components 204, two located on each center side surface of the housing and positioned at different angles relative to one another. It should be appreciated that depth detection components 204 can be provided on the non-visible side surfaces of the 2D/3D panoramic capture device 200.

The fields-of-view of the respective cameras 206 and depth detection components 204 can vary in the horizontal and vertical direction. In an exemplary embodiment, the collective field-of-view of the cameras 206 and the depth detection components 204 span up to 360° horizontally and up to 180° vertically. In other embodiments, the fields-of-view of each of cameras 206 and/or depth detection components can be less than 180° vertically. According to these embodiments, the panoramic 2D image data and/or 3D depth data will have holes at the top and bottom.

Figure 2B:
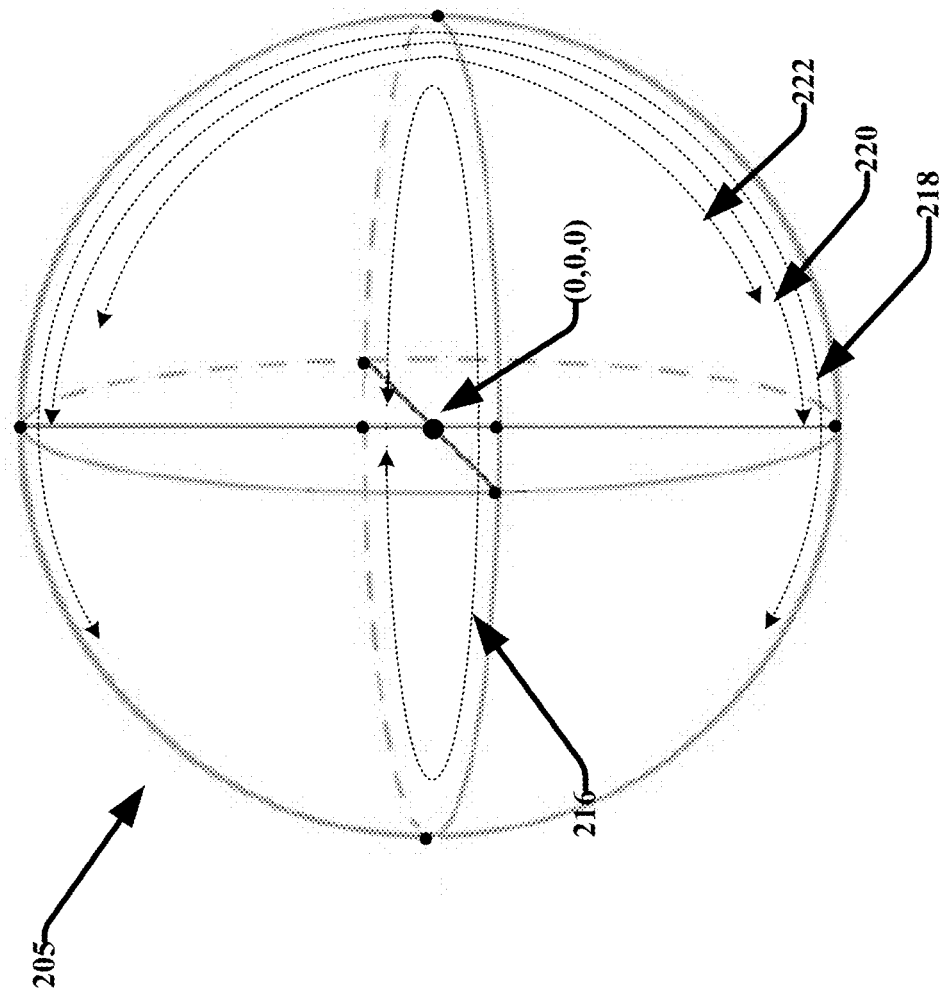
FIG. 2B illustrates example fields of view of an example 2D/3D panoramic capture device in accordance with various aspects and embodiments described herein.

For example, FIG. 2B illustrates example fields of view of 2D/3D panoramic capture device 200 with reference to spherical quadrant plane 205 in accordance with various aspects and embodiments described herein. With reference to spherical quadrant plane 205 wherein the center of the 2D/3D panoramic capture device 200 is located at coordinate (0,0,0), the collective fields-of-view of the cameras 206 and depth detection components 204, respectively, can span up to 360° relative to the horizontal quadrant plane, as indicted by dashed line 216. The field-of-view of each camera 206 and depth detection component 204 can further span in the vertical direction some fraction of 360°. For example, with reference again to spherical quadrant plane 205, the fields-of-view of the respective cameras 206 and depth detection components 204 can span some fraction of 360° relative to the vertical quadrant plane. For example, in one implementation the field-of-view of each camera 206 and depth detection component 204 can span about 240° in the vertical direction, as indicated by dashed line 218. In another example implementation, the field-of-view of each camera 206 and depth detection component 204 can span about 180° in the vertical direction, as indicated by dashed line 220. In yet another example implementation, the field-of-view of each camera 206 and depth detection component 204 can span about 130° in the vertical direction, as indicated by dashed line 222.

With reference back to FIG. 2A, in the embodiment shown, the housing 202 has an octagon prism geometry including a top surface 212, a bottom surface 214, and eight side surfaces. In an aspect, the bottom surface 214 and the top surface 212 are parallel. However in other implementations, the relative shapes and positions of the bottom surface and the top surface 212 can vary. In the embodiment shown, the top surface 212 is separated from the bottom surface 214 by a defined distance. Call out box 201 presents a simplified 2D planar view of the geometry of the housing 202 taken along a horizontal cross-section of the housing 202 (e.g., relative to the top surface 212 or the bottom surface 214). As shown in call out box 201, the housing includes eight side surfaces consisting of four center surfaces 208 and four corner surfaces 210. In the embodiment shown, each of the center surfaces 208 includes two depth detection components 204 located thereon. For example, the topology of the center surfaces can be curved outward (e.g., convex) or have two sloping two sloping sides $208_1$ and $208_2$ and each of the sloping sides $208_1$ and $208_2$ can include a depth detection component 204. For example, the sloping sides $208_1$ and $208_2$ can slope from the top surface 212 and the bottom surface 214, respectively, at an angle a wherein a is greater than 90°. However, the corner surfaces 210 can be substantially perpendicular to the top surface 212 and the bottom surface 214 of the 2D/3D panoramic capture device (e.g. b is 90° or substantially) 90°. With this configuration, each center surface 208 contains a pair of depth cameras, one pointing diagonally upward relative to a vertical plane and one pointing diagonally downward relative to a vertical plane. It should be appreciated however that the dimensions of the 2D/3D panoramic capture device 200 can vary. In an aspect, the lengths ($l_1$) of the respective center surfaces 208 are the same or substantially the same, and the lengths ($l_2$) of the respective four corner surfaces 210 are the same or substantially the same. In some implementations, such as that depicted in FIG. 2A, the lengths ($l_1$) of the center surfaces 208 can be longer than the lengths ($l_2$) of the corner surfaces 210.

Each of the four corner surfaces 210 can include a camera configured to capture image data, including video in some implementations. Thus, in one embodiment, the 2D/3D panoramic capture device 200 includes eight depth detection components 204 and four cameras 206. With this configuration, the 2D/3D panoramic capture device 200 can capture 2D images and 3D data in substantially every horizontal and vertical direction without moving or rotating the 2D/3D panoramic capture device 200. For example, simultaneous data capture by the respective cameras 206 and the depth detection components 204 can generate four 2D images and eight sets of 3D depth information from different perspectives of an environment which when combined, can provide a 360° panoramic 2D image of the environment with 3D depth information for respective visual features included in the 360° panoramic 2D image.

In one or more implementations, adjacent or neighboring cameras of the respective cameras 206 can have partially overlapping fields-of-view. For example, the cameras 206 can respectively be or include fisheye cameras with fisheye lenses having fields-of-view spanning from about 100° to about 195°. In an exemplary embodiment, the respective cameras 206 can have fields-of-view of about 180° or more. In another exemplary embodiment, the respective cameras 206 can have fields-of-view of about 195°. In addition to having overlapping fields-of-view, the respective cameras 206 can be arranged with offset positions. For example, in the embodiment shown, the respective cameras 206 are separated by a distance d. As a result, two adjacent or neighboring cameras 206 can generate a pair of stereo images (also referred to as a stereo image pair). Accordingly, simultaneous data captured by the four cameras 206 can generate four 2D images, respectively captured from each of the four cameras 206, which can be grouped into four stereo image pairs. In various embodiments, the offset distance d, (also referred to as the "baseline" in the field of stereoscopy), can be the same as the inter-ocular distance, which is about 6.5 centimeters (cm). Thus in one or more embodiments, the offset distances (d) between respective neighboring cameras 206 are about 6.5 cm. However, the distances d between respective neighboring cameras 206 can vary. For example, in one embodiment, the distances d between respective neighboring cameras 206 can be from about 3.0 cm to about 12.0 cm. In another example, the distances d between respective neighboring cameras 206 can be from about 5.0 cm to about 10.0 cm. In yet another example, the distances d between respective neighboring cameras 206 can be from about 6.0 cm to about 8.0 cm.

The features and functionalities of the respective cameras 206 can vary. In an exemplary embodiment, the respective cameras 206 include high resolution (e.g. greater than about 40 mega-pixels (Mp)) digital color cameras with wide fields-of-view (e.g. greater than or equal to 180°). For example, the fields-of-view of the respective cameras can span up 360° in the horizontal and vertical direction. In various implementations, the fields-of-view of the respective cameras 206 spans from about 90° to about 195° in the horizontal and/or vertical direction. In another implementation, the fields-of-view of the respective cameras 206 spans from about 100° to about 190° in the horizontal and/or vertical direction. In yet another implementation, the fields-of-view of the respective cameras 206 spans from about 120° to about 160° in the horizontal and/or vertical direction. In various exemplary embodiments, the cameras 206 can be or include high-dynamic-range (HDR) cameras. However, it should be appreciated that the resolution and field-of-view of the respective cameras 206 can vary.

In some embodiments, the respective cameras 206 can include video recording capabilities. For example, the respective cameras 206 can be configured to continuously capture images at a suitable frame rate, and preferably a high frame rate (e.g. 30 frames per second fps). Accordingly, in some embodiments, the 2D/3D panoramic capture device 200 can capture panoramic video over a period of time. In addition, as described below, the 2D/3D panoramic capture device 200 can also be configured to capture panoramic depth data over the period of time, referred to herein as "depth video data," which can be combined with the panoramic video to generate a panoramic spherical 3D video.

The features and functionalities of the depth detection components 204 can also vary. In various embodiments, the depth detection components 204 can respectively include one or more depth sensor devices or depth detection instruments configured to capture and/or determine depth or distance information for features present in an environment, and more particularly visual features included in captured 2D images of the environment. For example, in some embodiments, each of the depth detection components 204 can include a single depth sensor device. In other embodiments, each of the depth detection components can include a pair of depth sensor devices with different fields-of view (in the vertical and/or horizontal direction). In another embodiment, the respective depth detection component 204 can include three or more depth sensor devices.

In an exemplary embodiment, the respective depth detection components 204 have relatively wide fields-of-view horizontally (e.g. up to about 180° horizontally) and vertically (e.g. up to about 180° vertically and in some implementations greater than about 180° vertically). In particular, each of the depth detection components 204 can be configured to capture depth information in various directions relative to a horizontal plane that is parallel to the top surface 212 or bottom surface 214 of the capture device and a vertical plane that is perpendicular to the top surface 212 or the bottom surface 214 of the capture device. In other embodiments, each of the depth detection components 204 can have a field of view that is about 90° vertically. For example, given the configuration depicted in FIG. 2A, when each of the depth detection components 204 on a same center surface 208 have vertical fields-of-view of about 90°, the depth detection components 204 can be angled relative to one another such that the collective field-of-view of the pair of depth detection components is about 180°. In other embodiments, the fields-of-view of two or more depth detection components 204 located on a same center side 208 (or different center sides) can overlap in the vertical and/or horizontal directions. In some implementations, at least some of the depth detection component 204 can include a depth detection device that points at an angle towards the area directly above or below the top surface 212 or the bottom surface, respectively, thereby capturing depth data for a potential blind spot.

The range of the one or more depth sensor devices or depth detection instruments included in the respective depth detection components 204 can vary. In one implementation, the range of the one or more depth sensor devices is up to about 6.0 meters (m). In another implementation, the range of the one or more depth sensor devices is up to about 10 m. Still in other implementations, the range of the one or more depth sensor devices is greater than 10 m. In some implementations, at least some of the depth sensor devices included in the respective depth detection components 204 can be configured to capture high quality depth data in sunlight.

The depth detection components 204 can also be configured to capture and/or determine depth video data. For example, the depth detection components 204 can be configured to capture sets of 3D information at a "set rate" corresponding to or substantially corresponding to the frame rate of the respective cameras 206 when capturing video. In other implementations, the set rate can be lower than the frame rate of the cameras 206 and respective sets of the 3D depth data can be applied to groups of frames captured by the cameras 206. Accordingly, the 2D/3D panoramic capture device 200 can provide for capturing spherical video by continuously capturing panoramic image data at a desirable frame rate (e.g. 30 fps or more) while also capturing depth video data over time. As a result, a 3D video model can be generated based on the data which can include a navigable 3D immersive space that changes over time based on activity that occurred in the space during video capture.

In one or more embodiments, the respective depth detection components 204 include one or more time-of-flight depth sensor devices. A time-of-flight depth sensor device generally includes at least a light emitter and a light receiver or image sensor. The number of time-of-flight depth sensor devices respectively included in each of the depth detection component 204 can vary. In some implementations, each of the depth detection components 204 can include one time-of-flight depth sensor device. In other embodiments, each of the depth detection components 204 can include two time-of-flight depth sensor devices pointing in different directions relative to a horizontal plane and/or a vertical plane. Still in other embodiments, each of the depth detection components 204 can include two or more time-of-flight depth sensor devices pointing in different directions relative to a horizontal plane and/or a vertical plane. In other embodiments, the depth detection components 204 can include but are not limited to: a LiDAR device (including but not limited to solid-state variants), a structured light sensor device, a passive or active stereo camera, and a light-field camera. In some implementations, the depth detection components 204 can include structured light projectors paired with cameras. For example, in one embodiment, the depth detection components 204 can respectively include a light emitter and light detection unit or depth detection camera. In other embodiments, the depth detection components 204 can include light emitters and the cameras 206 can be configured to capture depth data associated with the emitted light, in addition to capturing color 2D image data.

In other implementations, the 2D/3D panoramic capture device 200 can employ active stereo and/or passive stereo techniques to derive panoramic depth information for features (e.g., points, pixels, objects, etc.) included in 2D images captured by the 2D/3D panoramic capture device 200. For example, in some embodiments, 3D depth data can be derived using processing software (e.g. provided at capture device 200 or another device such as user device 106 and/or 3D modeling and navigation server device 112) configured to perform passive stereo depth derivation from pairs of stereo images captured by the respective cameras 206 of the capture device 200. In an aspect of such embodiments, the depth detection components 204 may be omitted and 3D depth data can be detected solely using passive stereo analysis. In another embodiment the 2D/3D panoramic capture device 200 can employ stereo cameras paired with a patterned light projection device or a laser projection device and software configured to derive depth information from captured stereo images using active stereo processing techniques. For example, in one embodiment, each depth detection components 204 can include a pair of infrared stereo cameras with infrared light projectors. In another embodiment, each depth detection component 204 can include an infrared light projector and the pair of cameras 206 on either sides of the depth detection component 204 can include RGBD cameras configured to capture stereo image pairs in association with the infrared light emitted by the depth detection component 204. In implementations in which patterned light projection or laser projection is employed in association with active stereo, the depth detection components 204 can include the patterned light projection or laser projection system devices. Still in other embodiments, the 2D/3D panoramic capture device can determine depth information using video imagery captured via one or more cameras (e.g. cameras 206 or one or more additional cameras) of the 2D/3D panoramic capture device. According to these embodiments, the 2D/3D panoramic capture device can derive depth information from the video images using one or more of structure-from-motion processing functions. Structure-from-motion analysis is a range imaging technique for estimating 3D structures from two-dimensional image sequences. In some implementations in which the depth detection components 204 respectively comprise depth sensors devices that employ light emitters and light receivers to capture depth information (e.g. time-of-flight sensor devices, structured light sensor devices, and light/laser projection systems associated with performance of active or assisted stereo), the depth sensor devices can comprise two light receivers that share a single light emitter. For example, a depth detection component 204 can include a time-of-flight sensor device, a structured light sensor device, a light/laser projection sensor device, etc., that comprises two or more light receivers or image sensors with different fields-of-view. Rather than employing two light emitters (i.e. one for each light receiver or image sensor), each of the four azimuth directions for depth detection component 204 can employ a single light emitter that is shared by the respective light receivers or image sensors. The usage of a single light emitter for two nearby depth sensor devices having different fields-of-view can avoid interference associated with multiple emitters as well as reduce the overall cost of the 2D/3D panoramic capture device 200.

Further, in some embodiments, the 2D/3D panoramic capture device 200 can employ a combination of different types of depth sensor devices and/or depth derivation techniques. For example, the respective depth detection components 204 can include two or more of: a time-of-flight sensor device, a LiDAR sensor device, a structured light sensor device, and an active stereo sensor device. According to this example, in addition to the depth detection components 204 including a combination of different depth sensor devices, the 2D/3D panoramic capture device 200 can also employ passive stereo techniques to derive depth information from stereo image pairs captured by neighboring cameras of the respective cameras 206.

It should be appreciated that the structure, form and features of 2D/3D panoramic capture device 200 can vary. For example, the number and arrangement of cameras 206 and depth detection components 204 can vary so long as the respective cameras and depth detection components can collectively capture 2D image data and 3D depth data that covers up to a 360° horizontal view with a single simultaneous capture by the respective cameras and depth sensor devices. In some implementations, the cameras 206 can be arranged and/or have fields-of-view such that they provide only mono coverage or incomplete stereo coverage (e.g. only a subset of the cameras may provide stereo coverage) as opposed to complete stereo coverage. In some embodiments, the depth detection components 204 can respectively include multiple types of depth sensor devices. In another implementation, the depth detection components 204 can be removed and the 2D/3D panoramic capture device 200 can determine depth information based on captured stereo image pairs and passive stereo depth derivation techniques. In addition, the size, shape and geometry of the 2D/3D panoramic capture device 200 can vary. For example, in some implementations, the 2D/3D panoramic capture device 200 can have a spherical geometry or a rectangular prism geometry.

Figure 3:
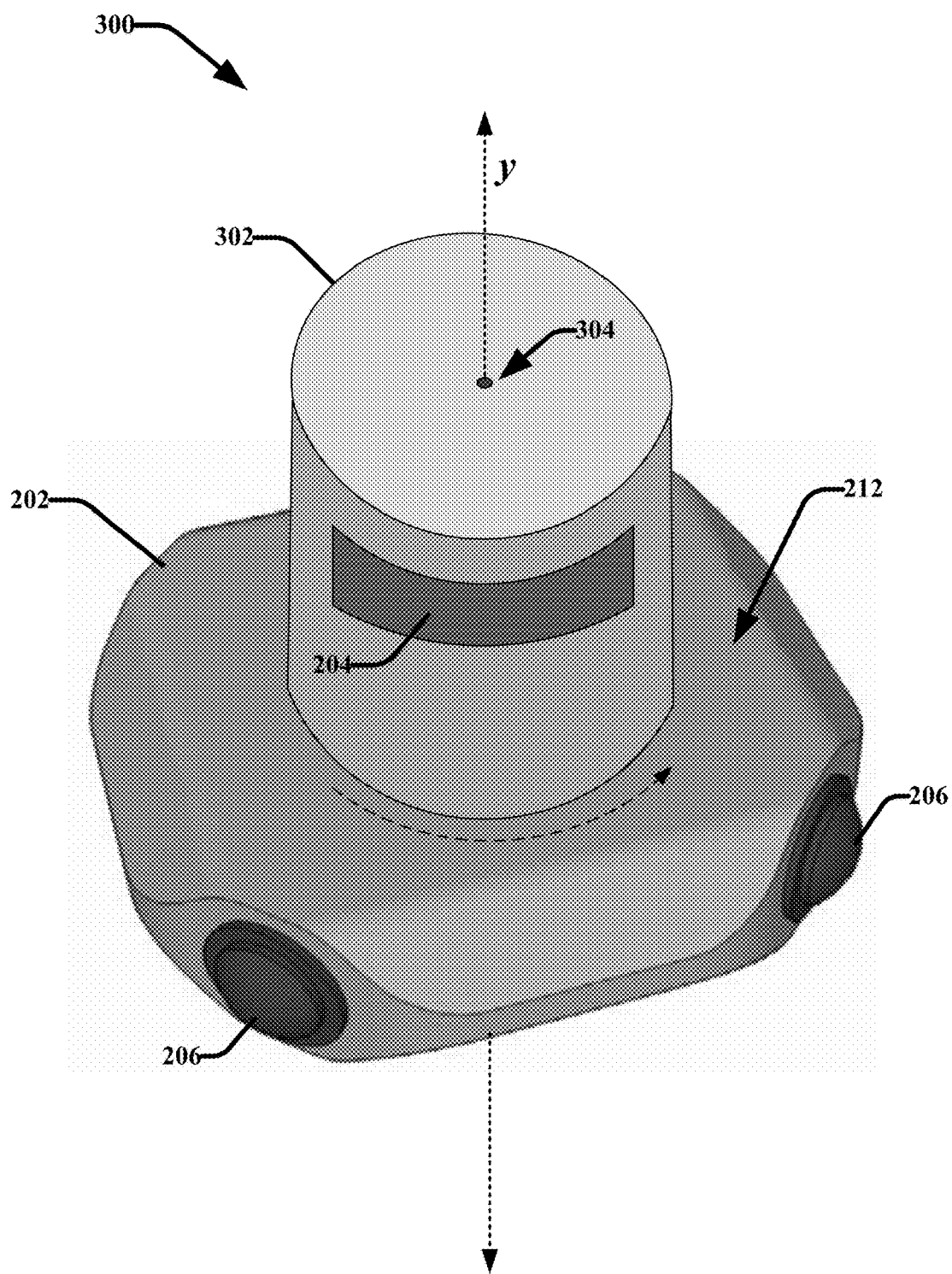
FIG. 3 illustrates another example 2D/3D panoramic capture device in accordance with various aspects and embodiments described herein.

FIG. 3 illustrates another example 2D/3D panoramic capture device 300 in accordance with various aspects and embodiments described herein. The 2D/3D panoramic capture device 300 is a variation of 2D/3D panoramic capture device 200 and can include one or more of the features and functionalities of 2D/3D panoramic capture device 200 with the differences noted below. Repetitive description of like elements employed in respective embodiments is omitted for sake of brevity.

With reference to FIGS. 2 and 3, 2D/3D panoramic capture device 300 includes similar features and functionalities as 2D/3D panoramic capture device 200 with respect to form and arrangement of the cameras 206. However, 2D/3D unlike panoramic capture device 200, 2D/3D panoramic capture device 300 does not include depth detection components 204 provided on respective center surfaces 208 of the 2D/3D panoramic capture device. Alternatively, 2D/3D panoramic capture device 300 includes a rotatable mount 302 provided on the top surface 212 thereof that includes a single depth detection component 204. In other implementations, the rotatable mount 302 can be located on the bottom surface 214 of the 2D/3D panoramic capture device 300 and/or the rotatable mount 302 can include two or more depth detection components 204. According to this embodiment, the rotatable mount 302 can be configured to rotate 360° about a vertical axis y while the two or more depth detection components 204 capture 3D depth data. In some embodiments, the two or more depth detection components 204 can continuously capture 3D depth data over the course of rotation such that the collective 3D depth data covers the entire 360° view. In other embodiments, the two or more depth detection components 204 can be configured to capture 3D depth data at various defined azimuth orientations of rotation relative to a center point (e.g. point 304) through which the vertical y axis extends over a defined rotation period such that the collective 3D depth data covers the entire 360° view. In some implementations, the rotatable mount 302 can be offset from the center point of the 2D/3D panoramic capture device 300 (e.g. point 304) to avoid a blind spot. Further, the cameras 206 can be synchronized with the rotating mechanism of the rotatable mount 302 such that the cameras only capture 2D images when the depth detection component 204 and/or light emitted from the depth detection component 204 (e.g. in association with operation of a depth sensor device of the depth detection component 204 that involves light emission or projection) is not in the respective visible frames of the respective cameras 206.

In some implementations, the 2D/3D panoramic capture device 300 can generate information that identifies or facilitates identifying a capture position of each 3D data set captured by the depth detection component 204 in association with rotation of the rotatable mount 302 to facilitate aligning 3D data sets relative to one another and determining depth information for respective visual features (e.g. pixels) included in the 2D image data. According to this embodiment, the respective capture positions of the cameras are fixed and thus known. For example, the 2D/3D panoramic capture device 300 can determine information regarding a starting position of the depth detection component 204 at the start of rotation, a rotation speed or schedule of the rotatable mount 302, and a capture time of each 3D data set. In some embodiments, the 2D/3D panoramic capture device 300 can include a stepper motor, ring encoder or the like to capture information regarding acceleration and/or orientation of the rotatable mount 302 from which respective capture positions of each 3D data set captured by the depth detection component 204 can be determined.

Figure 4:
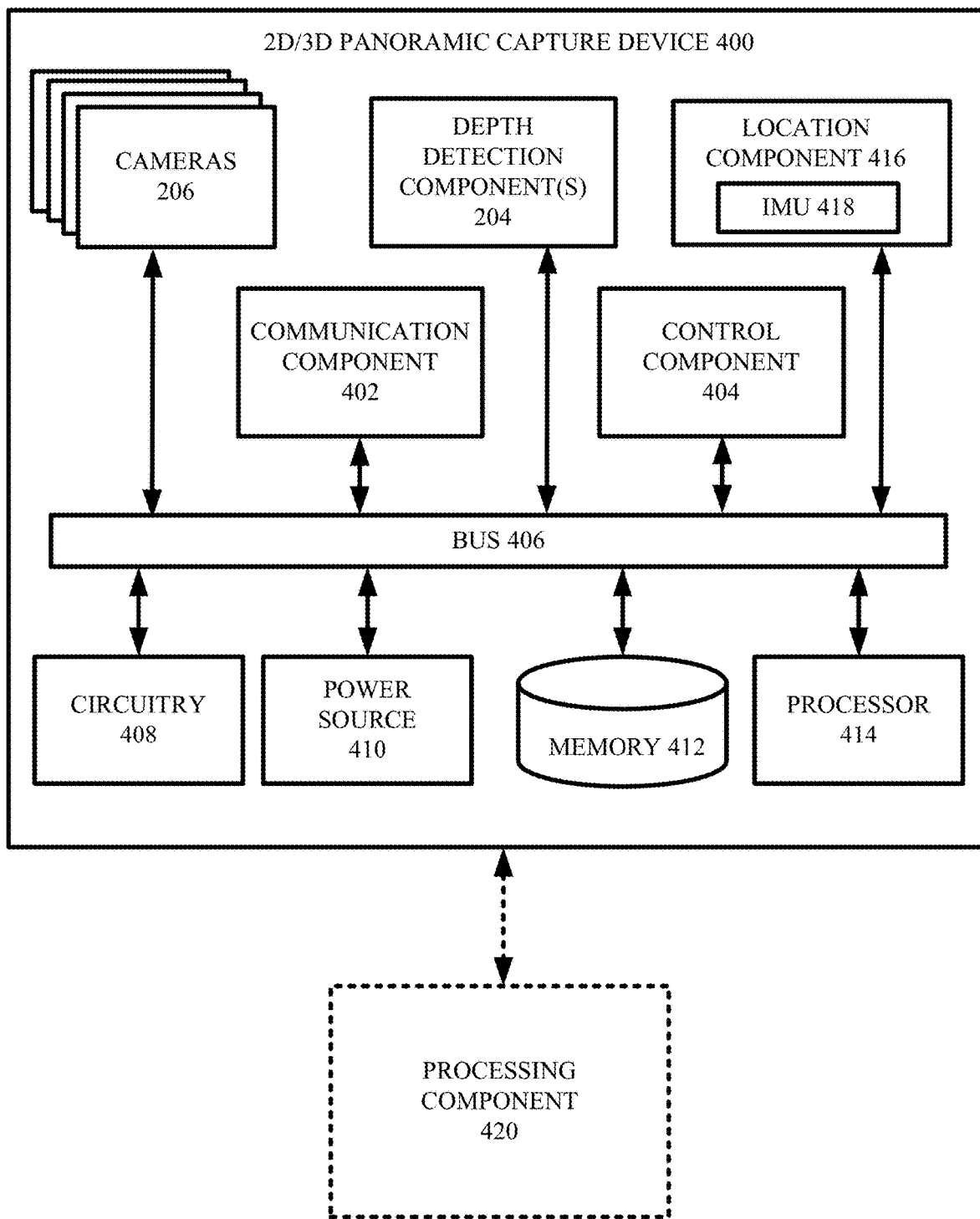
FIG. 4 presents a schematic block diagram of an example 2D/3D panoramic capture device in accordance with various aspects and embodiments described herein.

FIG. 4 presents a schematic block diagram of an example 2D/3D panoramic capture device 400 in accordance with various aspects and embodiments described herein. In one or more embodiments, 2D/3D panoramic capture devices 102, 200 and 300 can be or include one or more features and functionalities of 2D/3D panoramic capture device 400, and vice versa. Repetitive description of like elements employed in respective embodiments is omitted for sake of brevity.

With reference to FIGS. 1, 2, 3 and 4, the 2D/3D panoramic capture device 400 can include two or more cameras 206 arranged on and/or within a housing (e.g. housing 202) of the device such that the collective fields-of-view of the respective cameras 206 span up to 360° (e.g. as demonstrated by 2D/3D panoramic capture devices 200 and 300). For example, in various embodiments, the 2D/3D panoramic capture device 400 includes four fisheye cameras arranged at different locations around the housing of the capture device and pointing in different directions, wherein each of the cameras has a wide field-of-view (e.g. about 100° to about 195° horizontal field-of-view). The 2D/3D panoramic capture device 400 further includes one or more depth detection components 204 respectively including one or more depth sensor devices provided on and/or within the housing and configured to capture depth information for an environment. The respective depth detection components 204 can have each have different and/or partially overlapping fields of view relative to a horizontal plane and vertical plane. For example, in one embodiment, the one or more depth detection components 204 can respectively include one or more time-of-flight depth sensor devices that point in various directions. In one embodiment, the 2D/3D panoramic capture device 400 includes a plurality of depth detection components 204, wherein the collective fields-of-view of the respective depth detection components 204 span up to 360° horizontally and substantially 360° vertically (e.g. as demonstrated by 2D/3D panoramic capture devices 200). In another embodiment, the 2D/3D panoramic capture device 400 can include one or more depth detection components 204 provided on a rotatable stage (e.g. rotatable mount 302) mounted on the housing 202 of the 2D/3D panoramic capture device, wherein the rotatable stage is configured to rotate about a vertical axis and continuously capture 3D depth information or capture 3D depth information at various defined azimuth points or orientations of rotation relative to a center point through which the vertical axis extends and over a defined rotation period such that the collective 3D depth information covers an entire 360° view (e.g. as demonstrated by 2D/3D panoramic capture device 300).

The 2D/3D panoramic capture device 400 further includes a communication component 402, a control component 404, location component 416, circuitry 408, and a power source 410. In some embodiments, the 2D/3D panoramic capture device 400 can include memory 412 configured to store computer executable components and instructions and processor 414 to facilitate operation of the instructions (e.g. computer executable components and instructions) by the 2D/3D panoramic capture device 400. In some embodiments, the memory 412 can also store captured 2D image data and 3D depth information. The 2D/3D panoramic capture device 400 can further include a device bus 406 that couples the various components of the 2D/3D panoramic capture device 400, including, but not limited to, the cameras 206, the depth detection component(s) 204, the communication component 402, the control component 404, the location component 416, the circuitry 408, the power source 410, the memory 412 and the processor 414.

The communication component 402 can be configured to facilitate wired and/or wireless communication between the 2D/3D panoramic capture device 400 and an external device, such as the user device 106 and/or the 3D modeling and navigation server device 112. For example, the communication component 402 can be or include various hardware and software devices associated with establishing and/or conducting wireless communication between the 2D/3D panoramic capture device 400 and an external device. For example, communication component 402 can control operation of a transmitter-receiver or transceiver (not shown) of the 2D/3D panoramic capture device 400 to communicate raw and/or processed 2D/3D data with an external device (e.g. the user device 106 and/or the 3D modeling and navigation server device 112) and/or to receive control commands from the external device. The communication component 402 can facilitate wireless communication between the 2D/3D panoramic capture device 400 and an external device using a variety of wireless telemetry communication protocols. For example, the communication component 402 can communicate with an external device using communication protocols including but not limited to: a NFC based protocol, a BLUETOOTH® technology-based protocol, a ZigBee® based protocol, a Wi-Fi protocol, an RF based communication protocol, an IP based communication protocol, a cellular communication protocol, a UWB technology-based protocol, or other forms of communication including both proprietary and non-proprietary communication protocols.

The control component 404 can include hardware, software, or a combination of hardware and software that facilitates controlling operation of the 2D/3D panoramic capture device 400. For example, in some embodiments, the 2D/3D panoramic capture device 400 can be remotely controlled/operated via control signals provided by an external device (e.g. user device 106 and/or 3D modeling and navigation server device 112). According to these embodiments, the control component 404 can be configured to interpret control signals received from the external device (e.g. via communication component 402) and cause the 2D/3D panoramic capture device 400 to execute the commands defined by the control signals (e.g. commands associated with the capture of 2D images and 3D data, commands associated with movement of the 2D/3D panoramic capture device 400, including rotation of a rotatable stage, commands associated with processing of captured 2D image and 3D data, commands associated with storage or communication of raw or processed 2D images and 3D data, etc.). In embodiments in which the 2D/3D panoramic capture device 400 includes a tangible user interface that facilitates direct input and control to the 2D/3D panoramic capture device 400, the control component 404 can include hardware (e.g. hard/soft buttons, a touchscreen, etc.) and software associated with the tangible user interface that facilitates providing and executing control commands, such as but not limited to those noted above.

The location component 416 can include hardware, software or a combination of hardware and software that facilitates determining a location of the 2D/3D panoramic capture device 400. Accordingly, the location component 416 can facilitate capturing data for determining precise capture locations of the 2D/3D panoramic capture device 400 relative to other capture locations in association with performance of a scan of an environment when capturing 2D and 3D data for generating an immersive 3D space model of the environment. In one embodiment, the location component 416 can include an IMU 418, and/or accelerometer configured to capture movement data during movement of the 2D/3D panoramic capture device 400 between capture positions. The movement data can be employed (e.g. by processing component 420) to determine the capture position of the 2D/3D panoramic capture device 400 using inertial position tracking, structure-from-motion analysis, SLAM analysis, and the like. In other embodiments, the location component 416 can include one or more video cameras to capture video data during movement of the 2D/3D panoramic capture device and/or control capturing video data from one or more existing cameras associated with the 2D/3D panoramic capture device (e.g., one or more cameras 206) to facilitate determining the locations of the 2D/3D panoramic capture device using visual odometry techniques (e.g., structure-from-motion, SLAM, etc.). In other embodiments, the location component 416 can include stationary sensors, ultrasonic systems, lasers scanners, etc., to facilitate determining a location of the 2D/3D panoramic capture device 400 using visual odometry techniques, line of sight for mapping and localization, time-of-flight mapping and localization, and the like. Still in other embodiments, the location component 416 can determine a location of the 2D/3D panoramic capture device 400 using global positioning system (GPS) technology.

The circuitry 408 can include hardware, software or a combination of hardware and software employed to facilitate operation of the various components of the 2D/3D panoramic capture device 400. For example, the circuitry 408 can include, but is not limited to: circuitry for the cameras 206, circuitry for the depth detection component(s) 204 and associated depth sensor devices (e.g. time-of-flight sensor devices, structured light sensor devices, LiDAR devices, assisted stereo systems and associated components, etc.), IMUs, motors and/or rotation mechanisms in embodiments including a rotatable stage (rotatable mount 302), communication component 402 hardware (e.g. antennas, transmitters, receivers, transceivers repeaters, etc.), and the like. The circuitry 408 can facilitate various operations of the 2D/3D panoramic capture device 400, including but not limited to, capture of 2D images and 3D data, control of the capture of the 2D images and 3D data, 2D and 3D panoramic video capture, control of processing of the 2D images and 3D data, and wireless communication mode operations of the 2D/3D panoramic capture device 400. The 2D/3D panoramic capture device 400 further includes power source 410 to drive the operations of the 2D/3D panoramic capture device 400 and to provide power to the various electrical components of the 2D/3D panoramic capture device 400. In one or more embodiments, the power source 410 includes but is not limited to, a battery, a capacitor, a charge pump, or another suitable power source.

With reference to FIGS. 1 and 4, as previously discussed, 3D panoramic imagery including 2D images and 3D data captured by a 2D/3D panoramic capture device described herein (e.g. 2D/3D panoramic capture devices 102, 200, 300, 400 and the like) can be processed in order to generate panoramic color photographs as well as more advanced panoramic data such as but not limited to: panoramic color videos, panoramic 3D depth images (e.g. a 3D depth map or model), and panoramic 3D depth video. In addition, a plurality of panoramic images and/or video clips captured by the 2D/3D panoramic capture device at different nearby locations can be combined and aligned using the 3D data respectively associated therewith (as well as information regarding camera and depth sensor device capture position and orientation) to generate immersive 3D space models.

Various aspects of such processing of 2D image and 3D depth data captured by the 2D/3D panoramic capture devices described herein (e.g. 2D/3D panoramic capture devices 102, 200, 300, 400 and the like), can be performed at the 2D/3D panoramic capture device (e.g. via primary processing component 104), at the user device 106 via secondary processing component 110), and/or at the 3D modeling and navigation server device 112 (e.g. via the tertiary processing component 114). In this regard, the 2D/3D panoramic capture device 400 can be communicatively coupled to processing component 420 to perform one or more of the various processing functionalities described above. In some embodiments, the 2D/3D panoramic capture device 400 can include processing component 420 (e.g. stored in memory 412). In other embodiments, sub-components of the processing component 420 can be distributed between the primary processing component 104, the secondary processing component 110, and the tertiary processing component 114. In another embodiment, sub-components of processing component 420 can be distributed between the primary processing component 104 and the secondary processing component 110. In yet another embodiment, sub-components of processing component 420 can be distributed between the primary processing component 104 and the tertiary processing component 114. Still in yet another embodiment, sub-components of processing component 420 can be distributed between the secondary processing component 110 and the tertiary processing component 114. Further, in some embodiments, all sub-components of processing component 420 can be provided at the secondary processing component 110 or the tertiary processing component 114. The various sub-components and associated features and functionalities of processing component 420 are discussed in greater detail below with respect to FIG. 5.

Figure 5:
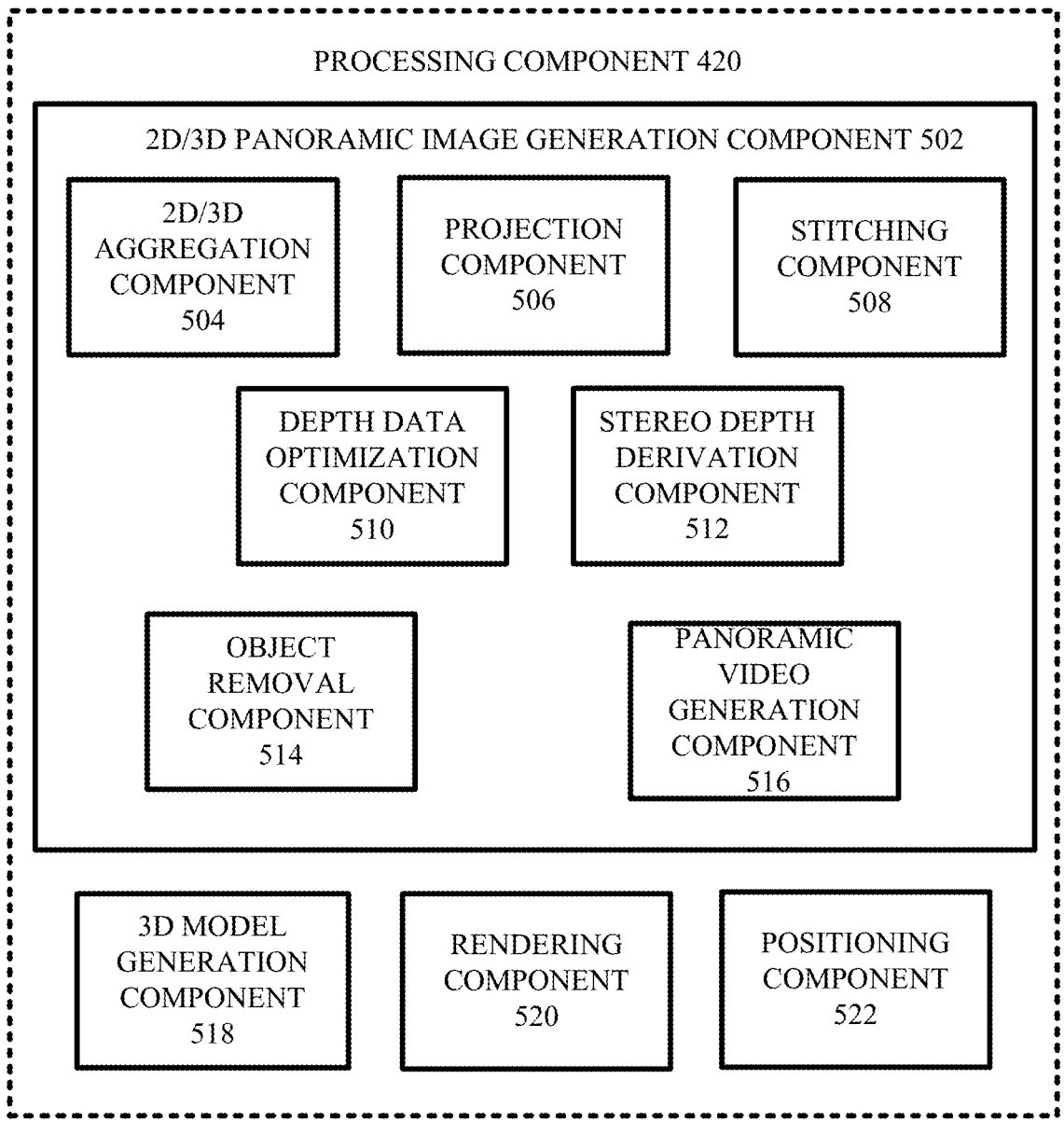
FIG. 5 presents a schematic block diagram of an example processing component that facilitates processing and aligning captured panoramic image and depth data in accordance with various aspects and embodiments described herein.

FIG. 5 presents a schematic block diagram of example processing component 420 in accordance with various aspects and embodiments described herein. In various embodiments, the processing component 420 can include 2D/3D panoramic image generation component 502, to facilitate generating panoramic 2D images, panoramic 3D images and 3D models of an environment. In various embodiments, the 2D/3D panoramic image generation component 502 can facilitate generating panoramic 2D images, panoramic 3D images, and 3D models in association with capture of data (e.g., 2D image data, video data, depth data, movement data, positional/location data, etc.) by a 2D/3D panoramic capture device. In this regard, the 2D/3D panoramic image generation component 502 can facilitate generating panoramic 2D images, panoramic 3D images, and 3D models as the cameras (e.g., cameras 206), the depth detection components (e.g., depth detection component 204) and other potential input devices are regularly or continuously capturing and inputting data. The 2D/3D panoramic image generation component 502 can also facilitate generating panoramic 2D images, panoramic 3D images and 3D models in a static environment. In this regard, the 2D/3D panoramic image generation component 502 can facilitate generating panoramic 2D images, panoramic 3D images and 3D models after a capture process has been completed and the 2D/3D panoramic capture device no longer captures and provides any additional data (e.g., 2D image data, video data, depth data, movement data, positional/location data, etc). The 2D/3D panoramic image generation component 502 can include 2D/3D aggregation component 504, projection component 506, stitching component 508, depth data optimization component 510, stereo depth derivation component 512, object removal component 514, and panoramic video generation component 516. In some embodiments, the processing component 420 can further include 3D model generation component 518, rendering component 520, and positioning component 522. Repetitive description of like elements employed in respective embodiments is omitted for sake of brevity.

The 2D/3D panoramic image generation component 502 can be configured to efficiently (e.g. in real-time or substantially real-time) merge and align 2D images and 3D depth data captured by the 2D/3D panoramic capture device 400, (and other 2D/3D panoramic capture devices described herein), to generate a 2D panoramic image and/or a 3D panoramic depth image (e.g. a 3D depth map or model). In some implementations, the 2D/3D panoramic image generation component 502 can further merge and align 2D images and 3D data captured by the 2D/3D panoramic capture device 400 (and other 2D/3D panoramic capture devices described herein), to facilitate generating 2D panoramic video and/or a 3D panoramic video.

In various embodiments, the panoramic image generation component 502 can employ information regarding known positions and orientations of the respective cameras (e.g. cameras 206) that captured the respective 2D images and known positions and orientations of the respective depth sensor devices that captured the 3D depth data to align the 2D images and the 3D depth data, respectively, and to correlate the 3D depth data with the respective 2D images. For example, based on known capture positions and fields-of-view of the respective cameras 206 and known capture positions and fields-of-view of the respective depth sensor devices associated with the depth detection components 204, the panoramic image generation component 502 can determine relative positions of respective visual features (e.g. pixels, objects, etc.) included in the respective 2D images. In embodiments in which the 2D/3D panoramic capture device 400 includes a rotatable mount (e.g. rotatable mount 302) including one or more cameras and/or a depth sensor devices configured to capture 2D and/or 3D data at different positions over a rotation period, the 2D/3D panoramic image generation component 502 can be configured to determine the capture positions and orientations of the respective cameras and/or depth sensor devices. For example, the 2D/3D panoramic image generation component 502 can determine the capture position associated with each 2D image or 3D data set based on known information regarding a starting position of the camera and/or depth sensor device, a rotation speed or schedule of the rotatable mount, and a capture time of each 3D data set.

In one or more implementations, the 2D/3D aggregation component 504 can be configured to aggregate 2D image data and 3D depth data captured by a 2D/3D panoramic capture device described herein (e.g. 2D/3D panoramic capture device 200, 300 and 400) to facilitate accurately aligning the 2D images relative to one another (e.g. by the stitching component 508) in association with generating a panoramic 2D image and panoramic 3D image. For example, in some implementations the aggregation component 504 can be configured to aggregate overlapping 2D image data and 3D depth data. Such aggregation can include aggregating multiple 2D image frames and/or 3D data sets captured as video. Similarly, the 2D/3D aggregation component 504 can be configured to aggregate 3D depth data to facilitate aligning the 3D depth data in association with generating a panoramic 3D depth image. For example, the 2D/3D aggregation component 504 can be configured to aggregate overlapping 3D depth data, including sets of depth video data and overlapping depth data obtained from different types of depth sensor devices. Likewise, the 2D/3D aggregation component 504 can aggregate sets of 3D depth data obtained from one or more depth sensor devices of the 2D/3D panoramic capture device, wherein the respective sets cover different horizontal and/or vertical areas or volumes. For example, the 2D/3D aggregation component 504 can aggregate sets of 3D data respectively captured via different LiDAR beams.

The projection component 506 can be configured to project 2D image data and 3D depth data to a common spatial 3D coordinate space to facilitate accurately aligning 2D images in association with generating a 2D panoramic image as well as sets of 3D data (e.g. respectively captured from different depth sensor devices or depth detection components 204 and/or at different azimuth angles of rotation) in association with generating an aligned panoramic 3D image (e.g. a 3D depth map or model). The projection component 506 can project 2D image data and 3D depth data to a common spatial 3D coordinate space based on known capture positions and orientations of the 2D image data and 3D depth data to facilitate determining or associating 3D coordinates with respective visual features included in the 2D images relative to the common 3D coordinate space. For example, the projection component 506 can merge 2D image data and 3D depth data from multiple sources (e.g. different cameras and depth sensor devices) and multiple capture positions (e.g. different azimuth angles or orientations) into a discretized sinusoidal projection (or another type of projection). The projection component 506 can transform each 3D point included in the captured 3D depth data into the sinusoidal map's coordinate space and assign it to a discretized cell. The projection component 506 can average multiple points mapped to the same cell to reduce sensor noise while detecting and removing outlier readings from the average calculation. The 2D/3D panoramic image generation component 502 can further generate panoramic 3D images (e.g., point clouds, depth maps, etc.) based on the projected points relative to the 3D coordinate space. This can be performed by the projection component 506 on the fly and the generated 3D panoramic images can be rendered to a user to provide live (e.g. real-time or substantially real-time) feedback during the capture process. In some implementations, the 3D panoramic images can include colored point clouds. For example, the projection component 506 can employ the depth data to create a sinusoidal depth map or a point cloud comprising 3D points projected onto a common 3D spatial coordinate plane. The projection component 506 can further apply pixel color data to the depth map or point cloud by projecting the color data onto the depth map or point cloud. This can involve casting rays out from the color cameras along each captured pixel towards the interesting portion of the depth map or point cloud to colorize the depth map or point cloud. The colored depth map or point cloud can further be rendered in real-time or substantially real time (e.g. via rendering component 520) at a display (e.g. display 108 of user device 106).

Depending on the hardware configuration of the 2D/3D panoramic capture (e.g., 2D/3D panoramic capture device 102, 200, 300, 900, 1200 and the like) and the visual characteristics of the environment being scanned, some depth data captured by the 2D/3D panoramic capture device may be sparse, incomplete and/or inaccurate due to failure modes of an active depth sensor device or sparse/low-resolution data from passive or active stereo methods. For example, passive stereo based depth derivation is generally insufficient for surfaces with uniform color. In another example, it may be impractical, cost prohibitive and/or inefficient (e.g. with respect to capture process time) to employ a depth sensor device configuration that provides extensive panoramic depth coverage. In some embodiments in which hardware configurations of the 2D/3D panoramic capture device provides only sparse 3D points (e.g. passive stereo, visible light/laser assisted stereo), the sparse depth data may be insufficient for a point cloud visualization. In these cases, the projection component 506 can apply plane-fitting to the sparse 3D depth points to generate a low-fidelity piecewise-planar approximation of the 3D space, optionally using prior assumptions like horizontal floors, vertical walls, etc. to improve results. The projection component 506 can further apply color and/or texture to the recovered planes using the 2D panoramic image data and the resulting visualization including colored and/or textured planes can be rendered via rendering component 520.

In some embodiments, the 3D depth data, (including the 3D depth data projected by projection component 506), can include 3D depth data obtained from different sensor and/or depth derivation modalities having different strengths and weaknesses. For example, time-of-flight sensor devices are capable of generating 3D depth data for surfaces with uniform color where passive stereo fails. However, 3D data determined using passive stereo techniques can provide depth measurements for a longer range relative to time-of-flight based 3D depth data, has higher resolution, is not prone to temporal noise, and is not susceptible to distortions like multipath interference. Thus, in various embodiments, the 2D/3D panoramic capture devices described herein can employ two or more different types of depth sensor devices and/or depth derivation modalities to capture and/or generate depth data. The different modalities can include but are not limited to: time-of-flight based depth detection, structured light based depth detection, LiDAR based depth detection, light/laser assisted or active stereo based depth detection, and passive stereo based depth detection. For example, in various embodiments, the one or more depth detection components 204 of 2D/3D panoramic capture device 400 can include one or more time-of-flight sensor devices and the one or more depth detection components 204 can generate and/or determine time-of-flight based depth information. In another example, the one or more depth detection components 204 of 2D/3D panoramic capture device 400 can capture and determine 3D data from one or more structured light sensor devices and/or one or more LiDAR sensor devices. The 2D/3D panoramic capture device 400 can further employ an active stereo system, wherein the one or more depth detection components 204 include a light projection unit configured to project some form of light during capture of stereo images via stereo cameras included in the depth detection components 204 and/or via pairs of cameras 206. Still in other embodiment, the 2D/3D panoramic capture device 400 can generate stereo images and determine depth information using passive stereo processing functions.

The depth data optimization component 510 can be configured to analyze 3D depth data obtained from different sensor and/or depth derivation modalities to determine an optimized unified interpretation of the depth data. In particular, the depth data optimization component 510 can analyze different types of depth data captured and/or determined using different types of depths sensor devices and/or depth derivation techniques to determine optimized spatial coordinates for 3D points collectively represented by the depth data. For example, the depth data optimization component 510 can combine the different types of depth data associated with the same area, volume, cell or 3D point to determine an average or optimized 3D spatial position for the area, cell, volume or 3D point. For instance, the depth data captured by a 2D/3D panoramic capture device can include sets of different types of depth data respectively captured by different types of depth sensors devices and/or determined using different types of depth derivation techniques (e.g. passive stereo depth derivation techniques, active stereo depth derivation techniques, etc.). In one implementation, the depth data optimization component 510 can be configured to combine subsets of the different sets of depth data associated with the same three-dimensional volume to determine spatial positions for points included in the same three-dimensional volume. In an aspect, the depth data optimization component 510 can employ a heuristic to evaluate the quality of 3D depth data captured of the same space from the same location and with different depth detection modalities to determine a unified interpretation of the depth data. The depth data optimization component 510 can further employ known strengths and weaknesses of the respective depth data sources to determine a degree of accuracy associated with each of the applicable sources and merge the depth data from each of the applicable sources in a principled way to determine optimized depth information. Accordingly, the multiple sources of 3D data can be combined to cover each other's weaknesses to produce more accurate and/or complete depth data than one of the sources alone.

The stereo depth derivation component 512 can be configured to determine depth information using passive stereo and/or active stereo processing functions. Passive stereo processing involves comparison of two stereo images displaced horizontally from one another and providing two different views of a scene. By comparing these two images, the relative depth information can be obtained in the form of a disparity map which encodes the difference in horizontal coordinates of corresponding image points. The values in this disparity map are inversely proportional to the scene depth at the corresponding pixel location. In particular, given two stereo images acquired from slightly different viewpoints (e.g. neighboring cameras 206), the stereo depth derivation component 512 can employ a passive stereo matching function that identifies and extracts corresponding points in both images. Knowing these correspondences, the capture positions of the images and the scene structure, the 3D world coordinates of each image point can be reconstructed by triangulation. The disparity, where the depth data is encoded, represents the distance between x-coordinates or a pair of correspondent points in left and right images. Active stereo processing employs light emission (e.g. via a laser, a structured light device, or the like) in association with capture of stereo images to facilitate stereo matching. The word "active" signifies that energy is projected into the environment. In an active stereo vision system, a light projection unit or a laser unit projects a light or light pattern at a time (or multiple sheets of light simultaneously) onto the scene in association with capture of stereo images. The light patterns detected in the captured stereo images can be employed to facilitate extracting depth information for features included in the respective images. For example, the stereo depth derivation component 512 can perform active stereo analysis by finding correspondences between visual features included in respective images based in part on correspondences between light appearing in the respective images and known positions of the light/laser beams relative to the image capture positions.

In one or more implementations, the stereo depth derivation component 512 can employ machine learning methods such as random forest classifiers or artificial neural networks to learn a matching function for finding key point correspondences between the 2D images using a large corpus of globally-aligned RGB-D images as training data. Similarly, machine learning can be used to learn a matching function for dense stereo correspondence. This can be used to obtain better depth maps during capture for hardware configurations that rely on passive or active stereo, and can improve depth-assisted stereo post-processing in all hardware configurations.

In one or more implementations, the stitching component 508 can be configured to align or "stitch together" respective 2D images captured by a 2D/3D panoramic capture device (e.g., 2D/3D panoramic capture device 400) to generate a panoramic 2D image. For example, the stitching component 508 can also employ known positions and orientations of the respective cameras (e.g. cameras 206) that captured the respective 2D images to align and order the respective 2D images. The stitching component 508 can also employ depth information regarding relative positions of respective visual features included in the respective 2D images to further align the respective 2D images to one another in association with generating a 2D panoramic image. In some implementations, the stitching component 508 can perform reverse-projecting of color data from colored point clouds or depth maps generated by the projection component 506 to create a 2D panorama. By reverse-projecting color data from a colored point cloud or 3D depth map onto an intersecting point or area of a 2D panorama, the stitching component 508 can fill in any possible small holes in the panorama with neighboring color data, thereby unifying exposure data across the boundaries between 2D images (if necessary). The stitching component 508 can further perform blending and/or graph cuts at the edges to remove seams. The stitching component 508 can also align sets of 3D data based on information regarding capture positions and orientations of the respective sets of 3D data to generate 3D panoramic images (e.g. 3D models, depth maps, etc.).

The object removal component 514 can be configured to remove unwanted objects appearing in captured 2D image data and/or 3D depth data so that a final 2D and/or 3D panoramic image generated by the 2D/3D panoramic image generation component 502 based on the 2D image data and/or 3D depth data does not include the unwanted object. In particular, in certain applications, moving objects or people included in captured image data may be desired to be removed from a 2D panoramic image, 2D panoramic video, 3D panoramic image or model, and/or 3D panoramic video. For example, in hardware configurations where cameras (e.g. cameras 206) span the majority of the viewing sphere, such as with 2D/3D panoramic capture devices 200, 300 and 400, in some implementations the camera operator is likely to be seen in image data captured by at least one of the respective cameras, which may be undesirable. The object removal component 514 can facilitate removing such objects from final compilations of captured 2D and/or 3D data.

In some implementations, the object removal component 514 can combine 2D images captured of the same space from the same capture location and orientation to identify an object that was temporarily included in the space (e.g. such as a moving object or the camera operator). The object removal component 514 can then subtract the object from the combined image data and/or remove the 2D image or images including the moving object from the 2D data set. For example, the cameras (e.g. cameras 206) of the 2D/3D panoramic capture device 400 can be configured to continuously capture image data for two or more frames over an interval of several seconds. The operator or moving object should only occupy a particular pixel for a small number of frames, so taking the median color and maximum depth value should result in the static scene structure being represented in the final images. Accordingly, the object removal component 514 can analyze the respective 2D image captures and determine either the median color (requires at least three frames) or the color of the farthest 3D reading for each corresponding pixel. The 2D/3D panoramic image generation component 502 can further generate the 2D or 3D panoramic image using the median or farthest 3D color for the corresponding pixel.

In another implementation, as the operator walks around the camera (e.g. when the camera is placed on or mounted on a stationary apparatus, such as a tripod), the respective cameras 206 (as well as the respective depth detection components 204) can be configured to only capture data when the operator is not visible. The location of the operator may be estimated by various means. For example, the location of the operator may be estimated using a depth map wherein object removal component 514 determines that the closest object to the camera is likely the operator. The object removal component 514 can also determine that the operator is likely to appear at color pixels whose values are changing rapidly. In another example, the operator may appear at the beginning of capture (e.g. in an initial 2D capture image), or in one of the 2D capture images and the object removal component 514 can employ machine learning to identify the appearance of the operator in the other images. The object removal component 514 can further remove the operator from all images. Similarly, each camera of the 2D/3D panoramic capture device can be configured to capture a single 2D image and the object removal component 514 can identify the operator using object recognition software configured that detects human figures or human parts in image data. The object removal component 514 can further remove the detected human figure or human parts from the respective images.

In some embodiments, the object removal component 514 can facilitate ensuring the 2D/3D panoramic capture device captured sufficient image data to enable removing unwanted objects (e.g., human figures or parts of human figures) from a 2D panorama generated based on the image data. For example, in connection with the capture process, the object removal component 514 can identify image data that comprises human figures, human parts or other predefined unwanted objects. The object removal component 514 can further determine whether the 2D/3D panoramic capture device has captured sufficient redundant image data corresponding to the image data comprising the unwanted object(s), yet not comprising background data without the unwanted object(s), to allow for performing object removal. If sufficient redundant image data has been captured, the object removal component 514 can alert the 2D/3D panoramic capture device (or the operator of the 2D/3D panoramic capture device) to this fact so that the 2D/3D panoramic capture device can stop capturing data at that point. However, if insufficient redundant data has not been captured, the object removal component 514 can facilitate directing the 2D/3D panoramic capture device (or an operated of the 2D/3D panoramic capture device) to capture the needed image data without the unwanted object(s). For example, in some embodiments, the object removal component 514 can detect human motion in captured image data during the capture process. According to these embodiments, the object removal component 514 can direct the camera(s) of the 2D/3D panoramic capture device to continue capturing image data (e.g., at the same position/orientation), until the motion is no longer detected. For example, the camera can keep capturing image data until it's seen enough data in the area of the motion to be confident it's seen the background without the moving object. In another embodiment in which the object removal component 514 is configured to identify human figures and/or human parts (e.g., using existing object recognition techniques, using a trained machine learning system, etc.), the object removal component 514 can direct the camera(s) of the 2D/3D panoramic capture device to stop capturing image data once it has acquired background data in every location where it detected a human figure or part.

In some implementations, after an object or human figure (e.g. the operator) has been identified in an image, the object removal component 514 can further mask out the object or human figure in the final 2D panoramic image or 3D depth image. For example, the object removal component 514 can mask out the object or human figure in the respective 2D images and the 2D/3D panoramic image generation component 502 can determine color and depth data for filling the masked out regions using computer vision. In some implementations, the 2D/3D panoramic image generation component 502 can determine image and depth for the masked out regions based on other 2D and 3D image data captured at nearby locations and re-projected (e.g. by projection component 506) onto the location of the masked out region on a sinusoidal map generated for the collective 2D/3D data by the projection component 506. The result may still be incomplete, so depth and color may be in-filled using computer vision methods, such as those described in as in *Semantic Image Inpainting with Perceptual and Contextual Losses. Raymond Yeh, Chen Chen, Teck Yian Lim, Mark Hasegawa-Johnson, Minh N. Do. arXiv:*1607.07539, the entirety of which is incorporated herein be reference.

The 2D/3D panoramic image generation component 502 can further include panoramic video generation component 516 to facilitate creating 2D and 3D panoramic video from captured 2D and 3D panoramic video data. For example, 360° 3D video (or images) may be created if the hardware configuration of the 2D/3D panoramic capture device has both color and depth sensor devices whose collective fields-of-view span up 360° horizontally, such as with 2D/3D panoramic capture device 200 and the like. In particular, one or more cameras 206 of 2D/3D panoramic capture device 400 can be configured to capture video (e.g. continuously capture images over a period of time at a desired frame rate) Likewise, one or more of the depth detection component 204 can be configured to capture depth video data.

In one or more implementations, the panoramic video generation component 516 can generate 3D video for viewing using a virtual reality (VR) headset. According to these embodiments, using the stitching component 508, the panoramic video generation component 516 can stitch the color image frames into a spherical RGB panorama representing the left-eye's view of the scene. However, a single perfect "right eye" panorama cannot be created because the viewing position changes as the user's head rotates. However, the panoramic video generation component 516 can employ various techniques to generate a visualization for the right eye. For example, in one implementation, the panoramic video generation component 516 can dynamically create a visualization for the right eye in real-time at the time of playback using available 3D depth maps and known head position of the viewer every time frame (obtained from the VR application program interface (API)). The left-eye's color panorama can be projected to the right-eye's viewing position (e.g. using projection component 506). This will result in problematic depth shadows in areas not visible by the left eye but would be visible in the right eye, so color data will have to be estimated on-the-fly.

On-the-fly projection is computationally expensive. Accordingly, in another embodiment, the panoramic video generation component 516 can generate a pre-computed right-eye (or left-eye) panoramic image for every video frame. For example, for each left eye panoramic image, the panoramic video generation component 516 can approximate and generate a right-eye panoramic image that is visually accurate from a perspective directly in front of the user yet becomes less accurate towards the periphery. Briefly, a thin slice of the panorama is created corresponding to each discretized position of the right eye; as the slice size approaches zero, the deformations become continuous and present no discontinuities at their seams. In practice, larger slices may be used, and visible seams may be mitigated using (for example) graph cuts.

In some implementations, it may be inefficient or cost prohibitive from a processing perspective or a storage perspective to have each of the cameras of the 2D/3D panoramic capture device 400 continuously capture video. Thus in some embodiments, the one or more of the cameras 206 and/or the depth detection components 204 of the 2D/3D panoramic capture device 400 can be configured to capture video data that collectively spans less than an entire 360° view. In embodiments in which image video data and/or depth video data is captured for less than an entire 360° view, the panoramic video generation component 516 can be configured to align the video data with a static 2D panoramic image and/or 3D panoramic image generated for the environment. The panoramic video generation component 516 can further fill the missing video data with the corresponding static part of the 2D/3D panoramic imagery during playback. Thus the panoramic video generation component 516 enables creation of panoramic video while balancing concerns associated with processing and storage costs.

The 3D model generation component 518 can be configured to employ 2D panoramic images and 3D panoramic images/model/depth maps captured from different nearby locations in an environment to generate an immersive 3D model of the environment. For example, the 3D model generation component 518 can employ a global alignment process that includes further aligning the 3D panoramic images/models/depth maps (e.g. which respectively include aligned sets of panoramic 3D depth data) to one another relative to a 3D coordinate space. The 3D model generation component 518 can also employ the 2D panoramic images and associated aligned depth maps to generate various representations or visualizations of the 3D model from different perspectives or views of a virtual camera position outside or within the 3D model. These representations can include one or more of the captured 2D images, 2D panoramas and/or image data from one or more of the 2D images.

The 3D model(s) generated by 3D model generation component 518 generally include one or more meshes of triangles, quads, and/or n-gons. The terms 3D model, 3D representation of an object or environment, and mesh are used herein interchangeably. The 3D model(s) can also include curved surfaces such as NURBS, which are a function of two parameters mapped to a common surface area in 3D space. The 3D model(s) can also include point clouds or surfel clouds. In some aspects, the 3D model(s) can have associated color or material properties. For example, each vertex of a mesh can contain associated texture data in one or more separate images via UV mapping. Examples of common 3D model formats include ".obj", ".fbx", and ".dae."

In one or more embodiments, the alignment process can involve determining position (e.g., relative to a 3D coordinate space) and visual feature data for respective points in received 2D images and 2D panoramas associated with known camera capture positions and orientations relative to a global 3D coordinate space or volume. The 2D images and panoramas, 3D data respectively associated with the 2D images and 2D panoramas, feature data, and other sensor data (if available) can then be used as inputs to an algorithm that determines potential alignments between the different 2D images and 2D panoramas via coordinate transformations. These potential alignments are evaluated for their quality, and once an alignment of sufficiently high relative or absolute quality is achieved, the 2D images/panoramas may be aligned together. Through repeated alignments of new 2D images/panoramas (as well as potential improvements to alignments of existing data sets), a global alignment of all or most of the input 2D images/panoramas into a single coordinate frame may be achieved. Additional details regarding the alignment process are further provided in U.S. Pat. No. 8,879,828 filed on Jun. 29, 2012, and entitled "CAPTURING AND ALIGNING MULTIPLE 3-DIMENSIONAL SCENES," and U.S. Pat. No. 9,324,190 filed on Feb. 23, 2013 and entitled "CAPTURING AND ALIGNING MULTIPLE 3-DIMENSIONAL SCENES," the entireties of which are incorporated herein by reference.

The rendering component 520 can be configured to render aligned 2D and 3D data in association with the capture process (e.g. in real-time) and/or after the capture process. For example, the rendering component 520 can generate and/or display (e.g. via display 108) a graphical user interface including a 2D panoramic image, and/or 3D panoramic image (e.g. a depth map, a 3D colored point cloud, etc.) generated by the 2D/3D panoramic image generation component 502 based on captured panoramic 2D images and captured and/or determined panoramic 3D depth data. The rendering component 520 can also render a panoramic 2D video and/or 3D video generated by the panoramic video generation component 516. In various embodiments, the 2D/3D panoramic image generation component 502 can be configured to generate such 2D and 3D panoramic imagery in real-time or substantially real-time as the 2D image data and 3D depth data is captured by the 2D/3D panoramic capture device 400. Accordingly, a user viewing the rendered 2D panoramic image and/or 3D panoramic image can be provided with live or substantially live feedback during the capture process.

The rendering component 520 can further be configured to generate and/or display a graphical user interface including a 3D space model generated by the 3D model generation component 518 based on 2D panoramic image data and 3D panoramic depth data captured at different nearby capture locations of the 2D/3D panoramic capture device 400 in association with performance of a scan. Accordingly, each time the 2D/3D panoramic capture device 400 captures new panoramic 2D image data and 3D depth data of an environment at a new location, the 3D model generation component 518 can generate an updated version of the 3D space model based on the new and previously captured panoramic 2D image data and 3D depth data captured. The rendering component 520 can render each updated 3D space model to further provide live visual feedback during a scan. In some embodiments, based on review of the live feedback provided by the rendering component 520, the capture process can be paused at any point and resumed from another angle or position looking at the object or space from a different perspective and location. This allows for refining of the captured data or allowing the user to avoid certain obstacles or objects of non-interest, or to manage external system interruptions such as system notifications. Additional details regarding rendering aligned 2D and 3D data during the capture process are provided in U.S. Pat. No. 9,324,190 filed on Feb. 23, 2013 and entitled "CAPTURING AND ALIGNING MULTIPLE 3-DIMENSIONAL SCENES," the entirety of which is incorporated herein by reference.

Figure 6:
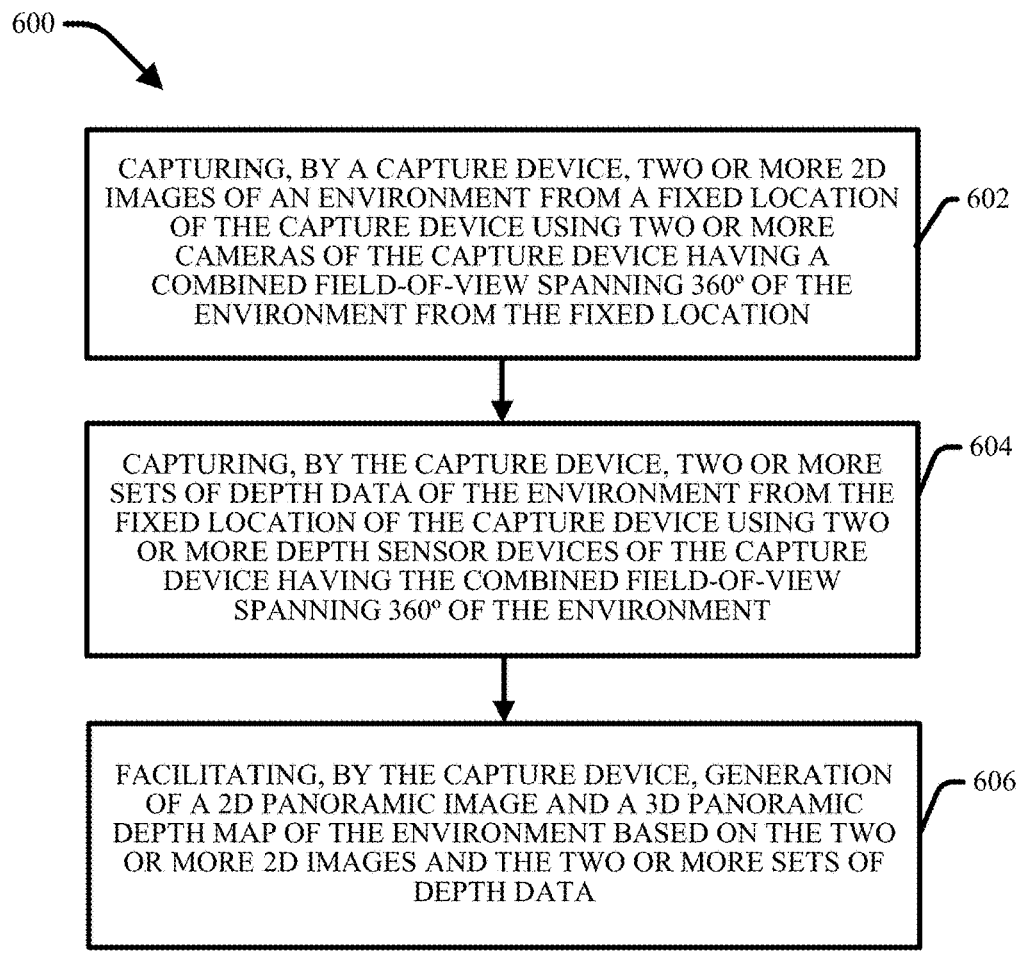
FIG. 6 provides a flow diagram of an example method for generating 2D and 3D panoramic images in accordance with various aspects and embodiments described herein.
Figure 7:
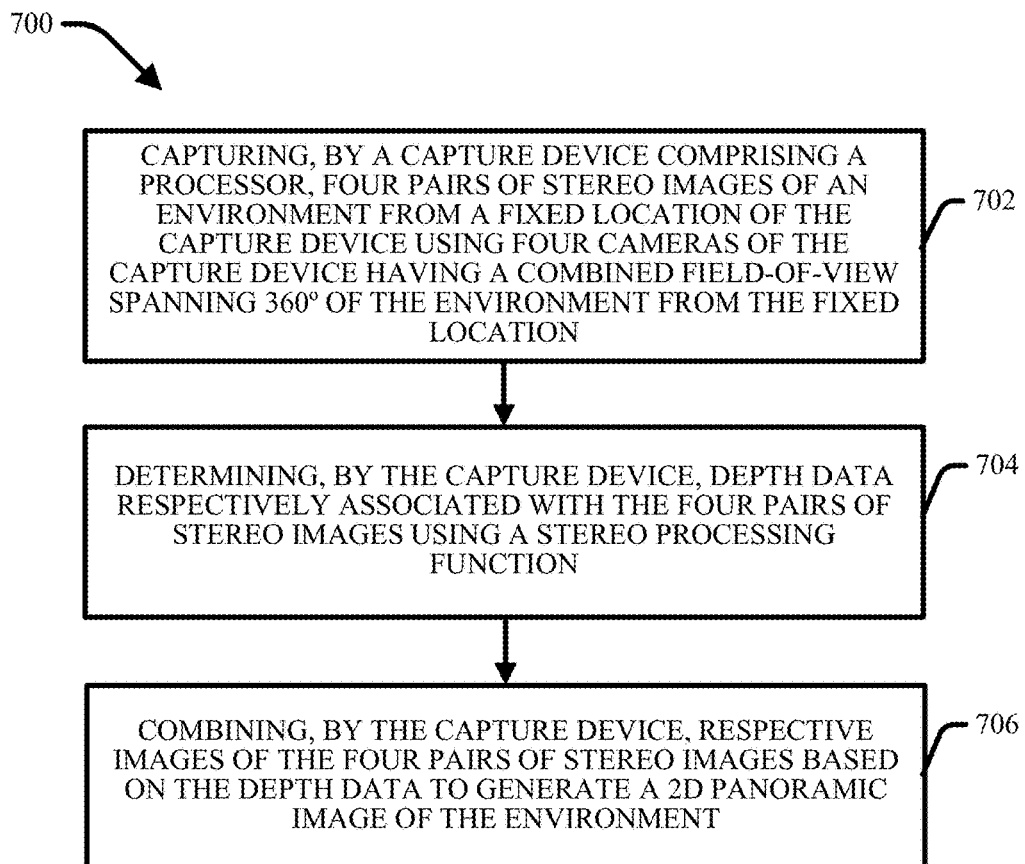
FIG. 7 provides a flow diagram of another example method for generating 2D and 3D panoramic images in accordance with various aspects and embodiments described herein.
Figure 8:
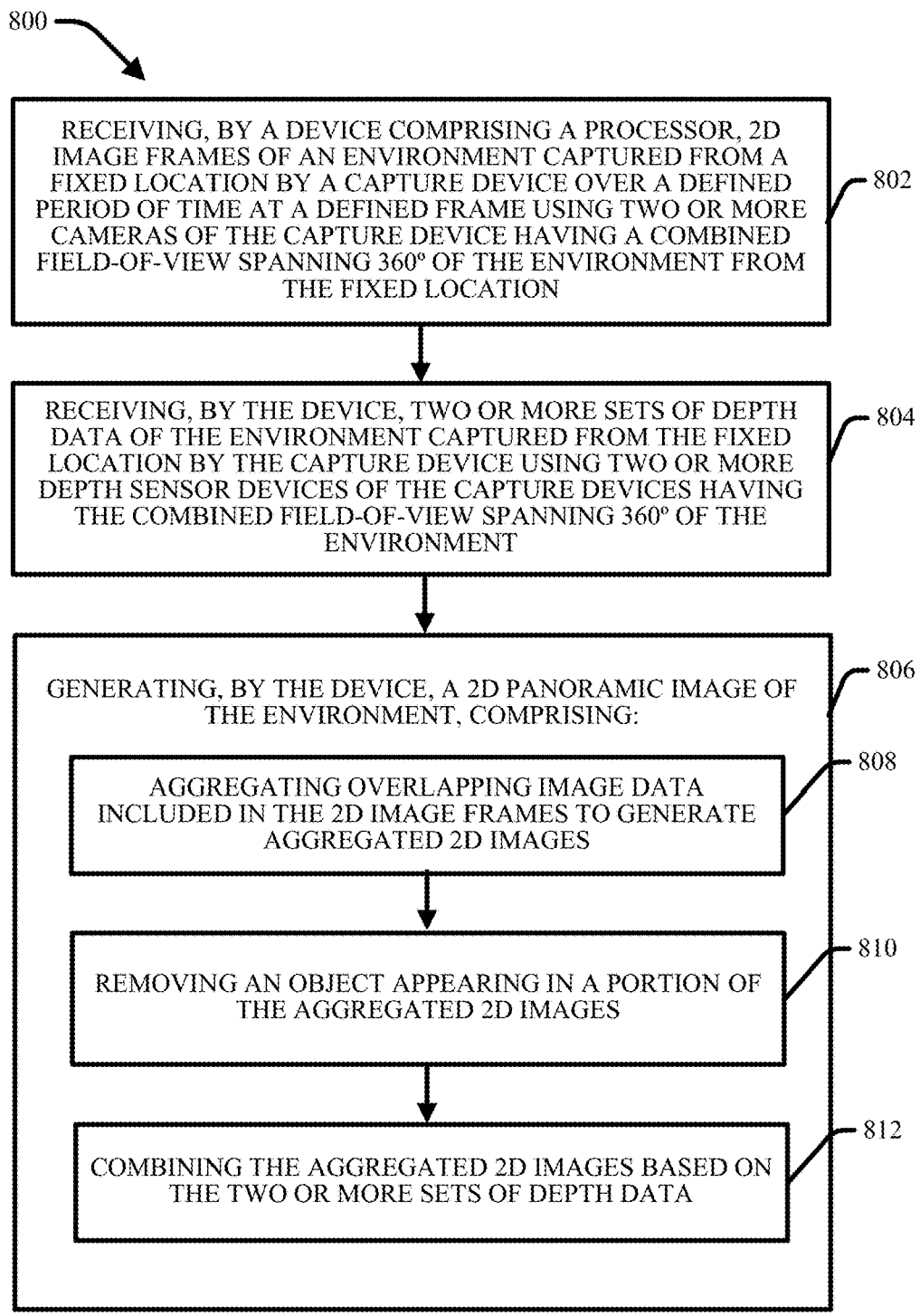
FIG. 8 provides a flow diagram of another example method for generating 2D and 3D panoramic images in accordance with various aspects and embodiments described herein.

FIGS. 6-8 provide flowcharts of example methods in view of the example systems, apparatus, and non-transitory computer readable storage mediums described herein. For purposes of simplicity of explanation, example methods disclosed herein are presented and described as a series of acts; however, it is to be understood and appreciated that the disclosed subject matter is not limited by the order of acts, as some acts may occur in different orders and/or concurrently with other acts from that shown and described herein. For example, a method disclosed herein could alternatively be represented as a series of interrelated states or events, such as in a state diagram. Moreover, interaction diagram(s) may represent methods in accordance with the disclosed subject matter when disparate entities enact disparate portions of the methods. Furthermore, not all illustrated acts may be required to implement a method in accordance with the subject specification. It should be further appreciated that the methods disclosed throughout the subject specification are capable of being stored on an article of manufacture to facilitate transporting and transferring such methods to computers for execution by a processor or for storage in a memory.

The positioning component 522 can be configured to determine each capture position of a 2D/3D panoramic capture device when moved to different positions in an environment in association with a 3D scan to facilitate global alignment processing by the 3D model generation component 518 using panoramic 2D and 3D data captured at each of the different locations. For example, in some embodiments in which 2D/3D panoramic capture device generates movement data using an IMU during movement of the capture device, the positioning component 522 can process the movement data to determine each capture position of the capture device or device assembly using inertial position tracking. Inertial position tracking can be accomplished using an IMU containing a triad of orthogonally mounted accelerometers, magnetometers, and angular rate sensors. The accelerometers measure the sum of linear acceleration due to movement and gravitation acceleration. The magnetometers measure the direction of the local magnetic field. The triad of angular rate sensors delivers a measure of three dimensional rate of rotation of the module. Measurement of the direction of Earth's gravitational and magnetic field vectors along with the angular rates allow estimation of the orientation of the sensor module using one of several data fusion techniques. These orientation estimates in turn can be used to transform acceleration measurements from the moving body coordinate frame to an Earth fixed reference frame and allow the subtraction of gravitational acceleration from the total acceleration measurement. The remaining acceleration can be double integrated to estimate a position relative to the initial starting point.

In other embodiments in which 2D/3D panoramic capture device captures video imagery during movement of the 2D/3D panoramic capture device to different locations, the positioning component 522 can determine each capture position of the device using visual odometry techniques, including structure-from-motion based analysis and/or simultaneous localization and mapping (SLAM) analysis. SLAM is the computational problem of constructing and/or updating a map of an unknown environment while simultaneously keeping track of an agent's (e.g., the 2D/3D panoramic capture device) location within it. According to these embodiments, the positioning component 522 can process video data captured via one or more video cameras of the 2D/3D panoramic capture device using one or more SLAM analysis techniques to determine an accurate location mapping of the 2D/3D panoramic capture device as it is moved from one location to another in an environment. This allows the 2D/3D panoramic image generation component 502 to auto-align different sets of 2D and 3D data as the 2D/3D panoramic capture device is moved to different locations in the environment. In some implementations, the positioning component 522 can combine video data with depth data (e.g., depth data capture via one or more depth sensors of the 2D/3D panoramic capture device or determined by stereo depth derivation component 512) to improve the accuracy of the location mapping. In addition, in embodiments in which the 2D/3D panoramic capture device includes an inertial measurement unit (IMU) (e.g., IMU 418), the positioning component 522 can employ motion data captured by the IMU during movement of the 2D/3D panoramic capture device to aid in SLAM calculations. Additional details regarding SLAM and structure-from-motion processing suitable for application in association with generating 2D and 3D images and models based on data captured via the subject 2D/3D panoramic capture devices is described in Davison, Andrew J., et al. "*Mono-SLAM: Real-time single camera SLAM.*" *IEEE transactions on pattern analysis and machine intelligence* 29.6 (2007): 1052-1067, the entirety of which is incorporated herein by reference.

Still in other embodiment in which dense depth data is captured by the 2D/3D panoramic capture device at each capture position, the positioning component 522 can employ relative positions of 3D data points captured at different location and orientations of the depth sensor devices that captured the 3D data points to accurately determine the relative capture locations of the 2D/3D panoramic capture device or device assembly.

FIG. 6 provides a flow diagram of an example method 600 for generating 2D and 3D panoramic images in accordance with various aspects and embodiments described herein. Repetitive description of like elements employed in respective embodiments is omitted for sake of brevity.

At 602 a capture device (e.g. panoramic capture device 102, 200 and/or 400) captures two or more 2D images of an environment from a fixed location of the capture device using two or more cameras of the capture device having a combined field-of-view spanning up to 360° of the environment from the fixed location. At 604, the capture device captures two or more sets of depth data of the environment from the fixed location of the capture device using two or more depth sensor devices (e.g. depth detection component 204) of the capture device having the combined field-of-view spanning up to 360° of the environment. At 606, the capture device facilitates generation of a 2D panoramic image and a 3D panoramic depth map of the environment based on the two or more 2D images and the two or more sets of depth data (e.g. using processing component 420). For example, the capture device can include one or more components of processing component 420 to processes the captured 2D and 3D data to generate a panoramic 2D image or 3D image (e.g. depth map, colored point cloud, etc.) In another example, the capture device can send (e.g. via communication component 402), the captured 2D images and 3D depth data to an external device (e.g. user device 106 and/or 3D modeling and navigation server device 112) that includes processing component 420 or one or more components of processing component 420 for processing of the 2D images and 3D depth data in association with generating a panoramic 2D image and/or 3D image.

FIG. 7 provides a flow diagram of another example method 700 for generating 2D and 3D panoramic images in accordance with various aspects and embodiments described herein. Repetitive description of like elements employed in respective embodiments is omitted for sake of brevity.

At 702, a capture device comprising a processor, (e.g. panoramic capture device 102, 200 and/or 400), captures four pairs of stereo images of an environment from a fixed location of the capture device using four cameras of the capture device having a combined field-of-view spanning up to 360° of the environment from the fixed location. For example, the capture device can include four cameras that are spread out along a common horizontal plane 90° apart, with fields of view around 180 degrees, and each adjacent pair of the four cameras forms a stereo pair in the region of overlapping view (e.g., as exemplified via 2D/3D panoramic capture device 200). At 704, the capture device determines depth data respectively associated with the four pairs of stereo images using a stereo processing function (e.g. using stereo depth derivation component 512). At 706, the capture device combines the respective images of the four pairs of stereo images based on the depth data (e.g. via stitching component 508) to generate a 2D panoramic image of the environment.

FIG. 8 provides a flow diagram of another example method 800 for generating 2D and 3D panoramic images in accordance with various aspects and embodiments described herein. Repetitive description of like elements employed in respective embodiments is omitted for sake of brevity.

At 802, a device comprising a processor, (e.g. panoramic capture device 102, 200, 400, user device 106, and/or 3D modeling and navigation server device 112), receives 2D image frames (i.e. video) of an environment captured from a fixed location by a capture device (e.g. panoramic capture device 102, 200, 300 and/or 400) over a defined period of time at a defined frame using two or more cameras of the capture device having a combined field-of-view spanning up to 360° of the environment from the fixed location. At 804, the device receives two or more sets of depth data of the environment captured from the fixed location by the capture device using two or more depth sensor devices of the capture devices having the combined field-of-view spanning up to 360° of the environment. At 806, the device generates a 2D panoramic image of the environment (e.g. using 2D/3D panoramic image generation component 502). The process of generating the 2D panoramic image can comprise aggregating overlapping image data included in the 2D image frames to generate aggregated 2D images at 808 (e.g. via 2D/3D aggregation component 504 and projection component 506), and removing an object appearing in a portion of the aggregated 2D images at 810 (e.g. using object removal component 514). At 812, the process of generating the 2D panoramic image can further comprise combining the aggregated 2D images based on the two or more sets of depth data (e.g. using stitching component 508).

Figure 9:
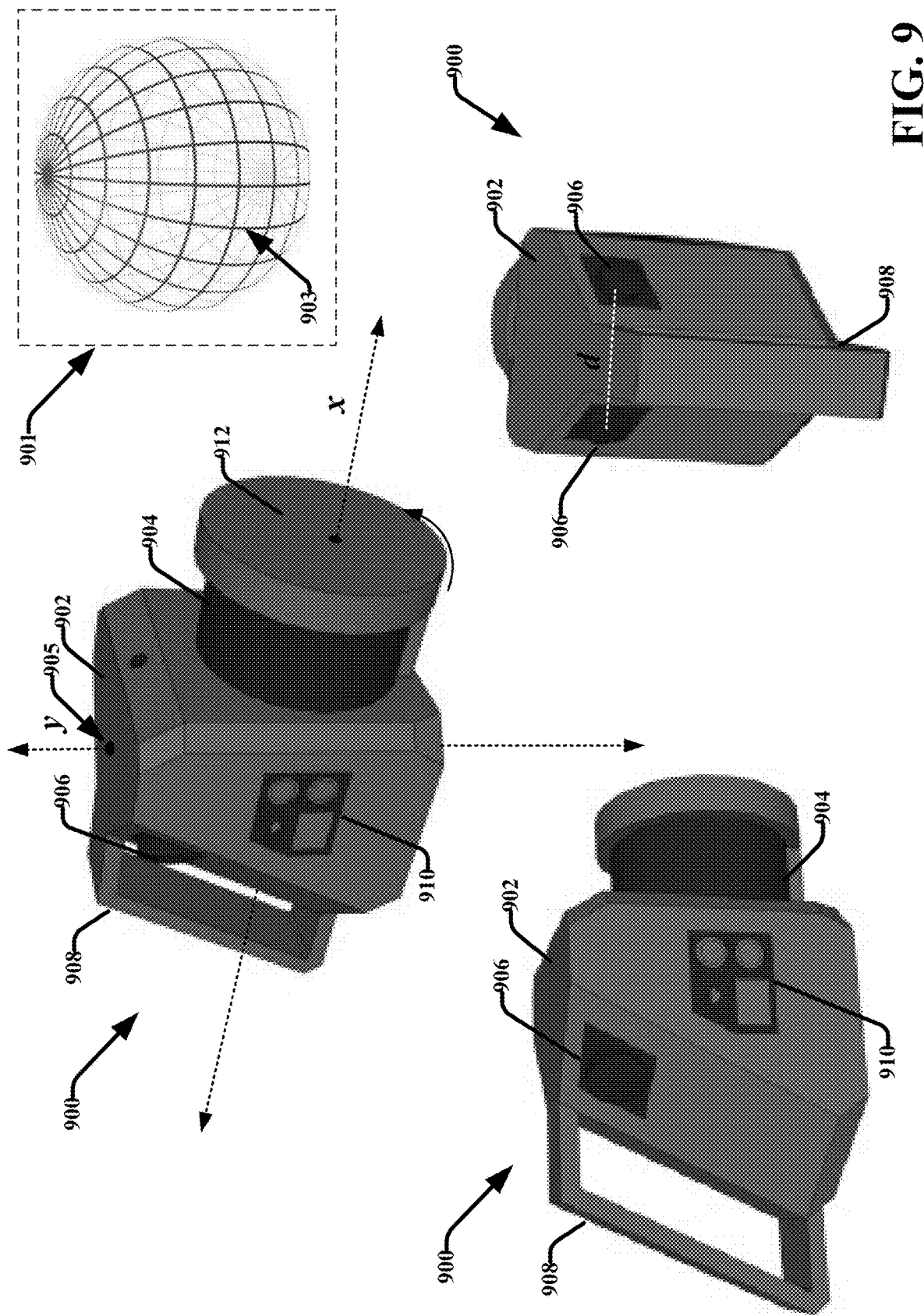
FIG. 9 illustrates different perspectives of another example 2D/3D panoramic capture device in accordance with various aspects and embodiments described herein.

Referring now to FIG. 9, presented are different perspectives of another example 2D/3D panoramic capture device 900 in accordance with various aspects and embodiments described herein. In one or more embodiments, the 2D/3D panoramic capture device 102 of system 100 can be or include one or more features and functionalities of 2D/3D panoramic capture device 900. Repetitive description of like elements employed in respective embodiments is omitted for sake of brevity.

Similar to 2D/3D panoramic capture devices 200 and 300, the 2D/3D panoramic capture device 900 is configured to capture 2D and 3D data for an environment that collectively spans up to a 360° horizontally view of the environment from a fixed location of the 2D/3D panoramic capture device 900. However, unlike the 2D/3D panoramic capture devices 200 and 300, the 2D/3D panoramic capture device 900 does not include a plurality of cameras whose collective fields-of-view span up to 360°. Accordingly, 2D/3D panoramic capture device 900 does not enable generation of a 360° panoramic image of the environment with single 2D image captures by the respective cameras without rotation of the 2D/3D panoramic capture device. Also unlike 2D/3D panoramic capture device 200, the 2D/3D panoramic capture device 900 does not include a plurality of depth sensor devices or depth detection components 204 whose collective fields-of-view span up to 360°. Thus 2D/3D panoramic capture device 900 does not enable generation of 360° 3D panoramic depth data of the environment with single 3D data captures by depth detection components of the device without rotation of the 2D/3D panoramic capture device 200).

On the contrary, the 2D/3D panoramic capture device 900 can employ a fewer amount of cameras and/or a fewer amount of depth sensor devices or depth detection components (e.g. depth detection component 204) whose collective fields-of-view span less than 360°. For example, in the embodiment shown, the 2D/3D panoramic capture device 900 includes two cameras 906 respectively positioned on different parts of a housing 902 of the capture device such that the respective cameras 906 have different perspectives of an environment. In an exemplary embodiment, when the 2D/3D panoramic capture device is stationary, the respective cameras 906 have a combined field-of-view of about 180° or more but less than 360°. The 2D/3D panoramic capture device 900 further includes a rotating LiDAR unit 904 configured to capture 3D depth information for a limited field-of-view (e.g. a single vertical ring of 3D depth information) when the 2D/3D panoramic capture device 900 is stationary. However, the 2D/3D panoramic capture device 900 can be configured to rotate about a fixed vertical y axis (e.g. using a rotational stage or mount) and capture 2D image data and 3D depth data from different azimuth orientations, relative to a center point (e.g. point 905) through which the vertical y axis extends, during rotation of the 2D/3D panoramic capture device 900 such that the collective 2D image data and 3D depth data provide a 360° view of the environment. As a result, the 2D/3D panoramic capture device 900 can generate panoramic 2D image and 3D depth data while reducing the overall device cost attributed to usage of multiple cameras and/or depth sensor devices.

Figure 10:
FIG. 10 illustrates an example 2D/3D panoramic capture system in accordance with various aspects and embodiments described herein.

For example, FIG. 10 illustrates an example 2D/3D panoramic capture system 1000 in accordance with various aspects and embodiments described herein. System 1000 facilitates capture of panoramic 2D image and 3D depth data using 2D/3D panoramic capture device 900. System 1000 includes 2D/3D panoramic capture device 900, a rotatable mount 1002, and a tripod 1004. The rotatable mount 1002 can be configured to rotate horizontally clockwise or counterclockwise around a fixed vertical y axis. In some implementations, the rotatable mount 1002 can be configured to rotate 360°. The rotatable mount 1002 can also be configured to employ various rotation schedules and/or speeds that are synchronized with capture of 2D image data by the cameras 906 and/or with capture of 3D depth data by the rotating LiDAR unit. For example, in one implementation, the rotatable mount 1002 can be configured to rotate 360° while the rotating LiDAR unit 904 continuously captures depth data, yet stop or pause rotation at two positions, one at 0° and another a 180°, at which the cameras 906 are configured to capture HDR images. In another implementation, the rotatable mount 1002 can be configured to rotate 360° while the rotating LiDAR unit 904 continuously captures depth data, yet stop or pause rotation at several predefined azimuth orientations at which the cameras 906 are configured to capture HDR images. Still in yet another implementation, the rotatable mount 1002 can be configured to rotate 360° yet stop or pause rotation at several predefined azimuth orientations at which the cameras 906 are configured to capture HDR images and the rotating LiDAR unit is configured to capture depth data.

In various embodiments, the 2D/3D panoramic capture device 900 can be configured to physically attach to the rotatable mount 1002 to provide rotation of the 2D/3D panoramic capture device 900. In some implementations, 2D/3D panoramic capture device 900 can be removably attached to the rotatable mount 1002. For example, the housing of the 2D/3D panoramic capture device 900 can include a coupling mechanism that facilitates physically attaching the 2D/3D panoramic capture device 900 to the rotatable mount 1002. In another implementation, the rotatable mount 1002 can be permanently fixed to the housing of the 2D/3D panoramic capture device 900. In some implementations, the rotatable mount 1002 can be manually rotated (e.g. using a handle connected thereto). In other implementations, the rotatable mount can be physically and electrically connected to a motor (e.g. a servomotor) that can control rotation of the rotatable mount 1002 based on received electrical control signals. For example, one or more components of the motor can be located within the rotatable mount 1002 itself, the tripod 1004, and/or the 2D/3D panoramic capture device 900. In some implementations, such control signals can be applied by the 2D/3D panoramic capture device 900, wherein the 2D/3D panoramic capture device is communicatively coupled to the motor.

In various embodiments, the 2D/3D panoramic capture device 900 can be configured to capture 2D image data and 3D depth data during rotation of the 2D/3D panoramic capture device 900 via rotation of the rotatable mount 1002. The 2D image data and 3D depth data can then be merged into a single 2D and/or 3D panoramic image using software. Thus system 1000 is capable of capturing panoramic color photographs as well as more advanced panoramic data such as: panoramic 3D depth images (e.g. a 3D depth map or 3D model), panoramic color video, and/or panoramic 3D depth video using a hybrid static/dynamic compositing scheme. Also, multiple panoramic images and/or video clips captured at different nearby locations may be combined using additional software to create a larger, immersive 3D space. It should be appreciated that attachment of the 2D/3D panoramic capture device 900 to a rotatable mount 1002 and tripod as shown in system 1000 is merely one exemplary mechanism to provide rotation of the 2D/3D panoramic capture device 900 around a fixed vertical axis. However, various other possible mechanisms to provide rotation of the 2D/3D panoramic capture device 900 around a fixed vertical y axis can be employed to facilitate capture of panoramic imagery by 2D/3D panoramic capture device 900.

In some implementations, the 2D/3D panoramic capture device 900 can generate information that identifies or facilitates identifying a capture position of each 2D image and 3D data set captured by the 2D/3D panoramic capture device 900 in association with rotation of the rotatable mount 1002 to facilitate aligning 2D images relative to one another, aligning 3D data sets relative to one another, and determining depth information for respective visual features (e.g. pixels) included in the 2D image data. For example, the 2D/3D panoramic capture device 900 can determine information regarding a starting position and orientation of the cameras and depth detection device(s) at the start of rotation, a rotation speed or schedule of the rotatable mount 1002, and a capture time of each 2D image and 3D data set. In some embodiments, the 2D/3D panoramic capture device 900 can include an IMU to capture information regarding acceleration and/or orientation of the rotatable mount 1002 from which respective capture positions of each 2D image and 3D data set can be determined. In some embodiments, the 2D/3D panoramic capture device 900 can include a ring encoder or other system that can provide the current orientation of the rotatable mount 1002 from which respective capture positions of each 2D image and 3D data set can be determined.

With reference back to FIG. 9, the 2D/3D panoramic capture device 900 includes a housing 902 within which electrical components and one or more power sources are housed. The electrical components can be powered via the one or more power sources. The electrical components can vary depending on the particular features and functionality of the 2D/3D panoramic capture device 900. In various embodiments, these electrical components can include, but are not limited to, one or more processors, memories, transmitters, receivers, transceivers, cameras, camera circuitry, depth sensor devices, depth sensor device circuitry, light projection systems and associated circuitry, light emitters, lasers, sensors, sensing circuitry, motors (e.g. servomotors), antennas and other components. In an embodiment, the electrical components can be formed on or within a substrate that is placed inside the housing 902. The housing 202 can be formed from conductive materials, non-conductive materials or a combination thereof. For example, housing 902 can include a conductive material, such as metal or metal alloy, a non-conductive material such as glass, plastic, ceramic, etc., or a combination of conductive and non-conductive materials.

The 2D/3D panoramic capture device 900 further includes the rotating LiDAR unit 904, the two cameras 906, a handle 908, and a control interface 910. The rotating LiDAR unit 904 is configured to capture depth information as the 2D/3D panoramic capture device 900 rotates about a fixed vertical y axis (e.g. via the rotatable mount 1002). For example, the rotating LiDAR unit 904 can continuously capture 3D depth data as the 2D/3D panoramic capture device 900 rotates 360° about the vertical y axis and/or captures 3D depth data at two or more predefined azimuth orientations during rotation about the vertical y axis. In the embodiment shown, the rotating LiDAR unit 904 has a cylindrical prism geometry (although the rotating LiDAR unit 904 is not restricted to having such a geometry). The rotating LiDAR unit 904 is referred to as a "rotating" LiDAR unit because in one or more embodiments, the rotating LiDAR unit 904 can be configured to rotate 360° about a horizontal axis x (that is perpendicular to the vertical y axis) while emitting one or more light beams (e.g. using one or more lasers) in association with performance of LiDAR depth sensing. For example, the rotating LiDAR unit can rotate 360° while emitting one or more light beams resulting in the capture of one or more circular rings of depth measurements. Accordingly, the captured 3D depth data associated with each 360° rotation of the rotating LiDAR unit includes a depth data ring for a plane that is parallel to the top surface 912 of the cylinder. By capturing a plurality of vertical rings of depth data (e.g. that are parallel to the top surface 912 of the cylinder) as the 2D/3D panoramic capture device is rotated 360° about the vertical y axis, the compiled depth rings can essentially form a sphere of depth data, as indicated in call out box 901, wherein the respective vertical lines 903 correspond to rings of depth data. In one or more embodiments, the rotating LiDAR unit 904 can be configured to capture circular depth rings at a relatively high rate (e.g. hundreds of times per second), thereby enabling a relatively fast rotational speed for the 2D/3D panoramic capture device 900 about the y axis (e.g. the rotational speed of the rotatable mount). However, it should be appreciated that the capture rate and the rotational speed of the rotating LiDAR unit 904 can vary.

In some embodiments, the one or more light beams emitted by the rotating LiDAR unit 904 can be aimed perpendicular to the x axis. In one or more additional embodiments, one or more light beams emitted by the rotating LiDAR unit 904 can be angled as opposed to being aimed perpendicular to the x axis. For example, one or more light beams (i.e., the light emitter or laser that generates the light beam) can be angled slightly in the direction towards the handle 908 such that the one or more light beams capture depth data above and below the housing of the 2D/3D panoramic capture device 900, thereby eliminating a potential blind spot in the depth data. Further, in some implementations, in addition to capturing vertical rings of depth data that are perpendicular or substantially perpendicular to the x axis, the entire rotating LiDAR unit 904 (e.g. the entire cylindrical prism) can be configured to tilt in various directions relative to the x axis and/or the y axis) so as to change the orientation of the rotating LiDAR unit 904. For example, the rotating LiDAR unit 904 can be tilted or configured to tilt up and down relative to the x axis (e.g. as opposed to having an orientation that is parallel with the x axis) thereby changing the orientation of the captured depth data and enabling higher fidelity reconstructions of vertical 3D edges.

The 2D/3D panoramic capture device 900 further includes two cameras 906 located on and/or within the housing 902 on opposite sides of the handle 908. The features and functionalities (e.g. resolution, field-of-view, video recording, etc.) of the cameras 906 can vary. For example, in one or more embodiments, the cameras 906 can include HDR cameras. In another example, the respective cameras 906 can include fisheye lenses having a high resolution (e.g. greater than about 40 mega-pixels (Mp)), digital color cameras with wide fields-of-view (e.g. greater than or equal to 130°). For example, the fields-of-view of the respective cameras can span some fraction of 360° in the horizontal and vertical direction. In various implementations, the fields-of-view of the respective cameras 206 spans from about 90° to about 195° in the horizontal and/or vertical direction. In another implementation, the fields-of-view of the respective cameras 206 spans from about 100° to about 190° in the horizontal and/or vertical direction. In yet another implementation, the fields-of-view of the respective cameras 206 spans from about 120° to about 160° in the horizontal and/or vertical direction. In various embodiments, the fields-of-view of the respective cameras 906 can at least partially overlap, thereby enabling 3D depth estimates using passive stereo techniques.

The respective cameras 906 can further include video recording capabilities. For example, the respective cameras 906 can be configured to continuously capture images at a suitable frame rate, and preferably a high frame rate (e.g. 30 fps). Thus in some embodiments, the 2D/3D panoramic capture device 900 can capture panoramic and/or spherical video. In one or more embodiments, if video is desired, the 2D/3D panoramic capture device 900 can be rotated or positioned to a desired azimuth orientation and the respective cameras 906 can capture video data over a desired period of time. The video data will have a collective field-of-view spanning the collective field-of-view of the two cameras 906 (e.g. about 180°). In some embodiments, the video data can be combined (e.g. via panoramic video generation component 516) with static panoramic image data captured and generated for the remaining field-of-view (e.g. the opposite and remaining 180° field-of-view) to generate a hybrid panoramic video.

In the embodiment shown, the cameras 906 respectively have different fields-of-view relative to the field-of-view of the rotating LiDAR unit 904. In addition, the cameras 906 respectively have different fields-of-view relative to one another. For example, the respective cameras 906 are separated by an offset distance d (e.g. such as a distance slightly larger than the width of the handle 908 such that the respective cameras 906 do not view a portion of the handle). In some embodiments, the respective cameras 906 can have slightly overlapping fields-of-view and be separated by an offset distance d of about 6.5 cm to facilitate generation of stereo image pairs. In addition, in the embodiment shown, the housing 902 is sloped on opposite sides of the handle 908 such that the orientations of respective cameras are angled away from one another.

Figure 11:
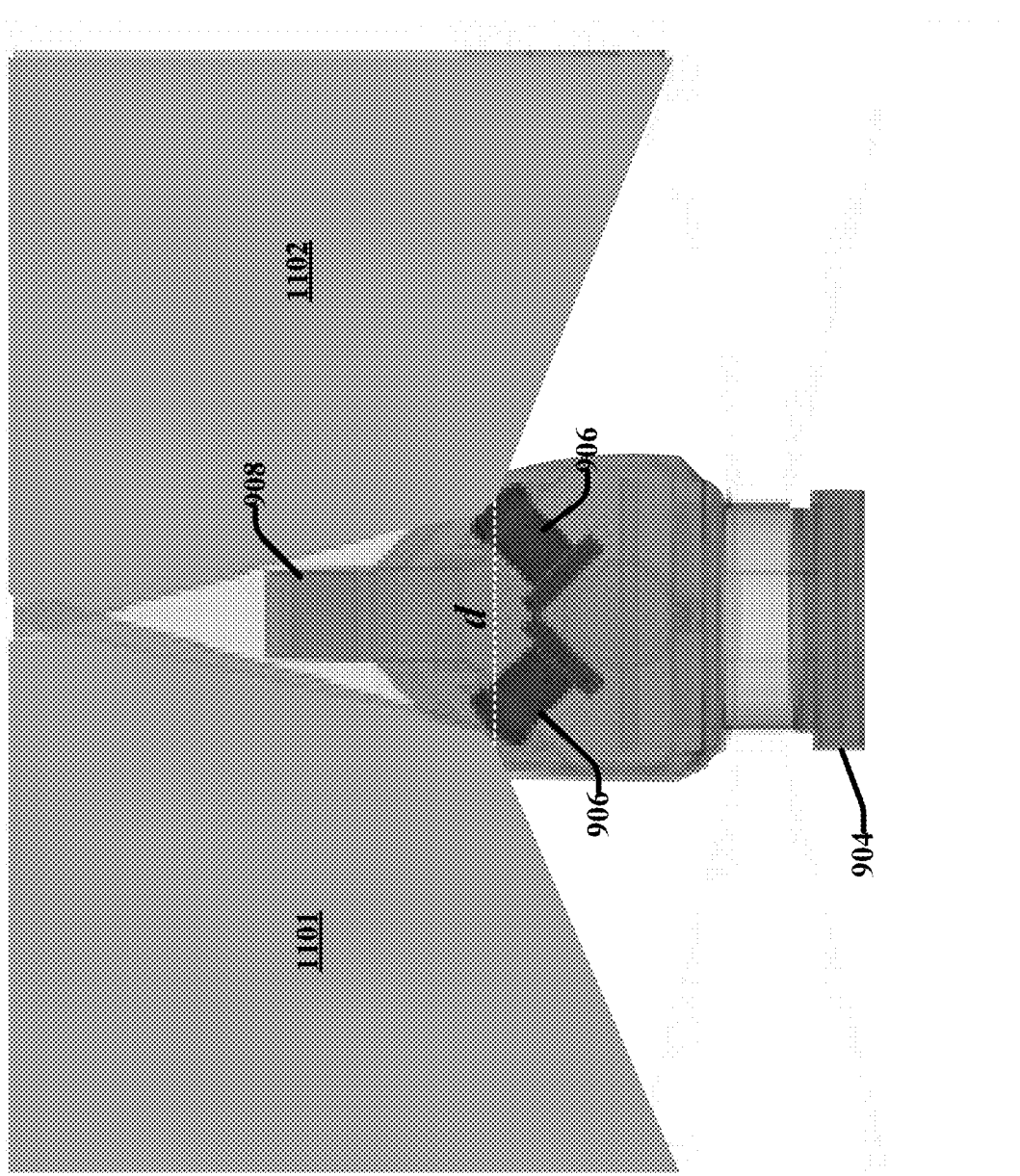
FIG. 11 illustrates fields-of-view for respective cameras another example 2D/3D panoramic capture device in accordance with various aspects and embodiments described herein.

FIG. 11 illustrates example fields-of-view for the respective cameras 906 of 2D/3D panoramic capture device 900 in accordance with various aspects and embodiments described herein. Projections 1101 and 1102 respectively correspond to the fields-of-view of the respective left and right cameras 906. As shown in FIG. 11, the fields-of-view of the respective cameras 906 can partially overlap, thereby enabling depth derivation from the stereo image pair generated by the respective cameras 906. In an aspect, the distance d between the respective cameras 906 is about 6.5 cm.

With reference back to FIG. 9, in one exemplary embodiment, the combined fields-of-view of the respective cameras 906 covers more than 180°. With this configuration, the respective cameras 906 can capture a first pair of 2D images at a first azimuth rotation position (e.g. at 0°), and a second pair of 2D images at a second azimuth position 180° relative to the first azimuth position (e.g. 180°), and the combined fields-of-view the first and second pairs of 2D images covers and entire 360° panoramic view of the environment. According to this embodiment, a capture process capable of capturing 360° panoramic 2D image data and 3D depth data using 2D/3D panoramic capture device 900 can involve rotation of the 2D/3D panoramic capture device 900 360° about the vertical y axis over a defined rotation period and at a defined rotation rate while capturing 3D depth data via the rotating LiDAR unit 904. The 2D/3D panoramic capture device 900 can further pause rotation at 0° and 180° respectively to capture the first and second 2D image pairs via the two cameras 906 while not rotating. Capturing images while not rotating can reduce motion blur and enable HDR capture.

In another embodiment, the combined fields-of-view of the respective cameras 906 covers less than 180° and/or the 2D/3D panoramic capture device 900 includes only a single camera with a field-of-view less than 180°. With this configuration, a capture process capable of capturing 360° panoramic 2D image data and 3D depth data using 2D/3D panoramic capture device 900 can involve rotation of the 2D/3D panoramic capture device 900 360° about the vertical y axis over a defined rotation period and at a defined rotation rate while capturing 3D depth data via the rotating LiDAR unit 904. The 2D/3D panoramic capture device 900 can further pause rotation at a plurality of defined "stop and shoot" azimuth capture points at which the respective cameras 906 can be configured to capture 2D image data, wherein the collective field-of-view of the captured 2D images spans up to 360°. In some implementations of this embodiment, the cameras 906 can be arranged to have overlapping fields-of-view such that respective images captured by the cameras at each of the "stop and shoot" azimuth capture points establish pairs of stereo images from which depth information can be derived using passive stereo depth analysis (e.g. via stereo depth derivation component 512).

It should be appreciated that the form, geometry, and configuration of the 2D/3D panoramic capture device 900 can vary and is not limited to that depicted in FIG. 9. For example, in some implementations, the handle 908 can be removed or modified such that the handle 908 is located entirely below the cameras 906. In another example, the number and arrangement of the cameras 906 of 2D/3D panoramic capture device 900 can vary. For instance, any arrangement of one or more cameras 906 can be employed that covers a field-of-view of about 180° or more horizontally. For example, three cameras respectively having fields-of-view of 60° or more can be employed. In yet another embodiment, the 2D/3D panoramic capture device 900 can include one or more cameras with limited fields-of-view (e.g. less than a combined field-of-view of 180° or more) and the 2D/3D panoramic capture device 900 can be configured to capture image data from the one or more cameras at several different "stop and shoot" azimuth orientations of rotation (e.g. as opposed to merely at 0° and 180°). The respective images captured at each azimuth position can further be combined to generate a 360° panoramic image. According to this embodiment, the 2D/3D panoramic capture device 900 can be configured to employ a rotational schedule with several stop and shoot points to obtain images with overlapping fields-of-view, thereby enabling additional depth estimates using passive stereo techniques. Still in other implementations, the cameras 906 can be arranged and/or have fields-of-view such that they provide only monocular coverage or incomplete stereo coverage (e.g. only a subset of the cameras may provide stereo coverage) as opposed to complete stereo coverage and depth information can be determined via the rotating LiDAR unit 904.

In addition, in some embodiments, the 2D/3D panoramic capture device 900 can employ a variable rotation speed schedule wherein rotation (e.g. via rotatable mount 11002) is slower for some areas of the capture environment relative to other areas of the capture environment. In some alternative embodiments, rather than employing a single rotatable mount 1002, the 2D/3D panoramic capture device 900 can include two rotatable mounts, positioned on different horizontal planes (e.g. above and below one another). According to these embodiments, the rotating LiDAR unit 904 (and/or other depth sensor devices as described below) can be located on a first portion of the 2D/3D panoramic capture device 900 provided on a first rotatable mount and the one or more cameras 906 of the 2D/3D panoramic capture device 900 can be located on a second portion of the 2D/3D panoramic capture device 900 provided on a second rotatable mount. The first and second rotatable mounts can further be configured to rotate independently of one another and at different speeds and/or directions. For example, the first rotatable mount can be configured to continuously rotate while the second rotatable mount including the one or more cameras 906 can be configured to pause at different azimuth points along rotation to capture 2D image data.

In one or more embodiments, in addition and/or alternative to employing a rotating LiDAR unit 904, the 2D/3D panoramic capture device 900 can employ one or more other depth sensor devices to capture panoramic 3D depth data, including but not limited to one or more: time-of-flight sensor devices, non-rotating LiDAR sensor devices (including but not limited to solid-state variants), structured light sensor devices, and light-field cameras. In some implementations, the 2D/3D panoramic capture device 900 can include structured light projectors paired with cameras (e.g. cameras 906 or additional cameras) to detect and determine panoramic 3D depth data. In implementations in which the 2D/3D panoramic capture device 900 employs two or more depth sensor devices with different fields-of-view that respectively employ light emitters (e.g. time-of-flight sensor devices, structured light sensor devices, and light/laser projection systems associated with performance of active or assisted stereo), the two or more of the depth sensor devices can share a common light emitter. In other implementations, the 2D/3D panoramic capture device 900 can employ active stereo and/or passive stereo techniques to derive depth information from captured stereo image pairs. In some implementations, the rotating LiDAR unit 904 can be removed and depth information can be detected solely via passive stereo techniques using stereo image pairs captured at several azimuth rotation points along a 360° rotation. Still in other embodiments, the 2D/3D panoramic capture device can determine depth information using video cameras (e.g. cameras 906) capable of structure-from-motion calculations. In addition, in some embodiments, the 2D/3D panoramic capture device 900 can employ a combination of different types of depth sensor devices and/or depth derivation techniques to determine 360° depth information. For example, the 2D/3D panoramic capture device 900 can include two or more of: time-of-flight based depth detection, structured light based depth detection, LiDAR based depth detection, light/laser assisted or active stereo based depth detection, and passive stereo based depth detection. The location, field-of-view and arrangement of one or more additional depth sensor devices (e.g. in addition to the rotating LiDAR unit) can vary.

In one implementation, the 2D/3D panoramic capture device 900 can include a depth sensor device and a camera that respectively have overlapping fields-of-view, thereby facilitating generation of 3D color video. For example, in some implementations, the 2D/3D panoramic capture device 900 can include an additional camera having a field-of-view that overlaps with a field-of-view of the rotating LiDAR unit. In another implementation, the 2D/3D panoramic capture device 900 can employ an additional depth sensor device that has a field-of-view that is the same (e.g. overlapping) or at least partially the same as one or more of the cameras 906. The one or more of the cameras 906 can be configured to capture video and the depth sensor device can be configured to capture depth video data. Accordingly, the combined camera and depth sensor device can efficiently capture 3D color video.

Figure 12:
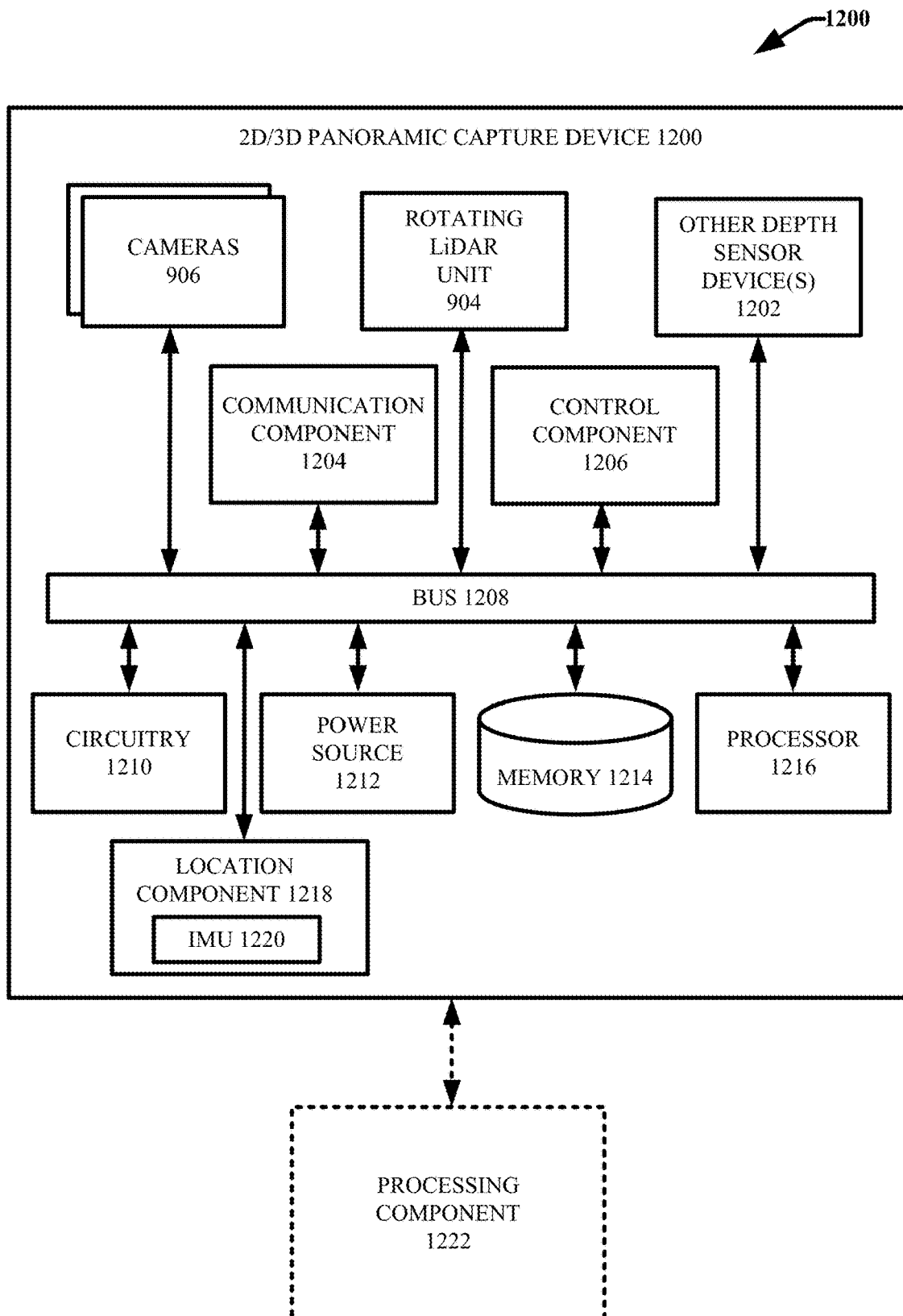
FIG. 12 presents a schematic block diagram of another example 2D/3D panoramic capture system in accordance with various aspects and embodiments described herein.

FIG. 12 presents a schematic block diagram of an example 2D/3D panoramic capture device 1200 in accordance with various aspects and embodiments described herein. In one or more embodiments, 2D/3D panoramic capture devices 102 and 900 can be or include one or more features and functionalities of 2D/3D panoramic capture device 1200, and vice versa. Repetitive description of like elements employed in respective embodiments is omitted for sake of brevity.

With reference to FIGS. 1, 9, 10, 11 and 12, in one or more embodiments, the 2D/3D panoramic capture device 1200 includes two or more high resolution color cameras 906 provided on and/or within a housing (e.g. housing 902) at different positions with different fields-of-view. For example, in some embodiments, the combined field-of-view of the respective cameras 906 spans up to about 180° (e.g., wherein each has a field-of-view of 90° or more). In other embodiments, the combined field-of-view of the respective cameras 906 is greater than 180° but less than 360°. In some implementations, the respective cameras 906 are configured to capture video (e.g. at a frame rate of 30 fps or greater). The 2D/3D panoramic capture device 900 can include and/or attach to a motorized rotatable mount (e.g. rotatable mount 1002) configured to rotate about a vertical y axis (e.g. from 180° to 360°) to effectuate rotation of the 2D/3D panoramic capture device 1200 about the vertical y axis from (e.g. from 180° to 360°). The two or more cameras 906 can be configured to capture image data at various azimuth points of rotation and/or at two opposite azimuth points of rotation (e.g. 0° and 180°). The 2D/3D panoramic capture device 1200 can further include a rotating LiDAR unit 904 configured to capture one or more circular rings of depth or distance measurement (e.g. several hundreds of thousands of times per second) as the 2D/3D panoramic capture device 1200 rotates about the vertical y axis In one or more embodiments, the 2D/3D panoramic capture device 1200 can further include one or more other depth sensor devices 1202, a communication component 1204, a control component 1206, location component 1218, circuitry 1210, and power source 1212. The 2D/3D panoramic capture device 1200 can include memory 1214 configured to store computer executable components and instructions and processor 1216 to facilitate operation of the instructions (e.g. computer executable components and instructions) by the 2D/3D panoramic capture device 1200. In some embodiments, the memory 1214 can also store captured 2D image data and 3D depth information captured by the 2D/3D panoramic capture device 1200. In other embodiments, the 2D/3D panoramic capture device 1200 can include additional memory (e.g. volatile or non-volatile memory) to store the captured 2D/3D data. The 2D/3D panoramic capture device 1200 can further include a device bus 1208 that couples the various components of the 2D/3D panoramic capture device 1200, including, but not limited to, the cameras 906, the rotating LiDAR unit 904, the other depth sensor devices 1202, the communication component 1204, the control component 1206, the circuitry 1210, the power source 1212, the memory 1214 and the processor 1216.

In some embodiments, the one or more other depth sensor devices 1202 can include one or more other depth sensor devices configured to capture panoramic 3D depth data, including but not limited to one or more of: a laser rangefinder device, time-of-flight sensor devices, other non-rotating LiDAR sensor devices (including but not limited to solid-state variants), structured light sensor devices, and lightfield-cameras.

The communication component 1204 can be configured to facilitate wired and/or wireless communication between the 2D/3D panoramic capture device 1200 and an external device, such as the user device 106 and/or the 3D modeling and navigation server device 112. For example, the communication component 1204 can include or be various hardware and software devices associated with establishing and/or conducting wireless communication between the 2D/3D panoramic capture device 1200 and an external device. For example, communication component 1204 can control operation of a transmitter-receiver or transceiver (not shown) of the 2D/3D panoramic capture device 1200 to communicate raw and/or processed 2D/3D data with an external device (e.g. the user device 106 and/or the 3D modeling and navigation server device 112) and/or to receive control commands from the external device. The communication component 1204 can facilitate wireless communication between the 2D/3D panoramic capture device 1200 and an external device using a variety of wireless telemetry communication protocols, such as those described with reference to communication component 402. Repetitive description is omitted for sake of brevity. In some implementations in which the 2D/3D panoramic capture device 1200 is configured to removably attach to the rotatable mount 1002, the communication component 1204 can also facilitate communication between the 2D/3D panoramic capture device 1200 and the rotatable mount 1002.

The control component 1206 can include hardware, software, or a combination of hardware and software that facilitates controlling operation of the capture 2D/3D panoramic capture device 1200 and in some embodiments, the rotatable mount 1002. For example, in some embodiments, the 2D/3D panoramic capture device 1200 and/or the rotatable mount can be remotely controlled/operated via control signals provided by an external device (e.g. user device 106 and/or 3D modeling and navigation server device 112). According to these embodiments, the control component 1206 can be configured to interpret control signals received from the external device (e.g. via communication component 1204 and cause the 2D/3D panoramic capture device 1200 to execute the commands defined by the control signals. For example, these commands can include but are not limited to: commands associated with the capture of 2D images and 3D data by the 2D/3D panoramic capture device 1200, commands associated with rotation of the rotating LiDAR unit 904, commands associated with movement of the 2D/3D panoramic capture device 1200, including rotation of the rotatable mount 1002, commands associated with processing of captured 2D image and 3D data, commands associated with storage or communication of raw or processed 2D images and 3D data, and the like. In embodiments in which the 2D/3D panoramic capture device 1200 includes a tangible user interface (e.g. control interface 910 and the like) that facilitates direct input for controlling the 2D/3D panoramic capture device 1200 and/or the rotatable mount 1002, the control component 1206 can include hardware (e.g. hard/soft buttons, a touchscreen, etc.) and software associated with the tangible user interface that facilitates providing and executing the control commands, such as but not limited to those noted above.

The location component 1218 can include hardware, software or a combination of hardware and software that facilitates determining a location of the 2D/3D panoramic capture device 1200. Accordingly, the location component 1218 can facilitate capturing data for determining precise capture locations of the 2D/3D panoramic capture device 1200 relative to other capture locations in association with performance of a scan of an environment when capturing 2D and 3D data for generating an immersive 3D space model of the environment. In one embodiment, the location component 1218 can include an IMU 1220, and/or accelerometer configured to capture movement data during movement of the 2D/3D panoramic capture device 1200 between capture positions. The movement data can be employed (e.g. by processing component 1222) to determine the capture position of the 2D/3D panoramic capture device 1200 using inertial position tracking, structure-from-motion analysis, SLAM analysis, and the like. In other embodiments, the location component 1218 can include one or more video cameras to capture video data during movement of the 2D/3D panoramic capture device and/or control capturing video data from one or more existing cameras associated with the 2D/3D panoramic capture device (e.g., one or more cameras 906) to facilitate determining the locations of the 2D/3D panoramic capture device using visual odemetry techniques (e.g., structure-from-motion, SLAM, etc.). In other embodiments, the location component 1218 can include stationary sensors, ultrasonic systems, lasers scanners, etc., to facilitate determining a location of the 2D/3D panoramic capture device 1200 using visual odometry techniques, line of sight for mapping and localization, time-of-flight mapping and localization, and the like. Still in other embodiments, the location component 1218 can determine a location of the 2D/3D panoramic capture device 1200 using global positioning system (GPS) technology.

The circuitry 1210 can include hardware, software or a combination of hardware and software employed to facilitate operation of the various components of the 2D/3D panoramic capture device 1200. For example, the circuitry 1210 can include, but is not limited to: circuitry for cameras 906, circuitry for the rotating LiDAR unit 904 (e.g. including a motor or servomotor), circuitry for the one or more other depth sensor devices 1202, circuitry for rotatable mount 1002 (e.g. including a motor or servomotors and an IMU), circuitry for the communication component 1204 (e.g. antennas, transmitters, receivers, transceivers repeaters, etc.), and the like. The circuitry 1210 can facilitate various operations of the 2D/3D panoramic capture device 1200, including but not limited to, capture of 2D images and 3D data by the 2D/3D panoramic capture device 1200, control of the capture of 2D images and 3D data by the capture device and/or the rotatable mount 1002, 2D and 3D panoramic video capture, control of processing of the 2D images and 3D data, and wireless communication mode operations of the 2D/3D panoramic capture device 1200. The 2D/3D panoramic capture device 1200 further includes power source 1212 to drive the operations of the 2D/3D panoramic capture device 1200 and to provide power to the various electrical components of the 2D/3D panoramic capture device 1200. In some embodiments in which the 2D/3D panoramic capture device 1200 and the rotatable mount 1002 are configured to electrically couple, the power source 1212 can power the one or more electrical components of the rotatable mount as well. In one or more embodiments, the power source 1212 includes but is not limited to, a battery, a capacitor, a charge pump, a mechanically derived power source (e.g. microelectromechanical systems (MEMs) device), or an induction component.

With reference to FIGS. 1 and 12, as previously discussed, 3D panoramic imagery including 2D images and 3D data captured by a 2D/3D panoramic capture device described herein (e.g. 2D/3D panoramic capture devices 102, 200, 300, 400, 900, 1200 and the like) can be processed in order to generate panoramic color photographs as well as more advanced panoramic data such as but not limited to: panoramic color videos, panoramic 3D depth images (e.g. a 3D depth map or model), and panoramic 3D depth video. In addition, a plurality of panoramic images and/or video clips captured by the 2D/3D panoramic capture device at different nearby locations can be combined and aligned using the 3D data respectively associated therewith (as well as information regarding camera and depth sensor device capture position and orientation) to generate immersive 3D space models.

Various aspects of such processing of 2D image and 3D depth data captured by the 2D/3D panoramic capture devices described herein (e.g. 2D/3D panoramic capture devices 102, 200, 300, 400, 900, 1200 and the like), can be performed at the 2D/3D panoramic capture device (e.g. via primary processing component 104), at the user device 106 via secondary processing component 110), and/or at the 3D modeling and navigation server device 112 (e.g. via the tertiary processing component 114). In this regard, the 2D/3D panoramic capture device 1200 can be communicatively coupled to processing component 1222 to perform one or more of the various processing functionalities described above. In some embodiments, the 2D/3D panoramic capture device 1200 can include processing component 1222 (e.g. stored in memory 1214). In other embodiments, the sub-components of the processing component 1222 can be distributed between the primary processing component 104, the secondary processing component 110, and the tertiary processing component 114. In another embodiment, the sub-components of processing component 1222 can be distributed between the primary processing component 104 and the secondary processing component 110. In yet another embodiment, the sub-components of processing component 1222 can be distributed between the primary processing component 104 and the tertiary processing component 110. Still in yet another embodiment, the sub-components of processing component 1222 can be distributed between the secondary processing component 110 and the tertiary processing component 114. Further, in some embodiments, all sub-components of processing component 1222 can be provided at the secondary processing component 110 or the tertiary processing component 114. The various components and associated features and functionalities of processing component 1222 are discussed in greater detail below with respect to FIG. 13.

Figure 13:
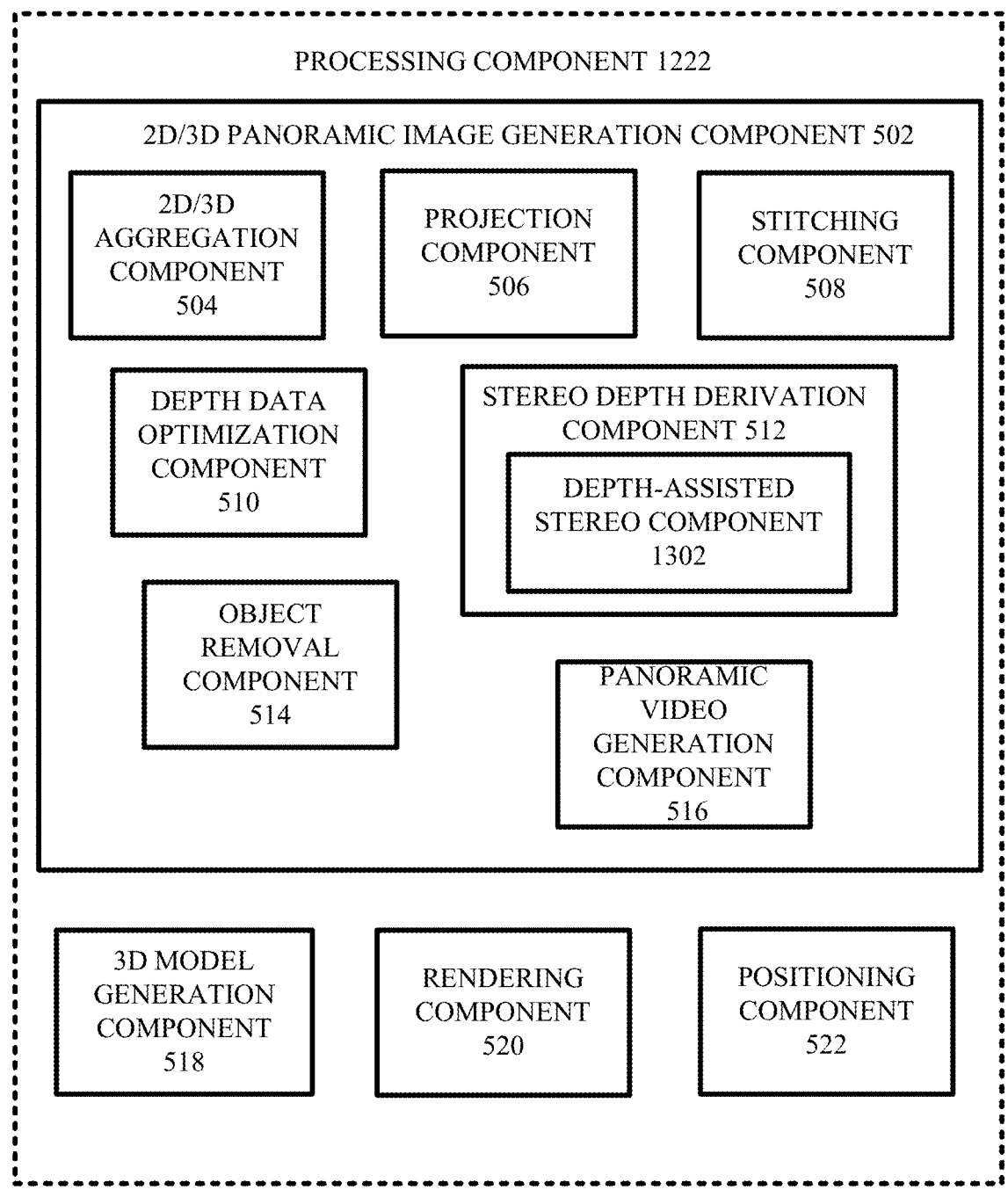
FIG. 13 presents a schematic block diagram of another example processing component that facilitates processing and aligning captured panoramic image and depth data in accordance with various aspects and embodiments described herein.

FIG. 13 presents a schematic block diagram of another example processing component (e.g. processing component 1222) that facilitates processing and aligning captured panoramic image and depth data in accordance with various aspects and embodiments described herein. Processing component 1222 provides same or similar features and functionality as processing component 420 with the addition of depth-assisted stereo component 1302 to the stereo depth derivation component 512. It should be appreciated that the various components of processing component 1222 previously described with reference to processing component 420 (e.g. 2D/3D panoramic image generation component 502, 2D/3D aggregation component 504, projection component 506, stitching component 508, depth data optimization component 510, stereo depth derivation component 512, object removal component 514, panoramic video generation component 516, 3D model generation component 518, rendering component 520 and positioning component 522) can be configured to perform same or similar processing functions with respect to 2D image data and 3D depth data capture via 2D/3D panoramic capture devices 900 and 1200. Repetitive description of like elements employed in respective embodiments is omitted for sake of brevity.

As previously mentioned, the 2D/3D panoramic capture devices described herein can employ various mechanisms to capture and/or determine panoramic depth data for an environment. These mechanisms can involve a variety of different types of depth detection hardware and/or software modalities, including but not limited to: time-of-flight based depth detection, structured light based depth detection, LiDAR based depth detection, light/laser assisted or active stereo based depth detection, and passive stereo based depth detection. These various depth detection modalities have different strengths and weaknesses and provide varying degrees of 3D depth data coverage. In some embodiments, in order to improve the accuracy of panoramic depth data, a 2D/3D panoramic capture device described herein can employ a combination of different depth detection modalities and the depth data optimization component 510 can determine an optimized depth measurement for respective features/objects included in an environment based on a weighted interpretation of the depth data provided by the respective modalities.

In various additional embodiments, the depth-assisted stereo component 1302 can be employed to improve the accuracy of 3D depth information generated by the stereo depth derivation component 512 using passive and/or active stereo based depth derivation techniques. In particular, in traditional stereo algorithms, the 3D position of each image pixel is estimated by finding the corresponding pixel in one or more adjacent images and triangulating the point's 3D position from the corresponding points. The key challenge in this task is estimating pixel correspondences between images, and to do this densely for every pixel in every image. Existing methods require that the images have distinctive variations in color to estimate correspondences unambiguously, causing correspondence estimation to fail in flat, indistinctive regions of the image (e.g. flat, textureless walls), resulting in erroneous or incomplete depth maps. Commonly, visual evidence alone is not sufficiently informative for 3D information to be estimated unambiguously, so some contextual information is required to reduce ambiguity of the final solution. Often this takes the form of continuity and/or smoothness constraints, and an objective function is employed that weights both visual consistency of corresponding pixels and local continuity of neighboring correspondences. However, optimizing this function is generally intractable.

The depth-assisted stereo component 1302 can be configured to employ additional 3D depth cues provided by one or more depth sensor devices of the 2D/3D panoramic capture device (e.g., 2D/3D panoramic capture devices 200, 300, 400, 900, 1200 and the like) to improve the accuracy of existing stereo based depth derivation functions. For example, the depth-assisted stereo component 1302 can be configured to employ one or more existing stereo based depth derivation methods to estimate dense depth maps from multiple stereo images or images having partially overlapping fields-of-view captured via one or more cameras of a 2D/3D panoramic capture device described herein (e.g., 2D/3D panoramic capture devices 102, 200, 300, 900, 1200 and the like). One or more suitable stereo depth derivation methods can include the depth derivation functions described in Birchfield, Stan, and Carlo Tomasi. "Depth discontinuities by pixel-to-pixel stereo." *International Journal of Computer Vision* 35.3 (1999): 269-293, the entirety of which is incorporated herein by reference. For example, standard stereo analysis techniques often employ a cost volume function to estimate the depth for each pixel of an image. At each pixel, a cost is assigned to each of several possible depth candidates (often called disparities), creating a 3D array of values with dimension image-width-by-image-height-by-number-of-disparities. This is the input to the stereo algorithm, which finds the depth for each pixel that minimizes the cost in this volume.

The depth-assisted stereo component 1302 improves the accuracy of standard stereo analysis techniques by incorporating sparse 3D depth data captured via one or more depth sensor devices of the 2D/3D panoramic capture device. In particular, the depth-assisted stereo component 1302 can use the sparse 3D depth data to initialize the stereo matching function or to bias the stereo matching function to prefer structures near known 3D points. In one or more embodiments, the depth-assisted stereo component 1302 first modifies the cost volumes to strongly prefer disparities that correspond to known depth values (for pixels where depth is known from the sparse 3D depth data). In an aspect, this is accomplished by increasing the cost of all other disparities for which depth values are unknown. The depth-assisted stereo component 1302 then applies a propagation algorithm to propagate the preferences for disparities that correspond to known depth values to nearby pixels whose depth is unknown. In an embodiment, the propagation algorithm includes a "semi-global matching" algorithm. In another embodiment, the propagation algorithm includes a "more global matching" algorithm. This approach can result in more accurate and more complete depth maps than standard stereo methods alone.

For example, in one or more exemplary embodiments, the depth-assisted stereo component 1302 can be configured to initially analyze the 2D images captured by the 2D/3D panoramic capture device to identify pairs of images depicting the same structure by counting keypoint matches that are visually similar and are geometrically consistent with the known poses of the cameras that captured the respective images. One definition of geometric consistency is that there exists a 3D point whose 2D projection into each image is sufficiently close to the keypoint under consideration in that image. One possible definition of visual similarity between keypoints is that color and texture statistics collected in a 2D region centered on the keypoint are similar to those statistics in a region centered on the other keypoint in the other image. Statistics could be histograms, and similarity could be measured by a chi-square measure between histograms. Another definition of visual similarity is the inverse Euclidean distance between so-called "keypoint descriptors" which are high-dimensional vectors that capture the local appearance around the keypoint in a robust way (for example, the oriented FAST and Rotated BRIEF (ORB) descriptor, the scale-invariant feature transform (SIFT) descriptor, and the like). Respective images of these pairs are referred to herein as "neighbors." The depth-assisted stereo component 1302 can then filter out image pairs that have insufficient relative displacement relative to a threshold displacement, have insufficient overlap of viewing volumes relative to a threshold overlap volume, or whose difference in viewing angles are sufficiently large relative to a threshold angle. For each remaining image pair, one of the images is characterized as the "reference" image and the other is characterized as the "matching" image. The depth-assisted stereo component 1302 can further estimate a depth map for each reference image by finding correspondences between its pixels and pixels in the matching image that are visually consistent (e.g. using a traditional passive stereo algorithm such as that described in Birchfield, Stan, and Carlo Tomasi. "Depth discontinuities by pixel-to-pixel stereo." *International Journal of Computer Vision* 35.3 (1999): 269-293.). By triangulating these correspondences, the depth map assigns a depth value to each pixel in the reference image or a special value indicating the depth could not be estimated with confidence. The depth-assisted stereo component 1302 can then merge (e.g. using Bayesian averaging) one or more resulting stereo based depth map with a depth map derived from an active 3D sensor generated by the 2D/3D panoramic image generation component 502 based on 3D depth data captured by one or more depth sensor devices of the 2D/3D panoramic capture device. The depth-assisted stereo component 1302 can further determine a final depth value or 3D coordinate for each pixel in each reference image based on the combined depth values included in the stereo based depth map and the 3D depth data based depth map.

In various additional embodiments, the depth-assisted stereo component 1302 can employ a "cost volume" stereo matching function in which a set of candidate depth values (or equivalently, pixel correspondences) are proposed for each pixel in the reference image, and a cost value is assigned to each depth value for each pixel. Cost values are based on combined visual consistency criteria that says corresponding pixels in the reference and matching image have similar visual features, and a local continuity criteria that says nearby pixels in the reference image should correspond to nearby pixels in the matching image. The cost value biases particular pixels in a reference image toward particular corresponding points in other images based on visual consistency and local continuity. The depth-assisted stereo component 1302 can further modify the cost value for one or more pixels based on additional 3D depth information provided by one or more depth sensor devices. The additional 3D depth information imposes some influence on the visual correspondence estimation process, allowing correspondences to be estimated with confidence when visual evidence alone is insufficient. For example, the depth-assisted stereo component 1302 can be configured to modify the cost value associated with one or more pixels by increasing the cost of correspondences that differ from those suggested by the additional 3D depth cues. These additional 3D depth cues thus facilitate high-confidence 3D estimates in regions with weak visual evidence. In various embodiments, the additional 3D depth data may be ignored in the face of overwhelming contradictory visual evidence provided by the images alone. In regions where additional 3D depth information is not available in nearby pixels, the algorithm defaults to using unbiased cost values.

Figure 14:
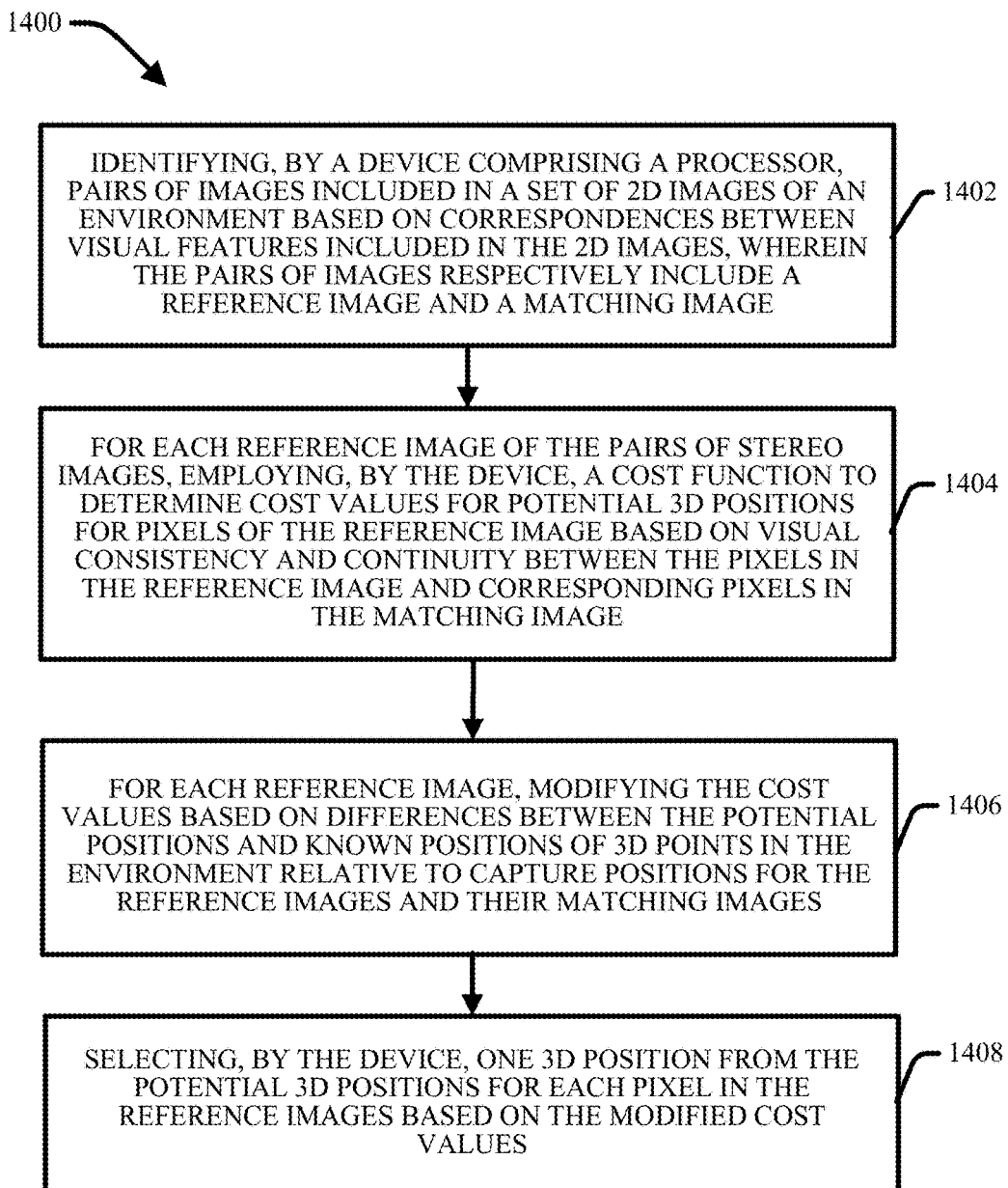
FIG. 14 provides a flow diagram of an example method for performing depth assisted stereo processing in accordance with various aspects and embodiments described herein.

For example, FIG. 14 provides a high level flow diagram of an example method 1400 for determining depth values for respective points included in 2D images using depth-assisted stereo techniques in accordance with various aspects and embodiments described herein. In one or more embodiments, depth-assisted stereo component 1302 can be configured to perform one or more aspects of method 1400.

Figure 17:
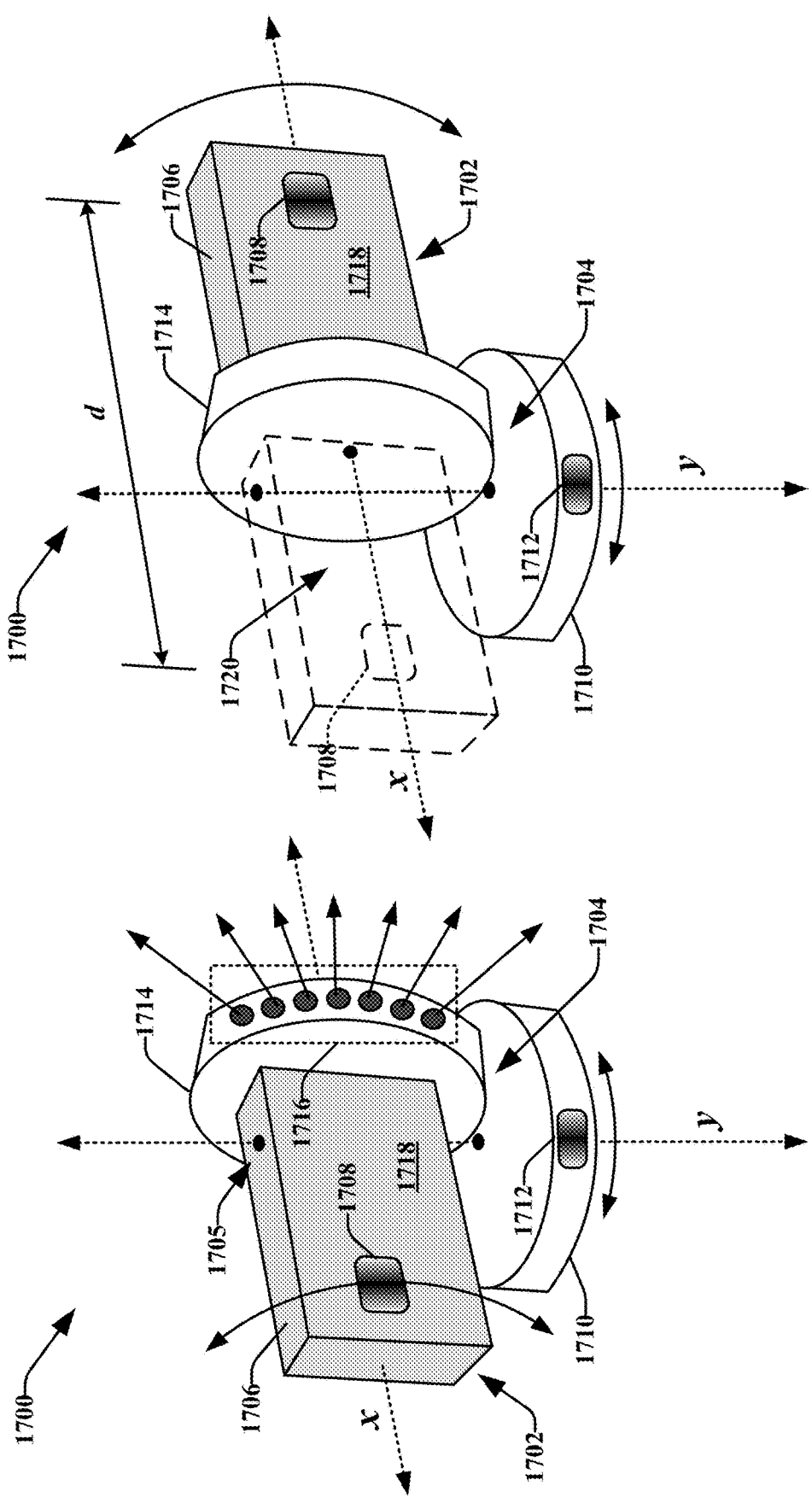
FIG. 17 illustrates different perspectives of an example 2D/3D panoramic capture device assembly in accordance with various aspects and embodiments described herein.

Method 1400 is described in association with determining depth values (e.g. 3D coordinates) for respective pixels included in panoramic 2D image data captured by a 2D/3D panoramic capture device (e.g. 2D/3D panoramic capture device 900 and the like) described herein, wherein the panoramic image data includes a set of 2D images captured from different perspectives, and at least some of the 2D images have partially overlapping fields-of-view. For example, the 2D images can include a plurality of stereo image pairs, wherein respective images of the stereo image pairs were captured at neighboring stop and shoot points during rotation of the 2D/3D panoramic capture device. In another example, the 2D images can include a plurality of stereo image pairs, wherein respective images of the stereo image pairs were captured at opposite azimuth points yet facing the same direction (as depicted in FIG. 17 described infra). In addition, method 1400 is described in association with employing 3D depth data captured and/or determined by the 2D/3D panoramic capture device using one or more depth sensor devices in association with capture of the 2D panoramic image data. For example, the depth sensor devices can include but are not limited to: a LiDAR device (including but not limited to solid-state variants), a structured light sensor device, a light-field camera, an assisted stereo system, a sonar device, etc. It should be appreciated however that method 1400 can be employed to improve stereo based depth derivation for images captured from various types of devices using various sources of additional depth information.

With reference to method 1400, at 1402, a device including a processor, (e.g. 2D/3D panoramic capture device 102, user device 106 and/or 3D modeling and navigation server device 112) identifies pairs of images included in a set of 2D images of an environment (e.g. images captured by 2D/3D panoramic capture device 900 and the like) as acceptable candidates for the stereo depth estimation algorithm. Such pairs are identified based on correspondences between visual features (e.g. pixels) included in the 2D images, wherein the pairs of stereo images respectively include a reference image and a matching image. For example, in one or more exemplary embodiments, the depth-assisted stereo component 1302 can be configured to initially analyze the 2D images captured by the 2D/3D panoramic capture device to identify pairs of images depicting the same structure by counting keypoint matches that have similar visual features (e.g. using the method described in Lowe, David G. "*Distinctive image features from scale-invariant keypoints.*" *International journal of computer vision* 60.2 (2004): 91-110, the entirety of which is incorporated herein by reference), and that are consistent with the known parameters of the cameras that captured the respective images (using well-known geometric constraints described in *Hartley, Richard, and Andrew Zisserman. Multiple view geometry in computer vision. Cambridge University Press,* 2003, the entirety of which is incorporated herein by reference). Respective images of these pairs are referred to herein as "neighbors," wherein one image of each pair can be characterized as the reference image and the other as the matching image. The depth-assisted stereo component 1302 can then filter out image pairs that have insufficient relative displacement relative to a threshold displacement, have insufficient overlap of viewing volumes relative to a threshold overlap volume, or whose difference in viewing angles are sufficiently large relative to a threshold angle. In another example, the depth-assisted stereo component 1302 can employ 3D depth data captured via one or more depth sensor devices of the 2D/3D panoramic capture device to facilitate identifying stereo image pairs. For instance, the 2D/3D panoramic capture device can include one or more depth sensor devices (e.g. a low-resolution time-of-flight 3D sensor device) that capture a collection of 3D points associated with a set of images captured by a 2D/3D capture device, wherein at least some of the images have partially overlapping fields-of-view and/or establish stereo pairs. The depth-assisted stereo component 1302 can further determine a sparse set of 2D point correspondence between the images by projecting each 3D point into those images and determining their resulting 2D positions.

At 1404, for each reference image of the pairs of stereo images, the device can employ a cost function to determine cost values for potential 3D positions for pixels in the reference image based on visual consistency and continuity between the pixels in the reference image and corresponding pixels in the matching image. Several methods have been proposed that combine both a visual consistency criteria and a preference for continuous 3D surfaces and provide a good approximate solution for determining respective 3D positions of respective pixels in a reference image. These methods begin by constructing a so-called "cost volume," a three-dimensional table that records the "cost" of several candidate 3D position of every pixel in a reference image. The depth-assisted stereo component 1302 can employ various cost functions to determine the cost values for potential 3D positions for each pixel of the reference image, including but not limited to the "Mutual Information" (SGM-MI) cost function disclosed in *H. Hirschmuller, "Accurate and efficient stereo processing by semi-global matching and mutual information,"* 2005 IEEE Computer Society Conference on Computer Vision and Pattern Recognition (CVPR'05), 2005, the entirety of which is incorporated herein by reference.

Other suitable cost functions can include but are not limited to: "a census transform cost function," such as that described in Zabih, Ramin, and John Woodfill. *"Non parametric local transforms for computing visual correspondence." European conference on computer vision. Springer Berlin Heidelberg,* 1994., or "a sum of absolute differences cost function" such as that described in *Birchfield, Stan, and Carlo Tomasi. "Depth discontinuities by pixel-to-pixel stereo." International Journal of Computer Vision* 35.3 (1999): 269-293. The entireties of the aforementioned publications are incorporated herein by reference. Further, in some implementations, instead of using a single matching image for each reference image, the depth-assisted stereo component 1302 can use multiple matching "neighbor" images and set the initial cost volume values using evidence from all matching image.

At 1406, for each reference image, the device can modify the cost values based on differences between the potential positions and known positions of 3D points in the environment relative to capture positions for the reference images and their matching images. For example, the cost volume may be represented as a grid of values for each (x,y,d) coordinate, where (x,y) is a pixel coordinate in the reference image, and 'd' is the "disparity" value that corresponds to a unique 3D point for pixel (x,y). The depth-assisted stereo component 1302 can determine a disparity value for any known 3D point included in 3D depth data for the environment captured via one or more depth sensor devices when the known 3D points are included within the 2D overlapping fields-of-view of a reference image and a matching image. The disparity value for each known 3D point can correspond to a difference between a first position of the 3D point as projected to the reference image and a second position of the 3D point as projected to the matching image. For example, for each 3D point having a known position (x,y,z), the depth-assisted stereo component 1302 can determine its corresponding position in the rectified reference image (x,y), and its corresponding position in the rectified matching image (x',y'), and compute the disparity value d, wherein d=round(|x'−x|). The depth-assisted stereo component 1302 can further increase the cost values for each possible pixel position associated with a 3D point based on differences between the its associated disparity value and the disparity value of the 3D point provided by a depth sensor. For example, for every position in the cost volume (x,y,D) for all values of D not equal to d, set the corresponding cost to infinity (or the maximum value feasibly representable). In other embodiments, instead of setting the penalized cost values to infinity, the penalized cost values can be set to some smaller value. In another embodiment, instead of setting the penalized cost values to the same value, the cost values can be varied so that disparities similar to that specified by the cue are penalized less than disparities with greater difference in disparity.

At 1408, the device can then select one 3D position from the potential positions for each pixel in the reference images based on the modified cost values. For example, for each pixel, the depth-assisted stereo component 1302 can select the potential 3D position associated with the lowest cost value in a strategy known as "winner take all." In some additional embodiments, one or more additional passes of cost aggregation can be applied after modifying the cost values but before estimating 3D point positions. Example cost aggregation methods could include but are not limited to "a semi-global matching aggregation scheme" such as that proposed in *H. Hirschmuller, "Accurate and efficient stereo processing by semi-global matching and mutual information,"* 2005 IEEE Computer Society Conference on Computer Vision and Pattern Recognition (CVPR'05), 2005, or "an adaptive support weight aggregation scheme" such as that proposed in *Hosni, Asmaa, Michael Bleyer, and Margrit Gelautz. "Secrets of adaptive support weight techniques for local stereo matching." Computer Vision and Image Understanding* 117.6 (2013): 620-632. The entireties of the aforementioned publications are incorporated herein by reference. In some embodiments, instead of using the "winner take all" strategy to estimate 3D point positions from the cost volume, alternative methods may be used. For example, global optimization methods may be employed to estimate the 3D position for each pixel given the cost volume. Such algorithms could include "a graph cuts-based optimizer" such as that proposed in Kolmogorov, V., & Zabih, R. (2001). *"Computing visual correspondence with occlusions using graph cuts." In Computer Vision,* 2001. ICCV 2001; or "a belief propagation-based optimizer" such as the one employed in Sun, Jian, Nan-Ning Zheng, and Heung-Yeung Shum. *"Stereo matching using belief propagation." IEEE Transactions on pattern analysis and machine intelligence* 25.7 (2003): 787-800. The entireties of the aforementioned publications are incorporated herein by reference.

Although various aspects of depth assisted stereo component 1302 are discussed in association with improving the accuracy of stereo based depth calculations performed using stereo images and additional depth data captured by 2D/3D panoramic capture device 900 and 1200, the features and functionalities of the depth assisted stereo component 1302 are not limited to only these 2D/3D panoramic capture device embodiments. In particular, the techniques performed by the depth assisted stereo component 1302 can be applied to improve the accuracy of stereo based depth determinations using stereo images generated from variousos capture devices that also capture at least some auxiliary depth data capture in conjunction with the stereo images, including 2D/3D panoramic capture device 200, 300, 400 and additional capture devices and capture device assemblies described herein. For example, the depth assisted stereo component 1302 can be employed to enhance depth determinations made based on stereo images generated from adjacent pairs of cameras (e.g., cameras 206) of 2D/3D panoramic capture devices 200 and 300 in association with depth data captured via the respective depth detection components (e.g., depth detection components 204).

Figure 15:
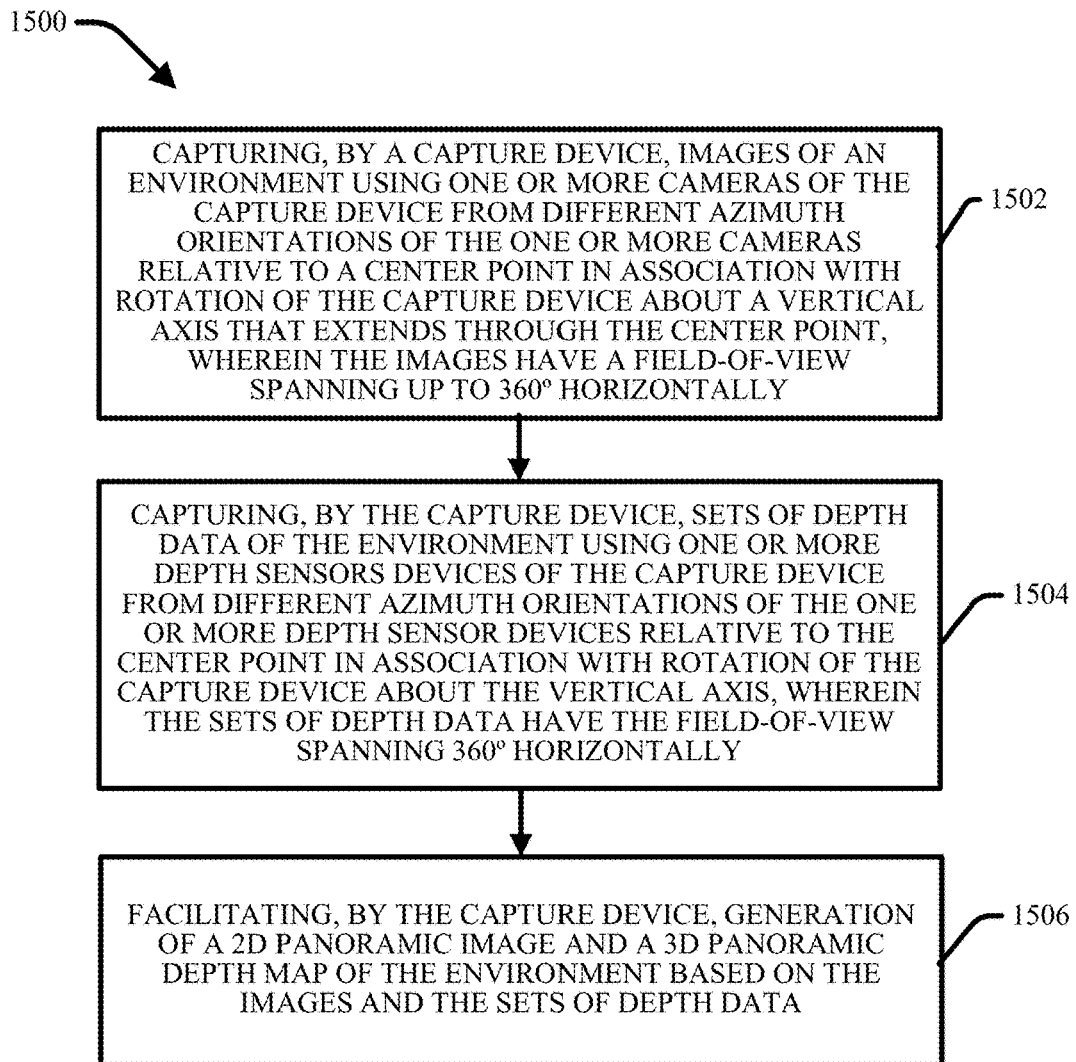
FIG. 15 provides a flow diagram of another example method for generating 2D and 3D panoramic images in accordance with various aspects and embodiments described herein.

FIG. 15 provides a flow diagram of an example method 1500 for generating 2D and 3D panoramic images in accordance with various aspects and embodiments described herein. Repetitive description of like elements employed in respective embodiments is omitted for sake of brevity.

At 1502 a capture device (e.g. 2D/3D panoramic capture device 900) can capture images of an environment using one or more cameras of the capture device from different azimuth orientations of the one or more cameras relative to a center point in association with rotation of the capture device about a vertical axis that extends through the center point, wherein the images have a field-of-view spanning up to 360° horizontally. For example, the combined field-of-view of the respective images can provide a 360° view of the environment or some fraction of the 360° view of the environment. At 1504, the capture device can capture sets of depth data of the environment (e.g. rings of depth data) using one or more depth sensors devices of the capture device (e.g. rotating LiDAR unit 904) from different azimuth orientations of the one or more depth sensor devices relative to the center point in association with rotation of the capture device about the vertical axis, wherein the sets of depth data have the field-of-view spanning up to 360° horizontally. At 1506, the capture device can facilitate generation of a 2D panoramic image and a 3D panoramic depth map of the environment based on the images and the sets of depth data. For example, the capture device or another device (e.g. user device 106 and/or 3D modeling and navigation server device 112) can generate a 2D panoramic image via stitching respective 2D images together using the sets of depth data respectively associated therewith (e.g. via stitching component 508). In another example, the capture device or another device can generate a 3D panoramic image of the environment by determining 3D spatial positions for pixels included in the images relative to a common 3D coordinate space based on the sets of depth data (e.g. via 2D/3D panoramic image generation component 502), projecting the sets of depth data onto the common 3D coordinate space to generate a 3D point cloud (e.g. via projection component 506), and projecting color data from the pixels onto respective points of the point cloud based on the 3D spatial positions of the pixels (e.g. via projection component 506).

Figure 16:
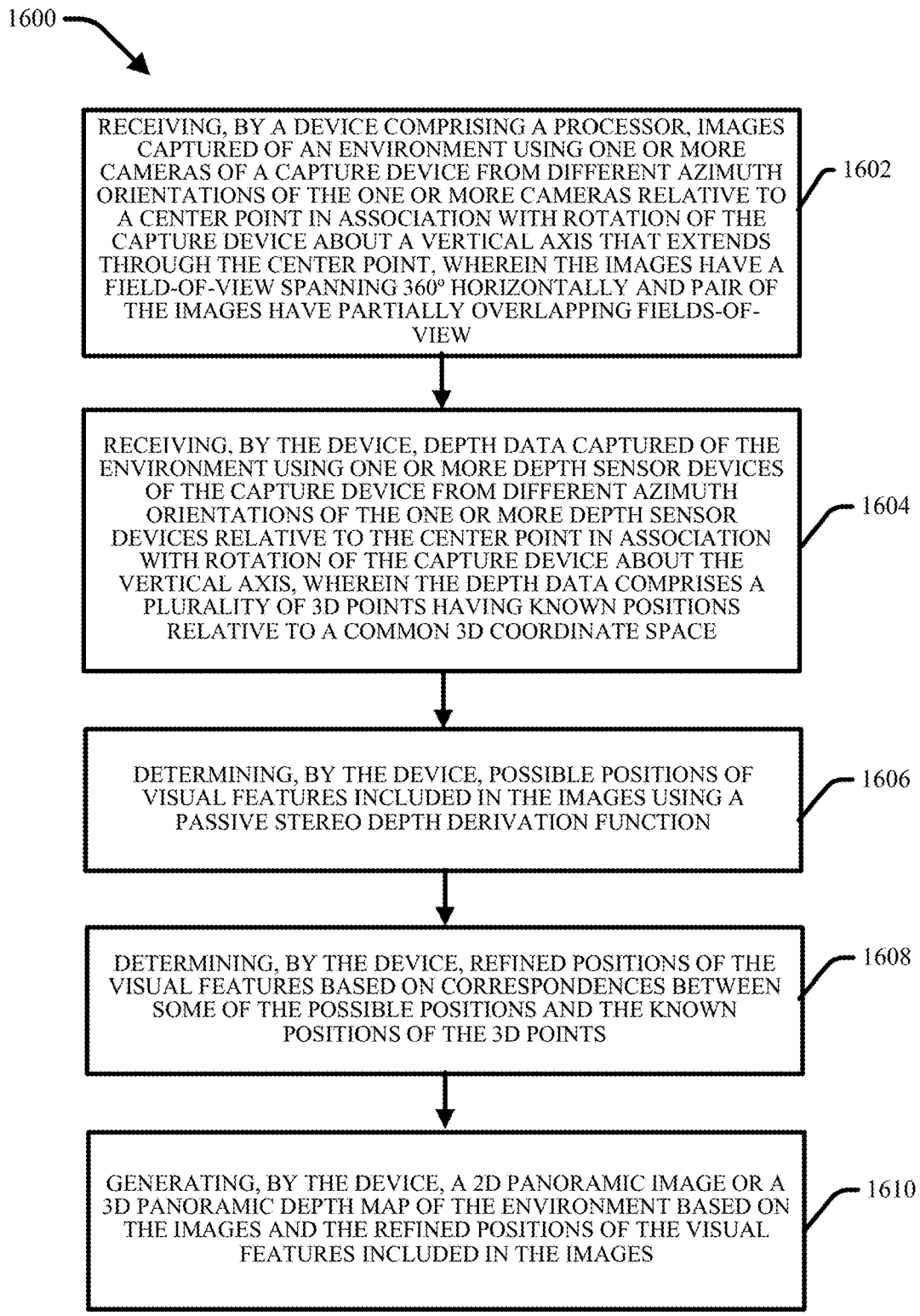
FIG. 16 provides a flow diagram of another example method for generating 2D and 3D panoramic images in accordance with various aspects and embodiments described herein.

FIG. 16 provides a flow diagram of another example method 1600 for generating 2D and 3D panoramic images in accordance with various aspects and embodiments described herein. Repetitive description of like elements employed in respective embodiments is omitted for sake of brevity.

At 1602, a device comprising a processor, (e.g. 2D/3D panoramic capture device 900 and the like, user device 106 and/or 3D modeling and navigation server device 112) receives images captured of an environment using one or more cameras of a capture device from different azimuth orientations of the one or more cameras relative to a center point in association with rotation of the capture device about a vertical axis that extends through the center point, wherein the images have a field-of-view spanning up to 360° horizontally and pairs of the images have partially overlapping fields-of-view. At 1604 the device receives depth data captured of the environment using one or more depth sensors devices of the capture device from different azimuth orientations of the one or more depth sensor devices relative to the center point in association with rotation of the capture device about the vertical axis, wherein the depth data comprises a plurality of 3D points having known positions relative to a common 3D coordinate space. At 1606, the device determines possible positions of visual features included in the images using a passive stereo depth derivation function (e.g. via depth-assisted stereo component 1302). At 1608, the device determines refined positions of the visual features based on correspondences between some of the possible positions and the known positions of the 3D points (e.g. via depth-assisted stereo component 1302). At 1610, the device generates a 2D panoramic image or a 3D panoramic depth map of the environment based on the images and the refined positions of the visual features included in the images (e.g. via 2D/3D panoramic image generation component 502).

FIG. 17 illustrates different perspectives of an example 2D/3D panoramic capture device assembly 1700 in accordance with various aspects and embodiments described herein. 2D/3D panoramic capture device assembly 1700 includes a capture device 1702 and a rotation device 1704. In one or more embodiments, the 2D/3D panoramic capture device 102 of system 100 can be or include one or more features and functionalities of 2D/3D panoramic capture device assembly 1700. Repetitive description of like elements employed in respective embodiments is omitted for sake of brevity.

Similar to 2D/3D panoramic capture device 900 and the like, the 2D/3D panoramic capture device assembly 1700 is configured to employ one or more cameras whose collective fields-of-view span less than 360° to capture 2D images of an environment from a fixed location of the 2D/3D panoramic capture device assembly 1700, wherein the 2D images provide a 360° view of the environment when combined. In particular, the 2D/3D panoramic capture device assembly 1700 incorporates one or more color cameras attached to a rotation device 1704 that includes a two-axis rotatable mount. The two-axis rotatable mount facilitates rotation of the capture device 1702 about a vertical y axis and a horizontal x axis. In one or more embodiments, by capturing images by the capture device 1702 during rotation of the rotation device 1704 360° about the vertical y axis and 180° about the horizontal x axis, the 2D/3D panoramic capture device assembly 1700 can capture a plurality of stereo images with mutually overlapping fields-of-view but different viewpoints. 3D depth information can be derived from the stereo images using passive stereo depth derivation techniques. In addition, the 2D/3D panoramic capture device assembly 1700 can include one or more depth sensor devices and/or associated hardware to enable sparse active depth sensing in regions where passive stereo traditionally fails. This additional depth information can be employed to assist the stereo based depth derivation analysis to achieve better quality 3D depth estimates (e.g. via depth-assisted stereo component 1302). The collection of captured 2D images can be merged and aligned to generate a panoramic 2D image of the environment and the associated derived 3D depth data can be merged and aligned to generate a 3D image of the environment. As a result, the 2D/3D panoramic capture device assembly 1700 can generate panoramic 2D image and 3D depth data while reducing the overall device cost attributed to usage of multiple cameras and/or depth sensor devices.

Similar to 2D/3D panoramic capture devices 200, 300, 400, 900, and 900, the 2D/3D panoramic capture device assembly 1700 is capable of capturing and/or generating panoramic color photographs as well as more advanced panoramic data such as but not limited to: panoramic 3D depth images, panoramic video, and panoramic 3D video. In addition, multiple panoramic images and/or video clips captured at different nearby locations may be combined using additional software to create a larger, immersive 3D space. For example, the 2D/3D panoramic capture device assembly 1700 can be moved to different locations within a physical environment (e.g. a home, an estate, a town, etc.) to capture panoramic 2D/3D data at the respective locations which can be combined to generate an immersive 3D model of the physical environment. In an embodiment in which the 2D/3D panoramic capture device assembly 1700 is configured to capture and/or generate limited depth data (e.g. relative to panoramic capture devices 200, 300, 400, 900 and the like), the 2D/3D panoramic capture device assembly 1700 can employ various positional tracking techniques (e.g. inertial position tracking, visual odometry, etc.) to accurately determine each capture location relative to one another.

The 2D/3D panoramic capture device assembly 1700 includes a capture device 1702 and a rotation device 1704. The rotation device 1704 includes a horizontal rotatable mount 1710 configured to rotate about a vertical y axis, and a vertical rotatable mount 1714 configured to rotate about a horizontal x axis. The capture device 1702 includes at least one camera 1708 positioned offset from the vertical y rotation axis. The features and functionalities of the camera 1708 can vary. For example, the field-of-view and resolution of the camera 1708 can vary. In an exemplary embodiment, the camera 1708 includes a color camera with a relatively wide field-of-view (e.g. greater than or equal to about 120°) and a relatively high resolution with video capabilities. For example, the camera 1708 can include a fisheye camera with a field-of-view from about 100° to about 195°. However in other embodiments, the camera 1708 can have a limited field-of-view (e.g. less than 100°). In some implementations, the camera 1708 can be configured to capture only still images. However, in other implementations, the camera 1708 can also be configured to capture video.

In one or more embodiments, the capture device 1702 can be configured to removably attach and detach from the rotation device 1704. For example, the rotation device 1704 can include a suitable attachment mechanism via which the capture device 1702 can physically attach to the rotation device 1704, such as via a peg and slot, a port, a magnetic coupling mechanism, etc. In some embodiments, the capture device 1702 can become electrically and/or communicatively coupled to the rotation device 1704 when physically attached to the rotation device 1704. In another embodiment, the capture device 1702 can be permanently fixed to the rotation device 1704. In some implementations of this embodiment, the capture device 1702 can further be electrically and/or communicatively coupled to the rotation device 1704.

In some embodiments, the capture device 1702 can include a tablet or phone with one or more built in cameras that correspond to camera 1708 (as well as one or more depth sensors in some implementations described below). For example, the capture device 1702 can include a smartphone having a high resolution camera configured to capture high dynamic range (HDR) images with video recording capabilities. In another example, the capture device 1702 can be or include the user device 106 of system 100. Although not shown, in association with performance of a scan, the panoramic capture device assembly 1700 can placed on or attached to any suitable (stable) apparatus that is a defined height above the ground, such as a tripod (e.g. tripod 1004).

In one or more embodiments, the horizontal rotatable mount 1710 can be configured to rotate up to 360° clockwise or counter clockwise about the vertical y axis and the vertical rotatable mount 1714 can be configured to rotate up to 360° clockwise or counterclockwise about the horizontal x axis. In another embodiment, the horizontal rotatable mount 1710 can be configured to rotate up to 180° clockwise or counter clockwise about the vertical y axis and the vertical rotatable mount 1714 can be configured to rotate up to 180° clockwise or counter clockwise about the horizontal axis x. The vertical rotatable mount 1714 can be positioned at or near a center point of the horizontal rotatable mount 1710 at a perpendicular or substantially perpendicular angle relative to the horizontal rotatable mount 1710. In one or more implementations, the horizontal rotatable mount 1710 and the vertical rotatable mount 1714 can be physically coupled. In some implementations, the horizontal rotatable mount 1710 and the vertical rotatable mount 1714 can also be electrically and/or communicatively coupled.

In various embodiments, the respective mounts can include electrical components and one or more power sources (e.g. provided within respective housings of the respective mounts) to facilitate one or more operations of the respective mounts. The electrical components can be powered via the one or more power sources. The electrical components can vary depending on the particular features and functionality of the capture device 1702 and the rotation device 1704, however the electrical components can include at least one motor (e.g. servomotor) configured to effectuate rotation of the respective mounts. For example, in one or more embodiments, the horizontal rotatable mount 1710 and the vertical rotatable mount 1714 can respectively include one or more motors (e.g. servomotors) to effectuate rotation of the respective mounts. In other implementations, the horizontal rotatable mount 1710 and/or the vertical rotatable mount 1714 can be manually rotated.

In some implementations, the respective mounts can be configured to rotate independently of one another (e.g. rotation of the horizontal rotatable mount 1710 does not cause or effect rotation of the vertical rotatable mount 1714, and vice versa). For example, in some implementations, the vertical rotatable mount 1714 can be rotated 360° at various evenly space rotation angles of the horizontal rotatable mount 1710, or vice versa. In another implementation, rotation of the respective mounts can be linked such that rotation of the horizontal rotatable mount 1710 causes rotation of the vertical rotatable mount 1714 or vice versa. According to this implementation, rotation of the respective mounts can be calibrated such that rotation of one of the rotatable mounts in first defined direction, degree, and/or speed causes the other one of the rotatable mounts to rotate a second defined direction, degree and/or speed.

In the embodiment shown, the capture device 1702 is physically attached to a side surface of the vertical rotatable mount 1714 to facilitate changing an orientation of the capture device 1702 and the camera 1708 located thereon. For example, the orientation of the camera 1708 can be tilted upwards in response to rotation of the vertical rotatable mount 1714 counter clockwise and the orientation of the camera 1708 can be tilted downwards in response to rotation of the vertical rotatable mount 1714 clockwise. In another example, rotation of the vertical rotatable mount 1714 180° clockwise or counterclockwise will cause the capture device 1702 to flip over 180°. The position of the capture device 1702 and camera 1708 provided thereon can also be changed via rotation of the horizontal rotatable mount 1710. In particular, the camera 1708 can be positioned at various azimuth orientations (e.g. 0° to 360°) relative to a center point (e.g. point 705) through which the vertical y axis extends by rotating the horizontal rotatable mount 1710 clockwise or counterclockwise. As a result, by continuously capturing 2D images and/or by capturing 2D images at two or more defined rotation points as the horizontal rotatable mount 1710 is rotated, the camera 1708 can capture a collection of 2D images whose collective fields-of-view span up to 360° horizontally.

The capture device 1702 includes a housing 1706 within which various electrical components and one or more power sources are housed. The electrical components can be powered via the one or more power sources. The electrical components can vary depending on the particular features and functionality of the capture device 1702 and the rotation device 1704. In various embodiments, these electrical components can include, but are not limited to, one or more processors, memories, transmitters, receivers, transceivers, cameras, camera circuitry, depth sensor devices, depth sensor device circuitry, light projection systems and associated circuitry, light emitter, lasers, sensors, sensing circuitry, antennas and other components. The capture device 1702 includes at least one camera 1708 located on and/or within the housing 1706 on a front surface/side 1718 of the capture device. The camera 1708 may be positioned at or near an end of the front surface/side 1718 of the housing 1706. In particular, the camera 1708 may be positioned off-center from a center point (e.g. point 1705) of the capture device 1702. As a result, the optical center of the camera 1708 is offset horizontally from the vertical y rotation axis by a defined distance (e.g. about 3.0 cm).

By positioning the camera 1708 off-center, a pair of stereo images can be generated when the camera 1708 has a field-of-view of about 100° or more and captures images at opposite azimuth orientations yet facing the same direction. For example, as shown in FIG. 17, in the left perspective of 2D/3D panoramic capture device assembly 1700, the camera 1708 is provided at a first position and forward facing orientation (0° and forward facing). The camera 1708 can capture a first image at this first position and orientation and then the capture device 1702 can then be rotated 180° about the vertical y axis (e.g. via rotation of the horizontal rotatable mount 1710) and flipped 180° about the horizontal x axis (e.g. via rotation of the vertical rotatable mount 1714) to place the camera 1708 at the second position with the forward facing orientation (180° and forward facing) shown in the right perspective of 2D/3D panoramic capture device assembly 1700. The perspective of the 2D/3D panoramic capture device assembly 1700 on the right side of FIG. 17 includes a dashed figure representation 1120 of the capture device that to indicate the position and orientation of the capture device at the first position and orientation. As shown in FIG. 17, the position of the camera 1708 at the first position and orientation and the position of the camera at the second position and orientation is separated by a defined distance d. In various implementations, this distance d (also referred to as the baseline in the field of stereoscopy) can be about 6.5 cm (e.g. the inter-ocular distance). However, this distance d can vary (e.g. between 5.0 cm to about 20.0 cm). The camera 1708 can thus capture a second image as this second position and forward facing orientation and the first and second images can establish a pair of stereo images whose combined fields-of-view span 180° or more.

Accordingly, in one embodiment, the field of video of the camera 1708 is about 100° or more such that the combined fields-of-view of a first image captured by the camera 1708 at a first position and the forward facing orientation (0° and forward facing) and a second image captured by the camera 1708 at a second position and the forward facing orientation 1708 (180° and forward facing) after rotation of the camera 180° horizontally and vertically, is greater than 180° (e.g. wherein the field-of-view of the first image and the second image partially overlap). According to this embodiment, the 2D/3D panoramic capture device assembly 1700 can generate 2D imagery that spans an entire 360° view of the environment with a total of four 2D image captures by the camera 1708 and a total of four rotation events. Further, two pairs of stereo images can be generated from which 3D depth data can be derived. For example, as described above, a first image can be captured by the camera 1708 at the first position and forward facing orientation (0° and forward facing) and a second image can be captured by the camera 1708 at a second position and the forward facing orientation (180° and forward facing) after rotation of the camera 180° horizontally and vertically. Based on the field-of-view of the camera 1708 and the distance between the camera 1708 and the vertical y rotation axis, the first and second images can establish a stereo pair. Further, a third image can be captured by the camera 1708 at the first position and reverse facing orientation (0° and reverse facing) and a fourth image can be captured by the camera 1708 at the second position and the reverse facing orientation (180° and reverse facing) after rotation of the camera 180° horizontally and vertically as appropriate. Based on the field-of-view of the camera 1708 and the distance between the camera 1708 and the vertical y rotation axis, the third and fourth images can establish another stereo pair.

In various exemplary embodiments however, the 2D/3D panoramic capture device assembly 1700 can be configured to capture several 2D images (e.g. more than four) at various azimuth points of rotation relative to the vertical y rotational axis and from different orientations (e.g. forward facing and reverse facing) to generate several pairs of stereo images corresponding to different perspectives of an environment that collectively span up to 360° relative to the vertical y rotation axis. As a result, in addition to capturing 2D images that can be stitched together to generate a panoramic image, the 2D/3D panoramic capture device assembly 1700 can facilitate deriving depth information from a plurality of stereo images pairs spanning a 360° view to generate several sets of depth information associated with different azimuth orientations spanning the 360° view. This depth information can be employed to generate a panoramic 3D image (e.g. model or depth map) of the environment in addition to facilitating alignment of the 2D images.

For example, in one implementation, the camera 1708 can have a field-of-view greater than or equal to 100°, and panoramic capture device assembly 1700 can perform a capture process that involves capture of a first set of 2D images by the camera 1708 either continuously or at several defined azimuth points while rotating the capture device 1702 360° about the vertical y axis (e.g. via rotation of horizontal rotatable mount 1710) with the camera 1708 facing a first direction (e.g. forward facing). In an aspect, rotation of the camera 1708 can pause at each defined azimuth position to allow for capture of the 2D image (e.g. without camera movement). In some implementations, the camera 1708 can capture the respective 2D images by performing video recording at a high frame rate during rotation (e.g. 30 fps). In addition, in some implementations, at each rotational azimuth position and/or some rotational azimuth positions, panoramic capture device assembly 1700 can capture two or more 2D images at different pitches or orientations of the camera 1708 via rotation of the vertical rotatable mount 1714 (e.g. by degree less than 90°). After the first set of 2D images is obtained from the first perspective of the camera 1708 facing the first direction (e.g. forward facing), the camera orientation can be flipped 180° degrees to face the opposite direction (e.g. reverse facing), and the same process can be performed to obtain a second set of 2D images including 2D images captured at the same azimuth orientations as the respective 2D images included in the first set. For example, the camera 1708 can be flipped to face the opposite direction and rotated 360° around the vertical y axis while capturing 2D images either continuously or at the defined azimuth positions. The images in the first set can be combined with the images in the second set to determine plurality of stereo image pairs (e.g. left and right images), wherein each stereo pair includes a first image from the first set captured a first azimuth position and a second image from the second set captured at a second azimuth position that is 180° relative to the first azimuth position (e.g. the respective images of each stereo pair are captured at opposite azimuth points, one corresponding to the left eye and the other corresponding to the right eye).

In another embodiment, the 2D/3D panoramic capture device assembly 1700 can be configured to capture only one set of 2D images (e.g. the first set or the second set described above). For example, the 2D/3D panoramic capture device assembly 1700 can be configured to employ a rotational schedule with several stop and shoot points to obtain a sequence of images with overlapping fields-of-view. According to this embodiment, rather than determining 3D data from stereo image pairs including images take from opposite azimuth points yet facing the same direction (e.g. forward facing or reverse facing), 3D depth data can be determined by performing stereo based depth derivation analysis on pairs of images including partially overlapping regions or fields-of-view. In yet another embodiment, based on the field-of-view of the camera 1708, the rotation device 1704 can employ a rotational schedule that results in capture of 2D images that provide only monocular coverage or incomplete stereo coverage (e.g. only a subset of the cameras may provide stereo coverage) as opposed to complete stereo coverage and 3D depth data can be determined using an alternative method.

In another embodiment, the capture device 1702 can include a second camera (not shown) located on a back surface/side of the housing 1706 (e.g. on the opposite surface/side including camera 1708) at a position directly behind the position of camera 1708. In particular, the position of the second camera on the back side/surface of the housing 1706 can correspond to the position of the camera 1708 on the front surface/side 1718 of the housing. With this embodiment, the capture process can involve simultaneous capture of 2D images by both cameras (e.g. the front facing camera 1708 and the reverse facing camera) at various azimuth points over a single 360° rotation of the capture device 1702. Pairs of stereo images can be established from first images captured by the forward facing camera 1708 and second images captured by the reverse facing camera at opposite azimuth orientations (e.g. 0° and 180°). In some implementations of this embodiment, the second or reverse facing camera can have a different resolution relative to the forward facing camera 1708. For example, in embodiments in which the capture device 1702 includes a conventional smartphone or tablet, camera 1708 can be or include the primary high resolution reverse facing camera of the smartphone and the forward facing or "selfie" camera of the smartphone can serve as the subject second camera. According to this embodiment, the second camera can have a lower resolution that is sufficient to facilitate deriving depth data using stereo image analysis techniques for a pair of stereo images when one of the images in the pair is captured by the lower resolution second camera and the other image of the pair is captured by the camera 1708 at a higher resolution. With this embodiment, those images captured via the higher resolution camera 1708 can be stitched together to generate a panoramic image while those images captured by the second lower resolution camera can merely be employed to derive depth information using stereo image analysis techniques.

In one or more embodiments, the vertical rotatable mount 1714 can also include a camera 1712 located on a side surface thereof. The features and functionalities of camera 1712 can vary. In an aspect, the camera 1712 includes a high resolution video camera with a wide field-of-view (e.g. greater than 100°, and preferably greater than or equal to about 120°). In some implementations, the camera 1712 can be configured to capture video at a relatively high frame rate (e.g. 30 fps or more) during rotation of the vertical rotatable mount 1714. The video captured by camera 1712 during rotation of the vertical rotatable mount 1714 can be employed to generate 360° 2D and/or 3D panoramic video. In one or more embodiments, the camera 1712 can be further configured to capture image data during movement of the panoramic capture device assembly 1700 to different nearby positions in association with scanning an environment to generate an immersive 3D model of the environment. The image data captured by camera 1712 during movement of the 2D/3D panoramic capture device assembly 1700 can be employed to facilitate determining each new capture position of the panoramic capture device assembly 1700 (e.g. using visual odometry). In other embodiments, rather than employing a single camera 1712, one or more lower field-of-view cameras can be provided on the horizontal rotatable mount 1710 pointing in different directions relative to one another and camera 1708 and visual odometry can be performed using visual cues captured by each of the cameras during movement of the 2D/3D panoramic capture system 170. In other implementations, in addition to the image data captured via camera 1712, the rotation device 1704 and/or the capture device can include an IMU configured to capture movement data (e.g. acceleration, speed, orientation, etc.) of the panoramic capture device assembly 1700 when moved to a new position. Such movement data can further be employed to determine each new position of the 2D/3D panoramic capture device assembly 1700 via inertial position tracking.

In various embodiments, the vertical rotatable mount 1714 can further include a light projection unit 1716 on a side surface thereof that includes an array of light projectors respectively configured to emit visible light or laser beams (e.g. as indicated by the various vector arrows extending from the respective circles of the light projection unit 1716 which correspond to laser or light projectors). The light projection unit 1716 can facilitate generating 3D depth data that can be combined with 3D depth data determined via stereo depth derivation techniques to improve the accuracy and quality of the 3D depth data. For example, during the capture process, the light projection unit 1716 can emit one or more visible light beams and/or lasers as camera 1708 and/or camera 1712 rotates 360° about the vertical y axis and captures images. The images captured by camera 1708 and/or camera 1712 will include light or laser beam points from which 3D depth information can be determined. The position and direction of the respective light projectors and/or beams relative to the camera 1708 and/or camera 1712 at time of capture can be calibrated and known. Accordingly, the 3D position of detected light beam intersection points with visual features in image data captured by camera 1708 and/or camera 1712 can be determined using triangulation. In some embodiments, the light projectors or lasers of the light projection unit 1716 can have a fixed position and orientation. In other embodiments the position and/or orientation of the light projectors or lasers can be dynamic and change throughout the capture process. Images captured by camera 1708 and/or camera 1712 can further be synchronized with the laser movement such that the position and orientation of each detected laser point in the captured image is known. Alternatively the position and orientation of a detected laser point can be inferred based on the image data.

In various embodiments, the light projection unit 1716 can be configured to project a defined light pattern as opposed to projecting several different laser or light beams. For example, the light projection unit 1716 can emit a light or laser through a holographic diffraction grating to generate a unique pattern. In another example, the pattern can be a single line (e.g. a line generated using a laser plus a cylindrical lens). 3D data can be discerned from captured images based on how the projected light pattern appears in the captured images (e.g. based on dimensions and distortions of the feature pattern in the image data).

In one or more embodiments, the light projection unit 1716 can continuously emit light or laser beams over the capture period as the camera 1708 and/or camera 1712 capture image data while rotating 360°. According to these embodiments, captured images including light emission can later be processed to remove the light emission when combining the images to generate a 2D panoramic image. In other embodiments, the 2D/3D panoramic capture device assembly 1700 can employ various techniques to generate a first set of images that do not include light emission and a second set of images including light emission from which depth data for visual features included in the first set of images can be discerned. For example, in one implementation, the light projection unit 1716 can be configured to time light projection with image data capture by camera 1708 such that light is not projected when the camera 1708 captures 2D images at predefined azimuth points. For example, the camera 1708 and/or camera 1712 can continuously capture image data over the course of rotation as the light projection unit 1716 emits light. However, the light projection unit 1716 can be configured to turn off or deactivate light emission according to defined capture and/or rotation schedule (e.g. at each defined azimuth capture point) when camera rotation is paused and the camera 1708 captures an HDR image. Accordingly, the capture process will generate a first set of HDR images captured by camera 1708 at defined azimuth points that do not include light emission and a second set of images that include light emission.

In another implementation in which the camera captures a first set of 2D images when rotated 360° in a forward facing direction and then captures a second set of 2D images when rotated 360° with a reverse facing orientation, the light projection unit can be configured to emit light for only one set of images. According to this implementation, the set of images including light emission can be employed to facilitate depth derivation using both active and passive stereo analysis, and the set of images that do not include light emission can be employed to generate a panoramic 2D image. In yet another implementation, in which the capture device 1702 includes a front and back camera, the light projection unit 1716 can be configured to continuously emit light in a direction of only one of the cameras (e.g. the second lower resolution camera) such that only images captured from that camera include light emission. Still in yet another implementation, throughout the capture process, camera 1712 and the light projection unit 1716 can be positioned to have overlapping fields-of-view yet opposite fields-of-view as camera 1708. According to this implementation, camera 1712 can be configured to capture images with light emission from which depth data can be determined while images captured by camera 1708 will not include light emission.

In various embodiments, the capture position and orientation of the cameras (e.g. camera 1708, a second camera opposite camera 1708 (not shown), camera 1712, etc.) and the light projection unit 1716 and/or respective light projectors can be determined based on calibrated or known positions of the respective cameras and/or light projectors relative to one another and known rotation points/positions of the horizontal rotatable mount 1710 and the vertical rotatable mount 1714 at the time of capture. In some implementations, the capture device 1702 and/or the rotation device 1704 can include an IMU, stepper motor, or ring encoder to capture movement data during rotation of the rotation device 1704 regarding rotation of the capture device 1702 and/or the rotation device 1704 from which the respective capture positions and orientations of the cameras and light projectors can be determined.

In some embodiments, in addition to or alternative to the light projection unit 1716, the capture device 1702 and/or the rotation device 1704 can include one or more other depth sensor devices configured to capture panoramic 3D depth data, including but not limited to one or more: a laser rangefinder device, time-of-flight sensor devices, LiDAR sensor devices (including but not limited to solid-state variants), structured light sensor devices, and light-field cameras. In implementations in which the 2D/3D panoramic capture device assembly 1700 employs two or more depth sensor devices with different fields-of-view that respectively employ light emitters (e.g. time-of-flight sensor devices, structured light sensor devices, and light/laser projection systems associated with performance of active or assisted stereo), the two or more of the depth sensor devices can share a common light emitter. In addition, in some embodiments, the 2D/3D panoramic capture device assembly 1700 can employ a combination of different depth sensor devices and/or depth derivation techniques to determine 360° depth information.

In some implementations in which the capture device 1702 and/or the rotation device 1704 includes a depth sensor device, depth information determined using passive stereo techniques may not be performed. With these implementations, the camera 1708 of the capture device 1702 does not need to be positioned at a defined distance relative to the vertical y axis to facilitate generating a pair of stereo images when the camera is rotated and flipped. Accordingly, with these implementations, the camera 1708 can be positioned at or near the center of the y axis and the x axis to facilitate generating a smooth panorama, wherein the respective capture locations (x, y, z coordinates) of the respective images captured by the camera 1708 are the same or substantially the same.

Figure 18:
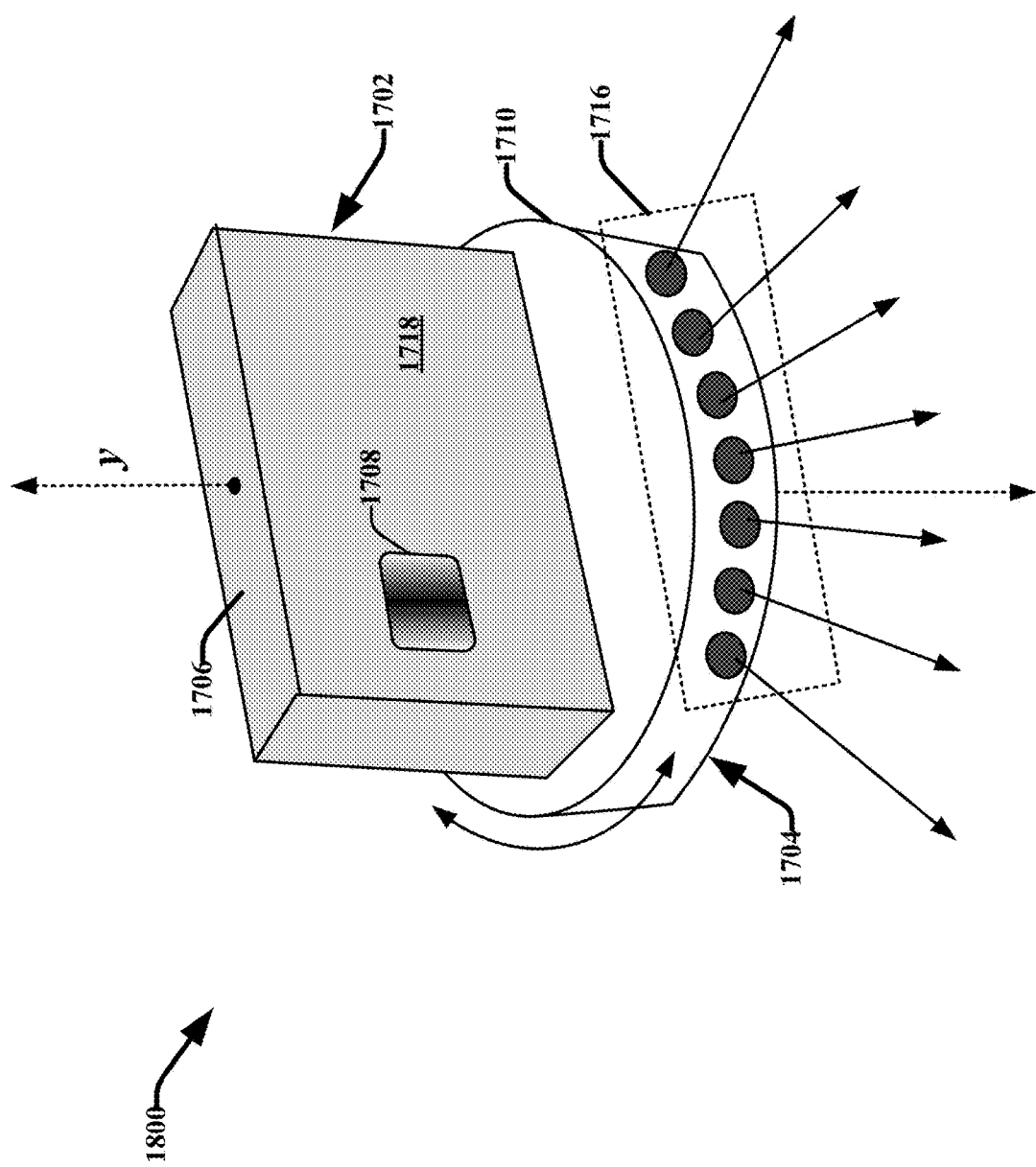
FIG. 18 illustrates another example 2D/3D panoramic capture device assembly in accordance with various aspects and embodiments described herein.

FIG. 18 illustrates another example 2D/3D panoramic capture device assembly 1800 in accordance with various aspects and embodiments described herein. The 2D/3D panoramic capture device assembly 1800 is a variation of 2D/3D panoramic capture device assembly 1700 with the differences noted below. Repetitive description of like elements employed in respective embodiments is omitted for sake of brevity.

With reference to FIGS. 17 and 18, 2D/3D panoramic capture device assembly 1800 includes same or similar features and functionalities as 2D/3D panoramic capture device assembly 1700. However, unlike panoramic capture device assembly 1700, the rotation device 1704 of 2D/3D panoramic capture device assembly 1800 includes only a horizontal rotatable mount 1710. According to this embodiment, the light projection unit 1716 can be provided on a side surface of the horizontal rotatable mount 1710. In some implementations, in order to capture at least two sets of images spanning up to 360° horizontally, one set comprising one or more images corresponding to a forward facing orientation of the capture device 1702 and another set comprising one or more images corresponding to a reverse facing orientation of the capture device 1702, the entire 2D/3D panoramic capture device assembly 1800 can be picked up and rotated 180°. The number of images included in each set can vary depending on the vertical and horizontal field-of-view of the camera. Alternatively, the capture device 1702 can include a second camera (not shown) on an opposite side of the housing 1706 and directly behind camera 1708 that points the opposite direction as 1708. Although not shown, in some embodiments, one or more additional cameras (e.g. camera 1712) can be provided on the horizontal rotatable mount 1710 (e.g. on an opposite side of the light projection unit 1716) to facilitate capturing panoramic video and/or video to assist in determining a new location of the 2D/3D panoramic capture device assembly 1800 (e.g. using visual odometry) when moved in association with a scan.

Figure 19:
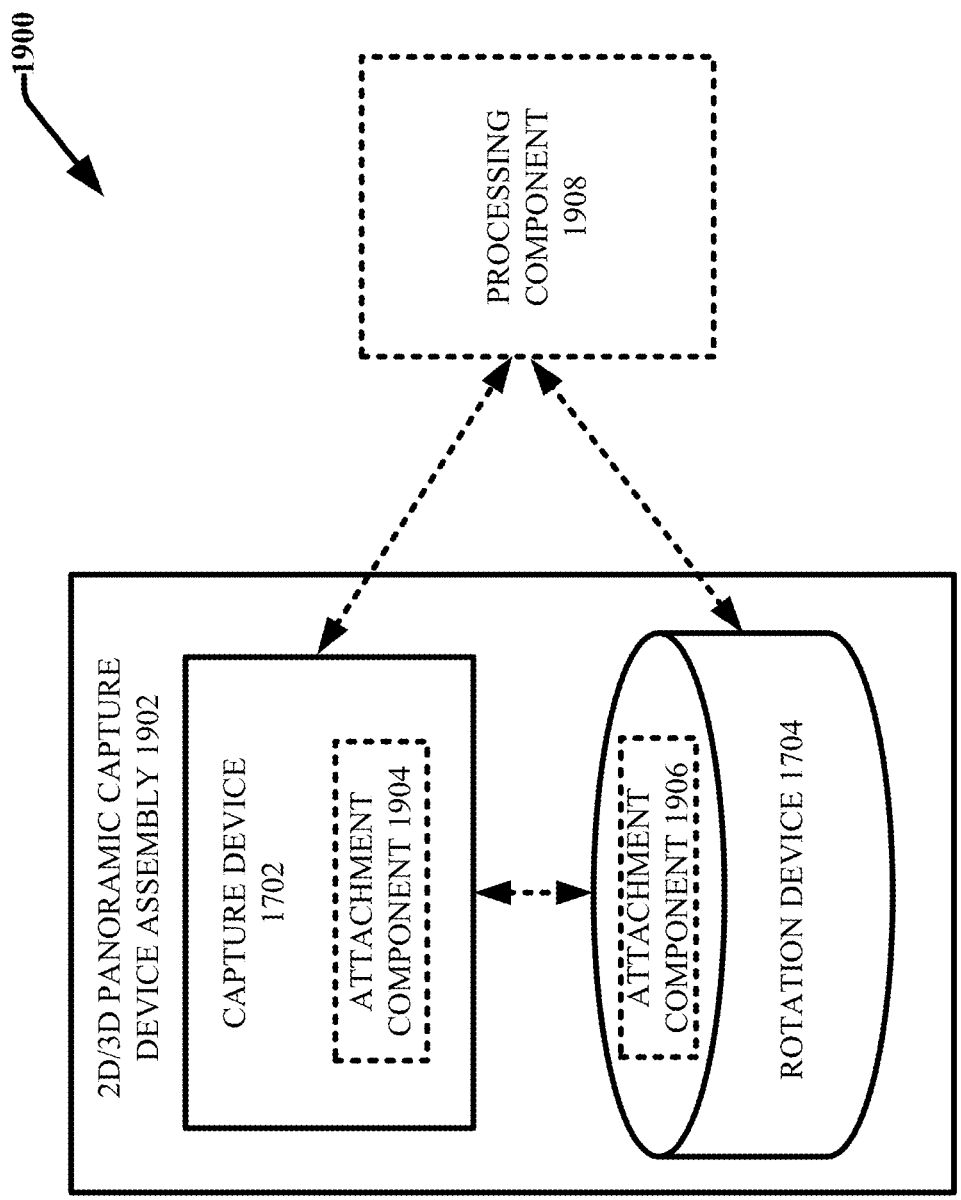
FIG. 19 presents a schematic block diagram of another example 2D/3D panoramic capture system in accordance with various aspects and embodiments described herein.

FIG. 19 presents a schematic block diagram of another example 2D/3D panoramic capture system 1900 in accordance with various aspects and embodiments described herein. System 1900 includes capture device 1702 and rotation device 1704, which collectively establish 2D/3D panoramic capture device assembly 1902. In one or more embodiments, system 1900 can be or include one or more features and functionalities of the panoramic capture device assembly 1700 and/or panoramic capture device assembly 1800. In various embodiments, the capture device 102 of system 100 can be or include panoramic capture device assembly 1902 of system 1900 and vice versa. Repetitive description of like elements employed in respective embodiments is omitted for sake of brevity.

As previously described, in various embodiments, the capture device 1702 and the rotation device 1704 can be configured to physically attach to one another via a suitable mechanical attachment mechanism. Accordingly, in the embodiment shown, the capture device 1702 and the rotation device 1704 respectively include attachment components 1904 and 1906 that facilitate physically attaching the respective devices. The respective attachment components 1904 and 1906 can respectively include coupling hardware configured to mechanically connect the respective devices (e.g. peg and slot hardware, magnetic coupling hardware, etc.). In some embodiments, the respective attachment components 1904 and 1906 can also facilitate electrically and/or communicatively attaching the respective devices.

System 1900 further includes processing component 1908. With reference to FIGS. 1 and 19, as previously discussed, 3D panoramic imagery including 2D images and 3D data captured by a 2D/3D panoramic capture device described herein (e.g. 2D/3D panoramic capture devices 102, 200, 300, 400, 900, 900, 1700, 1800 and the like), including 2D/3D panoramic capture device assembly 1902, can be processed in order to generate panoramic color photographs as well as more advanced panoramic data such as but not limited to: panoramic color videos, panoramic 3D depth images (e.g. a 3D depth map or model), and panoramic 3D depth video. In addition, a plurality of panoramic images and/or video clips captured by the 2D/3D panoramic capture devices and 2D/3D panoramic capture device assembly 1902 described herein at different nearby locations can be combined and aligned using the 3D data respectively associated therewith (as well as information regarding camera and depth sensor device capture position and orientation) to generate immersive 3D space models. In various embodiments, processing component 1908 can be configured to perform one or more of the various processing functionalities described above.

As previously described, various aspects of such processing of 2D image and 3D depth data can be performed at the 2D/3D panoramic capture device (e.g. via primary processing component 104), at the user device 106 via secondary processing component 110), and/or at the 3D modeling and navigation server device 112 (e.g. via the tertiary processing component 114). Further, with respect to 2D/3D panoramic capture device assembly 1902, various aspects of such processing of 2D image and 3D depth data can also be performed by capture device 1702 and/or rotation device 1704. In this regard, one or more features and functionalities of processing component 1908 can be located at the capture device 1702, the rotation device 1704, the user device 106 (e.g. at the secondary processing component 110), and/or the 3D modeling and navigation server device 112 (e.g. at the tertiary processing component 114). The various components and associated features and functionalities of processing component 1908 are discussed in greater detail below with respect to FIG. 22.

Figure 20:
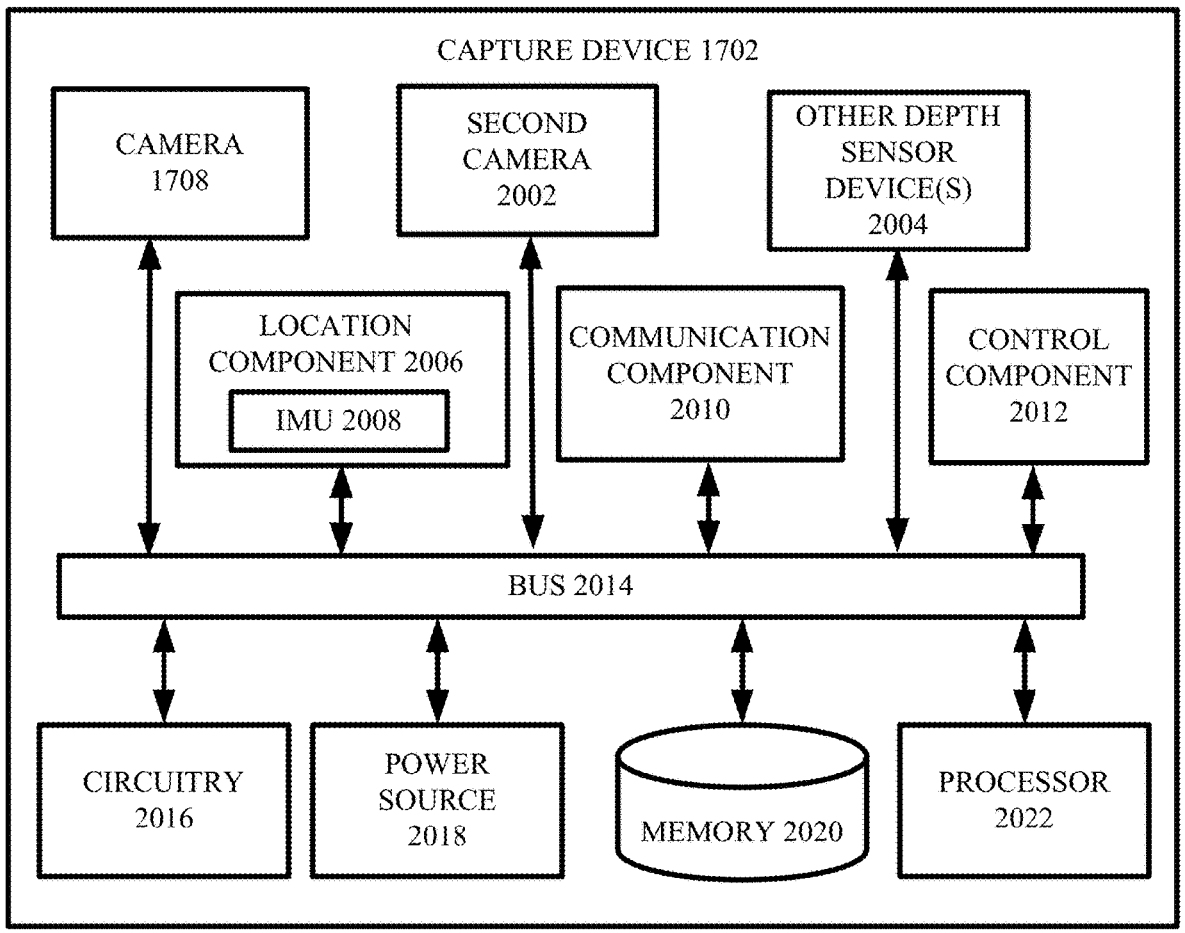
FIG. 20 presents a schematic block diagram of an example capture device of a 2D/3D panoramic capture device assembly in accordance with various aspects and embodiments described herein.

FIG. 20 presents a schematic block diagram of example capture device 1702 in accordance with various aspects and embodiments described herein. Repetitive description of like elements employed in respective embodiments is omitted for sake of brevity.

With reference to FIGS. 1, 17, 18, 19 and 20, capture device 1702 can include at least one high resolution color camera 1708 provided on and/or within a housing (e.g. housing 1706) at a position that may be offset from a center point of the capture device. In some embodiments, the capture device 1702 can include a second camera 2002 provided on and/or within the housing on an opposite surface of the housing including camera 1708 such that the respective cameras point in opposite directions. In various embodiments, the second camera 2002 can be located directly behind (or substantially directly behind) camera 1708. For example, the capture device 1702 can be or include a mobile phone, smartphone, tablet or the like and include a primary camera that is built into the device on the backside of the device. In some implementations, the mobile phone, smartphone, tablet, etc., can also include and front facing ("selfie") camera on the front side of the capture device. In some embodiments, the capture device 1702 can be or include the user device 106 of system 100.

In one or more embodiments, the capture device 1702 can further include one or more other depth sensor devices 2004, a location component 2006, a communication component 2010, a control component 2012, circuitry 2016, and power source 2018. The capture device 1702 can include memory 2020 configured to store computer executable components and instructions and processor 2022 to facilitate operation of the instructions (e.g. computer executable components and instructions) by the capture device 1702. In some embodiments, the memory 2020 can also store captured 2D image data and 3D depth information captured by the capture device 1702 and/or the rotation device 1704. In other embodiments, the capture device 1702 can include additional memory (e.g. volatile or non-volatile memory) to store the captured 2D/3D data. The capture device 1702 can further include a device bus 2014 that couples the various components of the capture device 1702, including, but not limited to, the cameras 1708, the second camera 2002, the other depth sensor devices 2004, the location component 2006, the communication component 2010, the control component 2012, the circuitry 2016, the power source 2018, the memory 2020 and the processor 2022.

The one or more other depth sensor devices 2004 can include one or more other depth sensor devices configured to capture panoramic 3D depth data, including but not limited to one or more: a laser rangefinder device, time-of-flight sensor devices, LiDAR sensor devices (including but not limited to solid-state variants), structured light sensor devices, and light-field cameras.

The location component 2006 can include hardware, software or a combination of hardware and software that facilitates determining a location of the 2D/3D panoramic capture device 1702. Accordingly, the location component 2006 can facilitate capturing data for determining precise capture locations of the 2D/3D panoramic capture device 1702 relative to other capture locations in association with performance of a scan of an environment when capturing 2D and 3D data for generating an immersive 3D space model of the environment. In one embodiment, the location component 2006 can include an IMU 2008, and/or accelerometer configured to capture movement data during movement of the 2D/3D panoramic capture device 1702 between capture positions. The movement data can be employed (e.g. by processing component 420) to determine the capture position of the 2D/3D panoramic capture device 1702 using inertial position tracking, structure-from-motion analysis, SLAM analysis, and the like. In other embodiments, the location component 2006 can include one or more video cameras to capture video data during movement of the 2D/3D panoramic capture device and/or control capturing video data from one or more existing cameras associated with the 2D/3D panoramic capture device (e.g., camera 1708, second camera 2002, or an additional camera) to facilitate determining the locations of the 2D/3D panoramic capture device using visual odometry techniques (e.g., structure-from-motion, SLAM, etc.). In other embodiments, the location component 2006 can include stationary sensors, ultrasonic systems, lasers scanners, etc., to facilitate determining a location of the 2D/3D panoramic capture device 1702 using visual odometry techniques, line of sight for mapping and localization, time-of-flight mapping and localization, and the like. Still in other embodiments, the location component 2006 can determine a location of the 2D/3D panoramic capture device 1702 using global positioning system (GPS) technology.

The communication component 2010 can be configured to facilitate wired and/or wireless communication between the capture device 1702 and an external device, such as the user device 106 and/or the 3D modeling and navigation server device 112. For example, the communication component 2010 can be or include various hardware and software devices associated with establishing and/or conducting wireless communication between the capture device 1702 and an external device. For example, communication component 2010 can control operation of a transmitter-receiver or transceiver (not shown) of the capture device 1702 to communicate raw and/or processed 2D/3D data with an external device (e.g. the user device 106 and/or the 3D modeling and navigation server device 112) and/or to receive control commands from the external device. The communication component 2010 can also facilitate communication between the capture device 1702 and the rotation device 1704. For example, the communication component 2010 can communicate raw and/or processed 2D and/or 3D data and/or control commands with the rotation device 1704. The communication component 2010 can facilitate wireless communication between the capture device 1702 and an external device using a variety of wireless telemetry communication protocols, including those described with reference to communication component 402. Repetitive description is omitted for sake of brevity.

The control component 2012 can include hardware, software, or a combination of hardware and software that facilitates controlling operation of the capture device 1702 and/or the rotation device 1704. For example, in some embodiments, the capture device 1702 and/or the rotation device 1704 can be remotely controlled/operated via control signals provided by an external device (e.g. user device 106 and/or 3D modeling and navigation server device 112). According to these embodiments, the control component 2012 can be configured to interpret control signals received from the external device (e.g. via communication component 2010) and cause the capture device 1702 to execute the commands defined by the control signals (e.g. commands associated with the capture of 2D images and 3D data by the capture device 1702, commands associated with capture of 2D images and 3D data by the rotation device 1704, commands associated with movement of the capture device 1702, including rotation of the rotation device 1704, commands associated with processing of captured 2D image and 3D data, commands associated with storage or communication of raw or processed 2D images and 3D data, etc.). In embodiments in which the capture device 1702 includes a tangible user interface that facilitates direct input for controlling the capture device 1702 and/or the rotation device 1704, the control component 2012 can include hardware (e.g. hard/soft buttons, a touchscreen, etc.) and software associated with the tangible user interface that facilitates providing and executing control commands, such as but not limited to those noted above.

The circuitry 2016 can include hardware, software or a combination of hardware and software employed to facilitate operation of the various components of the capture device 1702. For example, the circuitry 2016 can include, but is not limited to: circuitry for camera 1708 and second camera 2002, circuitry for the one or more other depth sensor devices 2004, circuitry for the location component 2006 and the IMU 2008, communication component 2010 hardware (e.g. antennas, transmitters, receivers, transceivers repeaters, etc.), and the like. The circuitry 2016 can facilitate various operations of the capture device 1702, including but not limited to, capture of 2D images and 3D data by the capture device 1702, control of the capture of 2D images and 3D data by the capture device and/or the rotation device 1704, 2D and 3D panoramic video capture, control of processing of the 2D images and 3D data, and wireless communication mode operations of the capture device 1702. The 2D/3D capture device 1702 further includes power source 2018 to drive the operations of the capture device 1702 and to provide power to the various electrical components of the capture device 1702. In some embodiments in which the capture device 1702 and the rotation device 1704 are configured to electrically couple, the power source 2018 can power the one or more electrical components of the rotation device 1704 as well. In one or more embodiments, the power source 2018 includes but is not limited to, a battery, a capacitor, a charge pump, a mechanically derived power source (e.g. microelectromechanical systems (MEMs) device), or an induction component.

Figure 21:
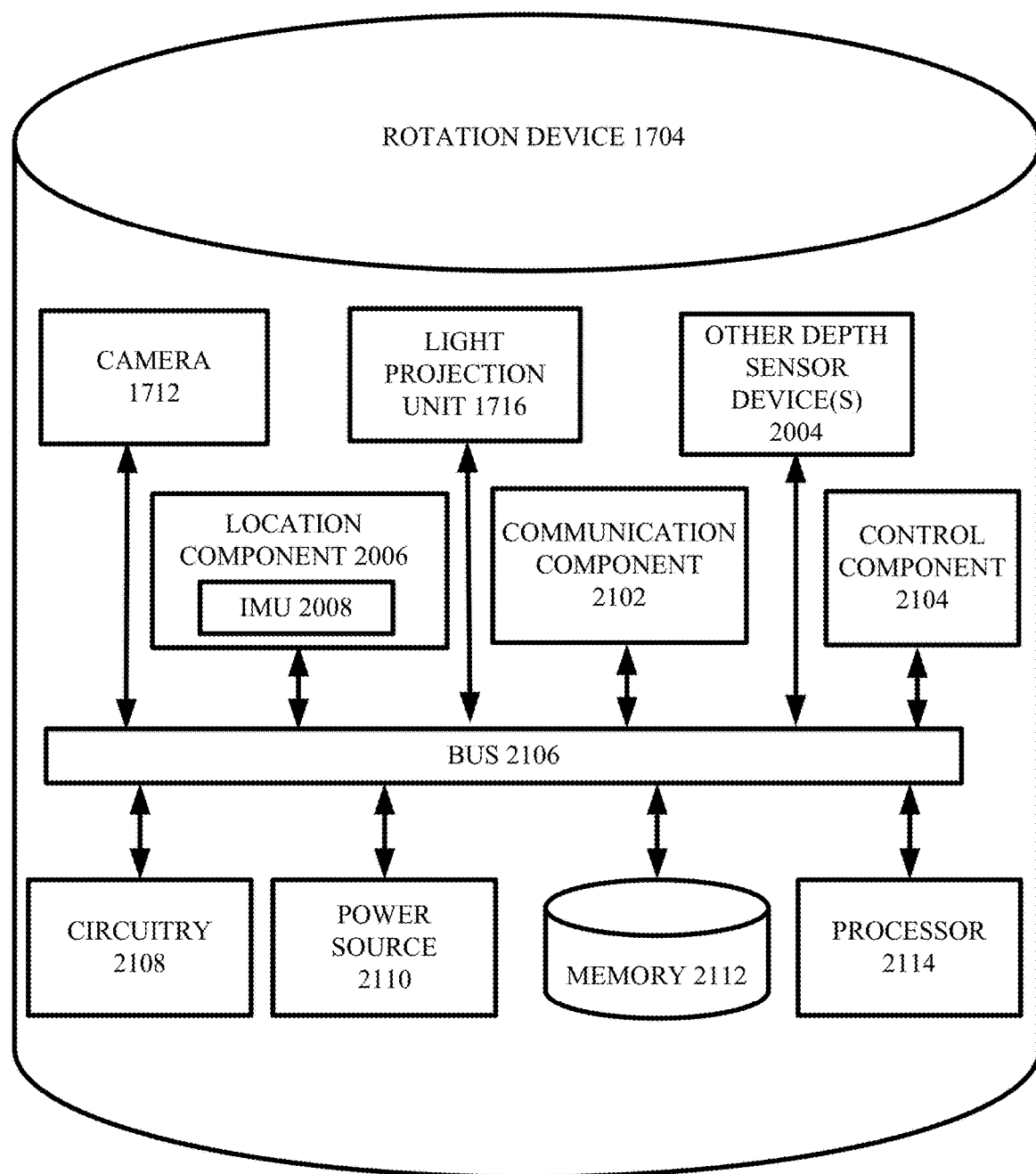
FIG. 21 presents a schematic block diagram of an example rotation device of a 2D/3D panoramic capture device assembly in accordance with various aspects and embodiments described herein.

FIG. 21 presents a schematic block diagram of example rotation device 1704 in accordance with various aspects and embodiments described herein. Repetitive description of like elements employed in respective embodiments is omitted for sake of brevity.

With reference to FIGS. 1, 17, 18, 19, 20, and 21, in some embodiments, rotation device 1704 can include at least one camera 1712 provided on and/or within a housing of the rotation device. For example, the camera 1712 can be provided on a horizontal rotatable mount 1710 of the housing and configured to capture 2D images and/or video. The rotation device 1704 can further include a light projection unit 1716 configured to emit one or more light or laser beams, a light pattern, or the like to provide for active or assisted stereo based depth derivation (e.g. via stereo depth derivation component 512) from images captured via camera 1712 and/or camera 1708 of capture device 1702 during light projection by the light projection unit. In one embodiment, the light projection unit 1716 can be provided on a vertical rotatable mount 1714 of the rotation device 1704. In another embodiment, the light projection unit 1716 can be provided on the horizontal rotatable mount 1710 of the rotation device 1704.

In some or more embodiments, the rotation device 1704 can further include one or more other depth sensor devices 2004 and location component 2006. For example, in addition or alternative to including one or more other depth sensor devices 2004 on the capture device 1702, one or more depth sensor devices 2004 can be provided on the rotation device 1704. Similarly, in addition or alternative to providing the location component 2006 and associated IMU 2008 on the capture device 1702, the location component 2006 and associated IMU 2008 can be provided at the rotation device 1704. In some embodiments, the rotation device 1704 can further include a stepper motor, ring encoder or the like to facilitate determining relative capture positions and orientations of the camera 1712, light projection unit 1716 (and/or respective light beams of the light projection unit 1716), the camera 1708 of capture device 1702, and/or capture positions of one or more depth sensor devices 2004 during the capture process at each fixed location of the panoramic capture device assembly 1902.

In various embodiments, the rotation device 1704 can further include communication component 2102 which can provide same or similar features and functionalities as communication component 2010. Repetitive description is omitted for sake of brevity. For example, communication component 2102 can facilitate wired or wireless communication of information and operational commands between the rotation device 1704 and an external device (e.g. user device 106 and/or 3D modeling navigation server device), and/or between the rotation device 1704 and the capture device 1702. For example, the information can include raw or processed 2D image data and/or 3D depth data captured by the capture device 1702 and/or the rotation device 1704. In another example, the information can include location information captured by the location component 2006. In another example, the control commands can include commands regarding rotation of the rotation device 1704 (e.g. including the horizontal rotatable mount 1710 and/or the vertical rotatable mount 1714), capture of 2D and/or 3D data by the rotation device 1704 and/or the capture device 1702, commands associated with processing, storing, or transmitting information, and the like).

The rotation device 1704 can also include control component 2104 which can provide same or similar features and functionalities as control component 2012. Repetitive description is omitted for sake of brevity. For example, control component 2104 can provide for direct or remote control of the operations of rotation device 1704. In some embodiments, the control component 2104 can also be configured to control one of one more operations of the capture device 1702 (e.g. capture of 2D images via camera 1708, storage, processing or communication of information captured by the capture device 1702, etc.).

The capture device 1702 can further include circuitry 2108 and a power source 2110 which can respectively provide similar features and functionality as circuitry 2016 and power source 2018. Repetitive description is omitted for sake of brevity. In addition to the features and functionality described with respect to circuitry 2016, circuitry 2108 can further include one or more motors (e.g. servomotors) and associated circuitry to effectuate rotation of the rotation device 1704, including rotation of the horizontal rotatable mount 1710 and the vertical rotatable mount 1714. The circuitry 2108 can further include hardware associated with the light projection unit 1716. In some embodiment in which the rotation device 1704 is configured to electrically couple to the capture device 1702, the power source 2110 can provide power to the capture device 1702. Alternatively, the rotation device 1704 can receive power from the capture device (e.g. from power source 2018) and the power source 2110 can be omitted.

In some embodiments, the rotation device 1704 can further include memory 2112 configured to store computer executable components and instructions and processor 2114 to facilitate operation of the instructions (e.g. computer executable components and instructions) by the rotation device 1704. The rotation device 1704 can further include a device bus 2106 that couples the various components of the rotation device 1704, including, but not limited to, the cameras 1712, the light projection unit 1716, the one or more other depth sensor devices 2004, the location component 2006, the communication component 2102, the control component 2104, the circuitry 2108, the power source 2110, the memory 2112 and the processor 2114.

Figure 22:
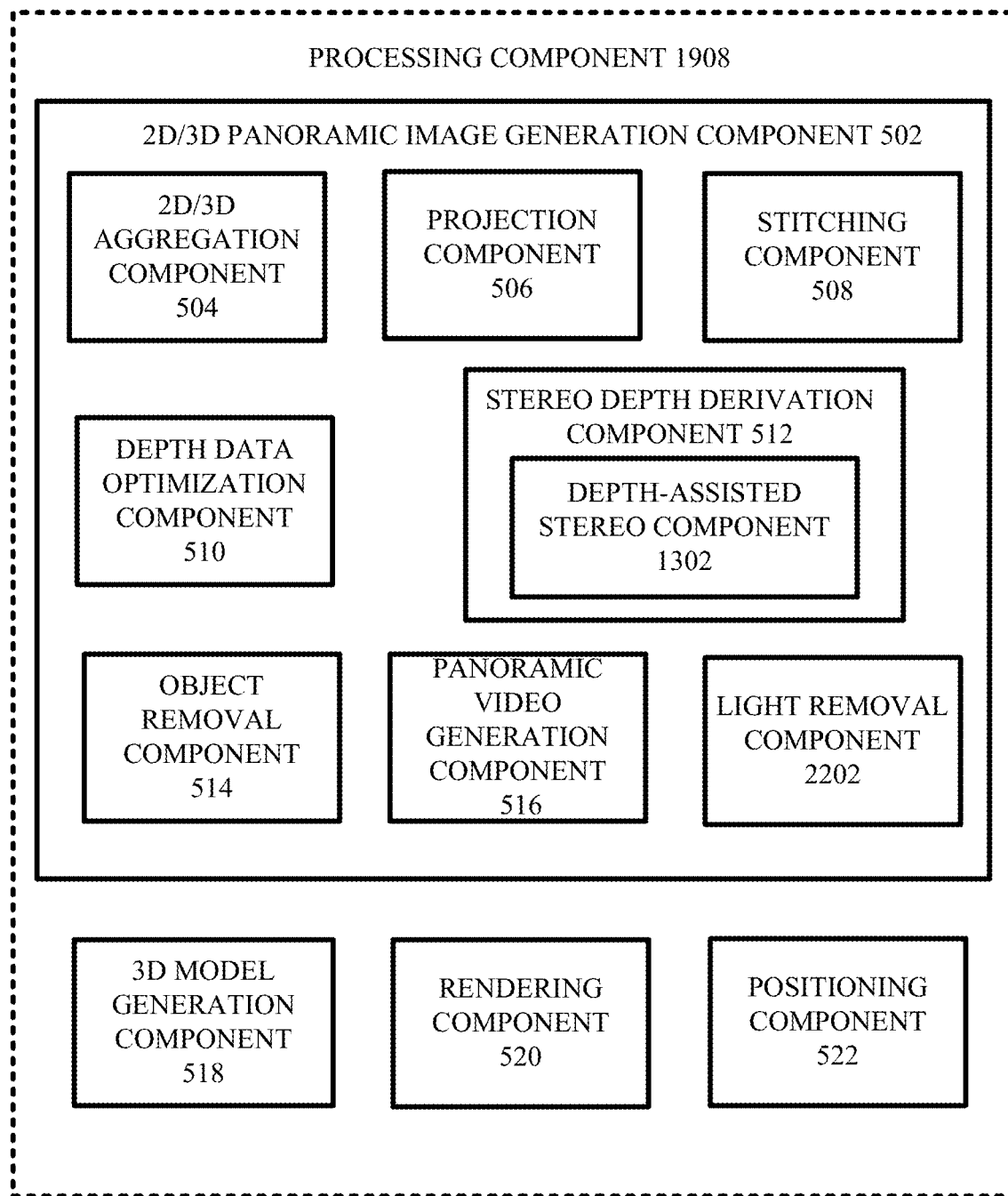
FIG. 22 presents a schematic block diagram of another example processing component that facilitates processing and aligning captured panoramic image and depth data in accordance with various aspects and embodiments described herein.

FIG. 22 presents a schematic block diagram of another example processing component (e.g. processing component 1908) that facilitates processing and aligning captured panoramic image and depth data in accordance with various aspects and embodiments described herein. Processing component 1908 provides same or similar features and functionality as processing component 1222 with the addition of light removal component 2202.

It should be appreciated that the various components of processing component 1908 previously described with reference to processing components 420 and 1222 (e.g. 2D/3D panoramic image generation component 502, 2D/3D aggregation component 504, projection component 506, stitching component 508, depth data optimization component 510, stereo depth derivation component 512, depth-assisted stereo component 1302, object removal component 514, panoramic video generation component 516, 3D model generation component 518, rendering component 520 and positioning component 522) can be configured to perform same or similar processing functions with respect to 2D image data and 3D depth data capture via the other 2D/3D panoramic capture devices and assemblies described herein. For example, stereo depth derivation component 512 can be configured to determine active stereo based depth information based on analysis of stereo images captured by the 2D/3D panoramic capture device assembly using camera 1708, second camera 2002 and/or camera 1712 in association with light projection via light projection unit 1716. In addition, the depth-assisted stereo component 1302 can be configured to employ such active stereo based depth data as the additional depth cues in association with optimizing depth data determined using passive stereo based depth analysis. In addition, the depth data optimization component 510 can employ different types of 3D depth data captured by 2D/3D panoramic capture device assemblies 1700, 1800 and system 1900 using different types of depth sensor devices and depth derivation techniques, including the active stereo depth data, in association with determining a unified interpretation of the depth data. Repetitive description of like elements employed in respective embodiments is omitted for sake of brevity.

In various embodiments of the subject 2D/3D panoramic capture devices and device assemblies, light emitted by a depth sensor device (e.g. a time-of-flight sensor device, a structured light sensor device, and active stereo based depth sensor device/system, etc.) can be intentionally and unintentionally included in captured images. The light removal component 2202 can be configured to remove such light or light patterns/effects included in captured images in association with combining the respective images to generate at 2D panoramic image or 3D panoramic image (e.g. a colored point cloud) by 2D/3D panoramic image generation component 502. For example, the light removal component 2202 can mask out pixels in captured 2D images including light points, patterns, effects, specs, etc. These masked out pixels can be filled with color from nearby pixels and/or pixels from overlapping images.

Figure 23:
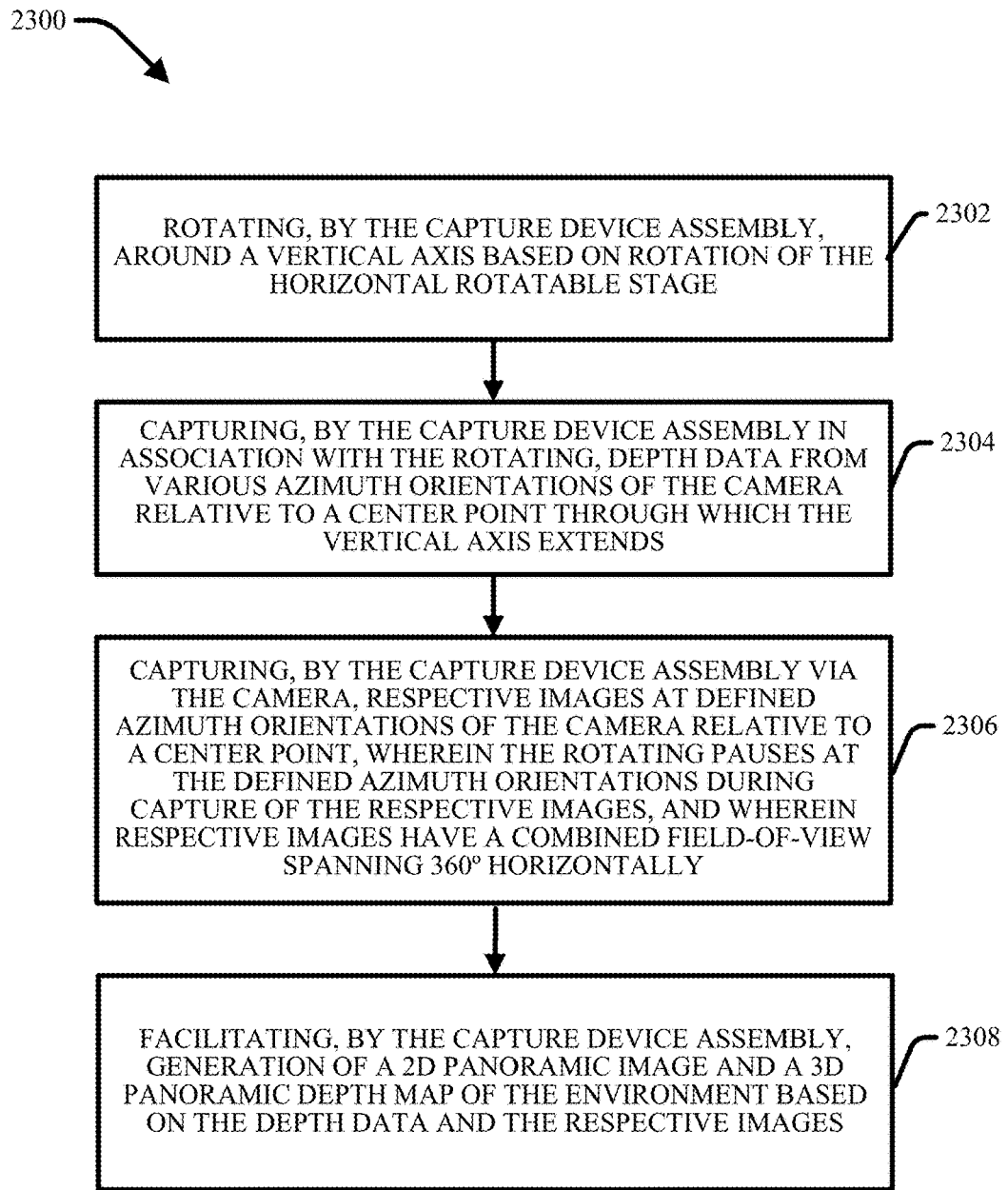
FIG. 23 provides a flow diagram of another example method for generating 2D and 3D panoramic images in accordance with various aspects and embodiments described herein.

FIG. 23 provides a flow diagram of another example method 2300 for generating 2D and 3D panoramic images in accordance with various aspects and embodiments described herein. In particular, method 2300 provides a method for capturing panoramic image data and depth data by a capture device assembly (e.g. 2D/3D panoramic capture device assembly 1700, 1800 and system 1900) comprising a horizontal rotatable stage having a camera mounted thereon. Repetitive description of like elements employed in respective embodiments is omitted for sake of brevity.

At 2303, the capture device assembly rotates around a vertical axis based on rotation of the horizontal rotatable stage. At 2304, the capture device assembly captures, in association with the rotating, depth data from various azimuth orientations of the camera relative to a center point through which the vertical axis extends (e.g. using an active structured light or stereo system comprising the light projection unit 1716 and at least one of camera 1708, camera 1712, and second camera 2002). For example, a camera of the capture device assembly can continuously capture images (e.g. at a high frame rate) during rotation thereof while a light projection unit projects light that is captured in the captured images. Depth data can be extracted from the images based on relative positions of light patterns or points appearing in the images, the capture position of the images and the known positions of the light beams. At 2306, the capture device assembly captures, via the camera (e.g. camera 1708), respective images at defined azimuth orientations of the camera relative to a center point, wherein the rotating pauses at the defined azimuth orientations during capture of the respective images, and wherein respective images have a combined field-of-view spanning up to 360° horizontally. At 2308, the capture device assembly facilitates generation of a 2D panoramic image and a 3D panoramic depth map of the environment based on the depth data and the respective images.

Figure 24:
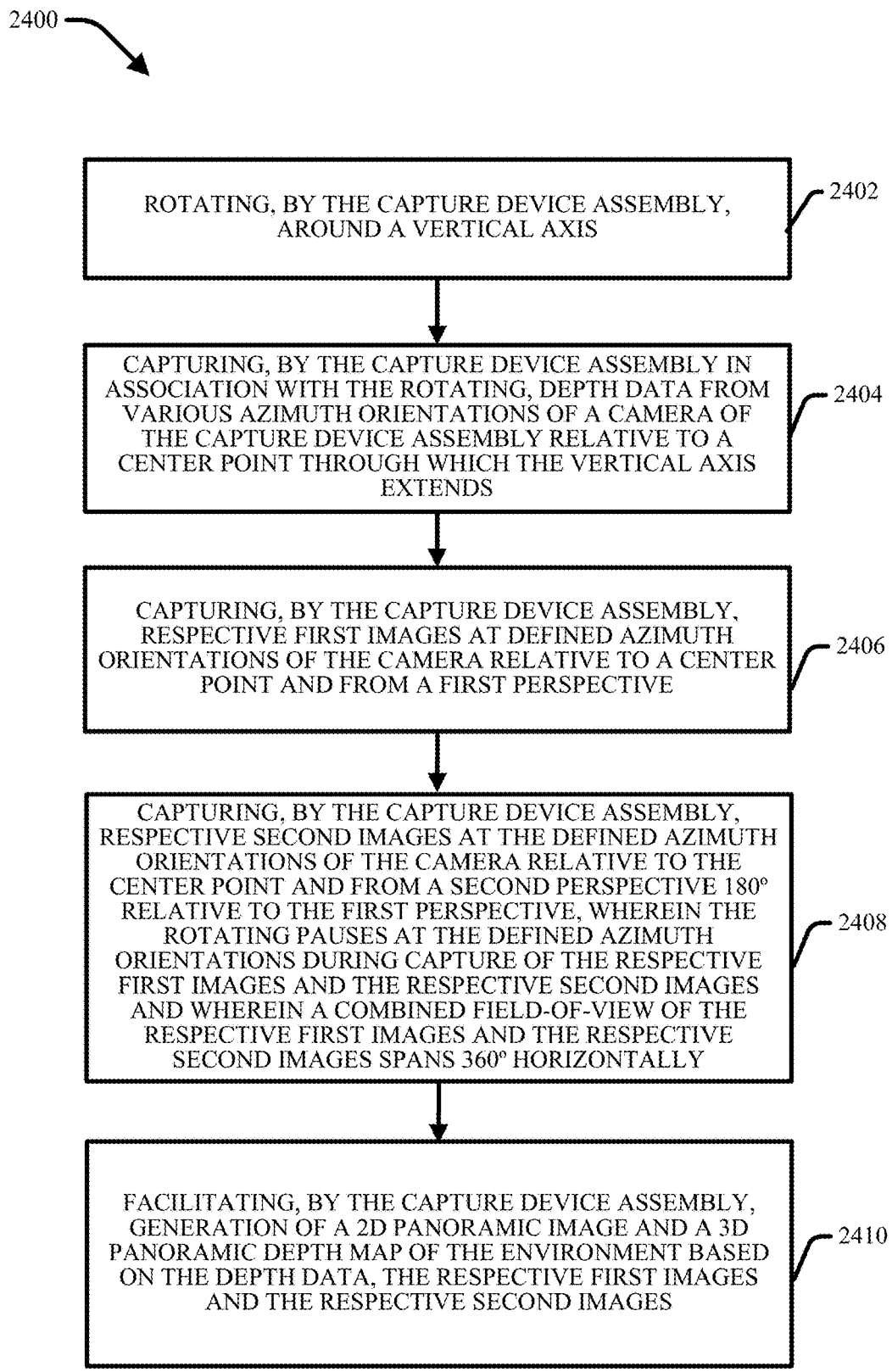
FIG. 24 provides a flow diagram of another example method for generating 2D and 3D panoramic images in accordance with various aspects and embodiments described herein.

FIG. 24 provides a flow diagram of another example method 2400 for generating 2D and 3D panoramic images in accordance with various aspects and embodiments described herein. In particular, method 2400 provides a method for capturing panoramic image data and depth data by a capture device assembly (e.g. 2D/3D panoramic capture device assembly 1700, 1800 and system 1900). Repetitive description of like elements employed in respective embodiments is omitted for sake of brevity.

At 2402, the capture device assembly rotates around a vertical axis (e.g. via horizontal rotatable mount 1710). At 2404, the capture device assembly captures, in association with the rotating, depth data from various azimuth orientations of a camera of the capture device assembly relative to a center point through which the vertical axis extends. At 2406, the capture device assembly captures respective first images at defined azimuth orientations of the camera relative to a center point and from a first perspective. For example, the capture device assembly can capture images from camera 1708 when having a forward facing orientation. At 2408, the capture device assembly captures respective second images at the defined azimuth orientations of the camera relative to the center point and from a second perspective 180° relative to the first perspective, wherein the rotating pauses at the defined azimuth orientations during capture of the respective first images and the respective second images and wherein a combined field-of-view of the respective first images and the respective second images spans up to 360° horizontally. For example, in one implementation, the capture device assembly can capture second images from the camera 1708 following a 180° flip of the camera about a horizontal x axis (e.g. via rotation of the vertical rotatable mount 1714) during a second 360° rotation of the capture device assembly about the vertical axis. In another implementation, the capture device assembly can capture second images from a second camera 2002 that is opposite camera 1708 during a single 360° rotation of the capture device assembly about the vertical axis. At 2410, the capture device assembly generates a 2D panoramic image and a 3D panoramic depth map of the environment based on the depth data, the respective first images and the respective second images.

Example Operating Environments

Figure 25:
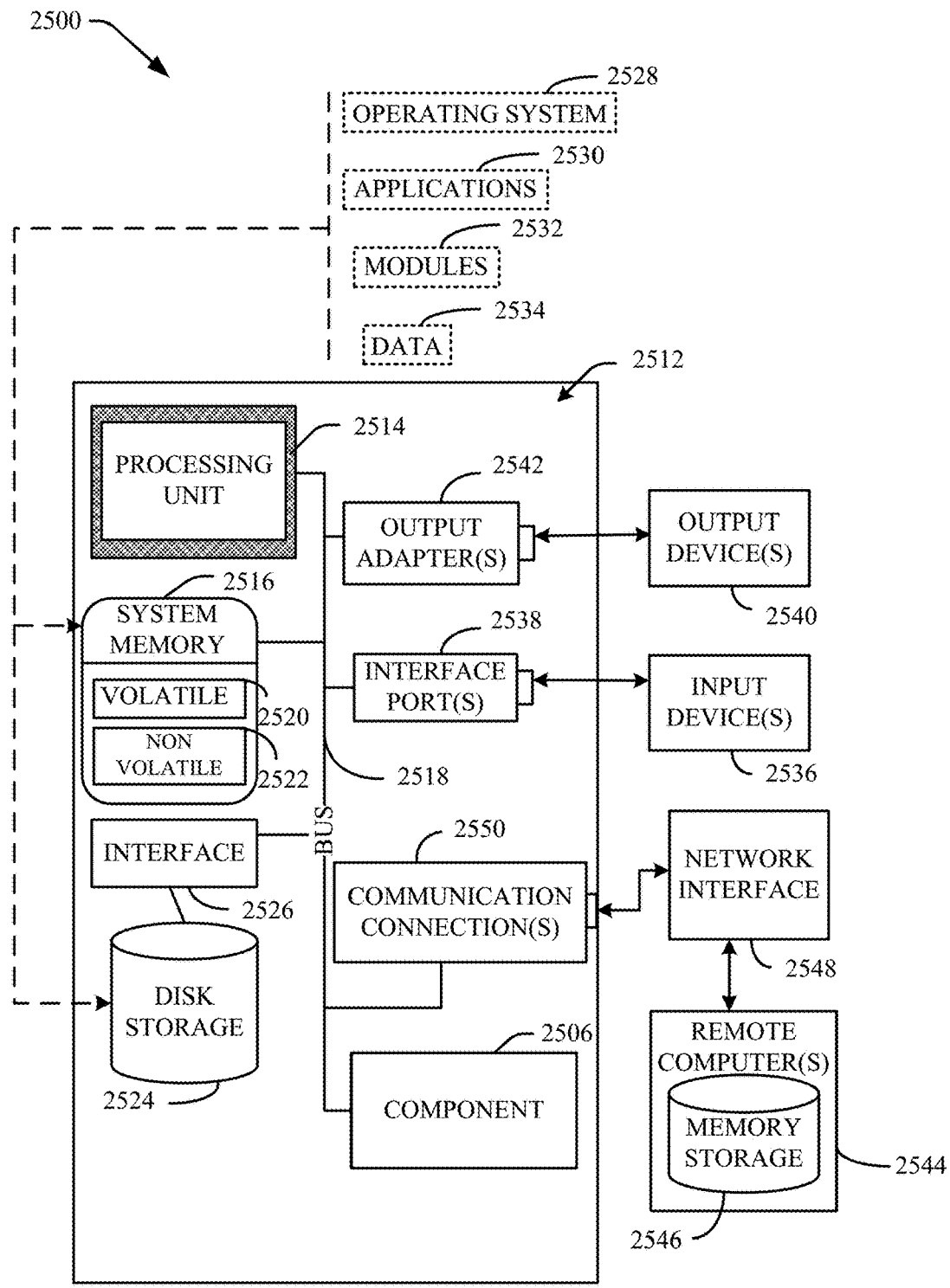
FIG. 25 is a schematic block diagram illustrating a suitable operating environment in accordance with various aspects and embodiments.
Figure 26:
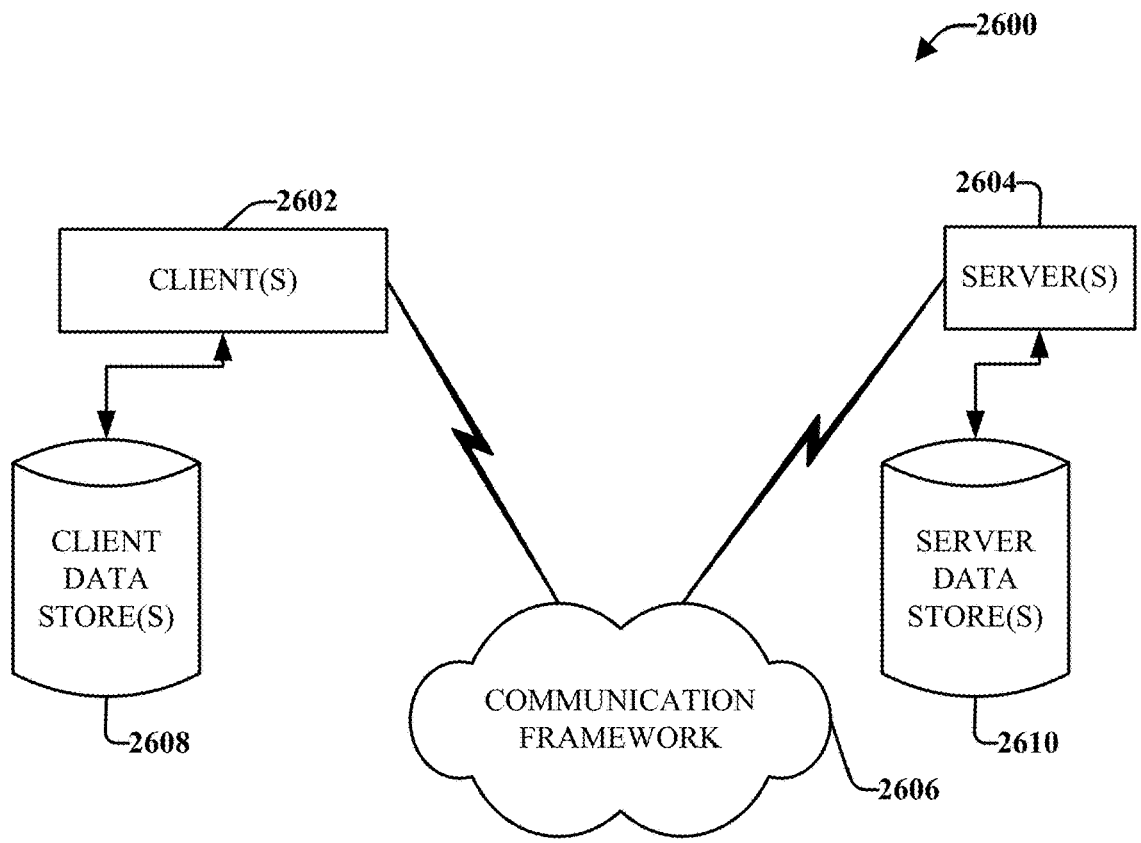
FIG. 26 is a schematic block diagram of a sample-computing environment in accordance with various aspects and embodiments.

In order to provide a context for the various aspects of the disclosed subject matter, FIGS. 25 and 26 as well as the following discussion are intended to provide a brief, general description of a suitable environment in which the various aspects of the disclosed subject matter may be implemented.

With reference to FIG. 25, a suitable environment 2500 for implementing various aspects of this disclosure includes a computer 2512. The computer 2512 includes a processing unit 2514, a system memory 2516, and a system bus 2518. The system bus 2518 couples system components including, but not limited to, the system memory 2516 to the processing unit 2514. The processing unit 2514 can be any of various available processors. Dual microprocessors and other multiprocessor architectures also can be employed as the processing unit 2514.

The system bus 2518 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

The system memory 2516 includes volatile memory 2520 and nonvolatile memory 2522. The basic input/output system (BIOS), containing the basic routines to transfer information between elements within the computer 2512, such as during start-up, is stored in nonvolatile memory 2522. By way of illustration, and not limitation, nonvolatile memory 2522 can include read only memory (ROM), programmable ROM (PROM), electrically programmable ROM (EPROM), electrically erasable programmable ROM (EEPROM), flash memory, or nonvolatile random access memory (RAM) (e.g. ferroelectric RAM (FeRAM). Volatile memory 2520 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM.

Computer 2512 also includes removable/non-removable, volatile/non-volatile computer storage media. FIG. 25 illustrates, for example, a disk storage 2524. Disk storage 2524 includes, but is not limited to, devices like a magnetic disk drive, floppy disk drive, tape drive, Jaz drive, Zip drive, LS-100 drive, flash memory card, or memory stick. The disk storage 2524 also can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 2524 to the system bus 2518, a removable or non-removable interface is typically used, such as interface 2526.

FIG. 25 also depicts software that acts as an intermediary between users and the basic computer resources described in the suitable operating environment 2500. Such software includes, for example, an operating system 2528. Operating system 2528, which can be stored on disk storage 2524, acts to control and allocate resources of the computer system 2512. System applications 2530 take advantage of the management of resources by operating system 2528 through program modules 2532 and program data 2534, e.g. stored either in system memory 2516 or on disk storage 2524. It is to be appreciated that this disclosure can be implemented with various operating systems or combinations of operating systems.

A user enters commands or information into the computer 2512 through input device(s) 2536. Input devices 2536 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 2514 through the system bus 2518 via interface port(s) 2538. Interface port(s) 2538 include, for example, a serial port, a parallel port, a game port, and a universal serial bus (USB). Output device(s) 2540 use some of the same type of ports as input device(s) 2536. Thus, for example, a USB port may be used to provide input to computer 2512, and to output information from computer 2512 to an output device 2540. Output adapter 2542 is provided to illustrate that there are some output devices 2540 like monitors, speakers, and printers, among other output devices 2540, which require special adapters. The output adapters 2542 include, by way of illustration and not limitation, video and sound cards that provide a means of connection between the output device 2540 and the system bus 2518. It should be noted that other devices and/or systems of devices provide both input and output capabilities such as remote computer(s) 2544.

Computer 2512 can operate in a networked environment using logical connections to one or more remote computers, such as remote computer(s) 2544. The remote computer(s) 2544 can be a personal computer, a server, a router, a network PC, a workstation, a microprocessor based appliance, a peer device or other common network node and the like, and typically includes many or all of the elements described relative to computer 2512. For purposes of brevity, only a memory storage device 2546 is illustrated with remote computer(s) 2544. Remote computer(s) 2544 is logically connected to computer 2512 through a network interface 2548 and then physically connected via communication connection 2550. Network interface 2548 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 2550 refers to the hardware/software employed to connect the network interface 2548 to the bus 2518. While communication connection 2550 is shown for illustrative clarity inside computer 2512, it can also be external to computer 2512. The hardware/software necessary for connection to the network interface 2548 includes, for exemplary purposes only, internal and external technologies such as, modems including regular telephone grade modems, cable modems and DSL modems, ISDN adapters, and Ethernet cards.

It is to be appreciated that the computer 2512 can be used in connection with implementing one or more of the systems, components and/or methodologies shown and described in connection with FIGS. 1-24. In accordance with various aspects and implementations, the computer 2512 can be used to facilitate determining and/or executing commands associated with capturing 2D image data and 3D depth data by the 2D/3D panoramic capture devices (e.g. panoramic capture devices 102, 200, 300, 400, 900, and 1200) and the 2D/3D panoramic capture device assemblies (e.g. panoramic capture device assemblies 1700, 1800 and system 1900). Computer 2512 can further provided for various processing of 2D image data and 3D depth data described in association with primary processing component 104, secondary processing component 110, tertiary processing component 114, processing component 420, processing component 1222 and processing component 1908. Computer 2512 can further provide for rendering and/or displaying 2D/3D image data and video data generated by the various 2D/3D panoramic capture devices, apparatus and systems described herein. Computer 2512 includes component 2506 which can embody one or more of the various components described in association with the various systems, apparatuses, assemblies, and computer readable mediums described herein.

FIG. 26 is a schematic block diagram of a sample-computing environment 2600 with which the subject matter of this disclosure can interact. The system 2600 includes one or more client(s) 2610. The client(s) 2610 can be hardware and/or software (e.g. threads, processes, computing devices). The system 2600 also includes one or more server(s) 2630. Thus, system 2600 can correspond to a two-tier client server model or a multi-tier model (e.g. client, middle tier server, data server), amongst other models. The server(s) 2630 can also be hardware and/or software (e.g. threads, processes, computing devices). The servers 2630 can house threads to perform transformations by employing this disclosure, for example. One possible communication between a client 2610 and a server 2630 may be in the form of a data packet transmitted between two or more computer processes.

The system 2600 includes a communication framework 2650 that can be employed to facilitate communications between the client(s) 2610 and the server(s) 2630. The client(s) 2610 are operatively connected to one or more client data store(s) 2620 that can be employed to store information local to the client(s) 2610. Similarly, the server(s) 2630 are operatively connected to one or more server data store(s) 2640 that can be employed to store information local to the servers 2630.

It is to be noted that aspects or features of this disclosure can be exploited in substantially any wireless telecommunication or radio technology, e.g. Wi-Fi; Bluetooth; Worldwide Interoperability for Microwave Access (WiMAX); Enhanced General Packet Radio Service (Enhanced GPRS); Third Generation Partnership Project (3GPP) Long Term Evolution (LTE); Third Generation Partnership Project 2 (3GPP2) Ultra Mobile Broadband (UMB); 3GPP Universal Mobile Telecommunication System (UMTS); High Speed Packet Access (HSPA); High Speed Downlink Packet Access (HSDPA); High Speed Uplink Packet Access (HSUPA); GSM (Global System for Mobile Communications) EDGE (Enhanced Data Rates for GSM Evolution) Radio Access Network (GERAN); UMTS Terrestrial Radio Access Network (UTRAN); LTE Advanced (LTE-A); etc. Additionally, some or all of the aspects described herein can be exploited in legacy telecommunication technologies, e.g. GSM. In addition, mobile as well non-mobile networks (e.g. the Internet, data service network such as internet protocol television (IPTV), etc.) can exploit aspects or features described herein.

While the subject matter has been described above in the general context of computer-executable instructions of a computer program that runs on a computer and/or computers, those skilled in the art will recognize that this disclosure also can or may be implemented in combination with other program modules. Generally, program modules include routines, programs, components, data structures, etc. that perform particular tasks and/or implement particular abstract data types. Moreover, those skilled in the art will appreciate that the inventive methods may be practiced with other computer system configurations, including single-processor or multiprocessor computer systems, mini-computing devices, mainframe computers, as well as personal computers, hand-held computing devices (e.g. PDA, phone), microprocessor-based or programmable consumer or industrial electronics, and the like. The illustrated aspects may also be practiced in distributed computing environments where tasks are performed by remote processing devices that are linked through a communications network. However, some, if not all aspects of this disclosure can be practiced on stand-alone computers. In a distributed computing environment, program modules may be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

In another example, respective components can execute from various computer readable media having various data structures stored thereon. The components may communicate via local and/or remote processes such as in accordance with a signal having one or more data packets (e.g. data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g. within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

Various aspects or features described herein can be implemented as a method, apparatus, system, or article of manufacture using standard programming or engineering techniques. In addition, various aspects or features disclosed in this disclosure can be realized through program modules that implement at least one or more of the methods disclosed herein, the program modules being stored in a memory and executed by at least a processor. Other combinations of hardware and software or hardware and firmware can enable or implement aspects described herein, including a disclosed method(s). The term "article of manufacture" as used herein can encompass a computer program accessible from any computer-readable device, carrier, or storage media. For example, computer readable storage media can include but are not limited to magnetic storage devices (e.g. hard disk, floppy disk, magnetic strips . . . ), optical discs (e.g. compact disc (CD), digital versatile disc (DVD), blu-ray disc (BD) . . . ), smart cards, and flash memory devices (e.g. card, stick, key drive . . . ), or the like.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor may also be implemented as a combination of computing processing units.

In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory.

By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g. ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or methods herein are intended to include, without being limited to including, these and any other suitable types of memory.

It is to be appreciated and understood that components, as described with regard to a particular system or method, can include the same or similar functionality as respective components (e.g. respectively named components or similarly named components) as described with regard to other systems or methods disclosed herein.

What has been described above includes examples of systems and methods that provide advantages of this disclosure. It is, of course, not possible to describe every conceivable combination of components or methods for purposes of describing this disclosure, but one of ordinary skill in the art may recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A device comprising:
    a housing;
    a plurality of cameras configured to capture two-dimensional images, wherein each of the cameras is arranged at different positions in the housing and have different azimuth orientations relative to a center point such that the plurality of cameras have a collective field-of-view spanning up to 360° horizontally;
    a plurality of depth detection components configured to capture depth data, wherein each of the depth detection components is arranged at different positions in the housing and have different azimuth orientations relative to the center point such that the plurality of depth detection components have a collective field-of-view spanning up to 360° horizontally, wherein the plurality of cameras and depth detection components capture two-dimensional images and the depth data substantially simultaneously, wherein the collective field-of-view of the plurality of cameras has a fixed relationship relative to the collective field-of-view of the plurality of depth detection components; and
    a projection component in the housing, the projection component configured to project 2D image data and 3D depth data to a common spatial 3D coordinate space based on known capture positions and orientations of each of the plurality of cameras and each of the plurality of depth detection components to facilitate associating 3D coordinates with respective visual features included in the 2D image data relative to the common spatial 3D coordinate space.

2. The device of claim 1, wherein the plurality of cameras respectively comprises fisheye lenses.

3. The device of claim 1, wherein pairs of the plurality of cameras located adjacent to one another have partially overlapping fields-of-view.

4. The device of claim 1, wherein pairs of the plurality of cameras with partially overlapping fields-of-view are configured to capture pairs of stereo images.

5. The device of claim 1, wherein the plurality of cameras are configured to capture video.

6. The device of claim 1, wherein the plurality of cameras includes four cameras and wherein the plurality of depth detection components includes eight depth detection components.

7. The device of claim 1, wherein the plurality of depth detection components respectively comprises one or more time-of-flight depth sensor devices.

8. The device of claim 1, wherein the plurality of depth detection components respectively comprise one or more of: a structured light sensor device, a light imaging detection and ranging (LiDAR) device, or an active stereo depth detection device.

9. The device of claim 1, wherein the plurality of depth detection components respectively comprises two or more of: a time-of-flight sensor device, a structured light sensor device, a light imaging detection and ranging device (LiDAR) device, or an active stereo depth detection device.

10. The device of claim 1, wherein the plurality of depth detection components respectively comprises two or more photodetectors configured to share a single light emitter.

11. The device of claim 1, further comprising:
a memory that stores executable components; and
a processor that executes the executable components stored in the memory, wherein the executable components comprise:
a stitching component configured to generate a panoramic two-dimensional image based on the two-dimensional images and the depth data.

12. The device of claim 11, wherein the stitching component is further configured to generate a panoramic three-dimensional image based on the two-dimensional images and the depth data.

13. The device of claim 11, wherein the of video, and wherein the executable components further comprise:
a panoramic video generation component configured to generate a panoramic two-dimensional video based on the two-dimensional images and the depth data.

14. The device of claim 11, wherein the plurality of depth detection components are further configured to capture depth video data and the depth data comprises the depth video data captured by the plurality of depth detection components over a defined period of time, and wherein the executable components further comprise:
a panoramic video generation component configured to generate a panoramic three-dimensional video based on the two-dimensional images and the depth data.

15. The device of claim 11, wherein the executable components further comprise:
an aggregation component configured to aggregate image data included in the two-dimensional images to generate aggregated images; and
an object removal component configured to remove an object appearing in a portion of the aggregated images, wherein the stitching component is configured to generate the panoramic two-dimensional video without the object.

16. The device of claim 11, wherein the plurality of depth detection components respectively comprises different types of depth sensor devices and wherein the depth data comprises sets of different types of depth data, wherein the executable components further comprise:
a depth data optimization component configured to combine subsets of the sets of different types of depth data associated with a same three-dimensional volume to determine spatial positions for points included in the same three-dimensional volume.

17. The device of claim 16, wherein pairs of the plurality of cameras having partially overlapping fields-of-view are configured to capture pairs of stereo images, wherein the two-dimensional images comprise pairs of stereo images, and wherein one of the sets of different types of depth data comprises stereo depth data derived from the pairs of stereo images using a stereo based depth derivation technique.

18. The device of claim 11, wherein the two-dimensional images and the depth data comprise different sets of two-dimensional images and associated depth data respectively captured at different locations of the device within an environment, and wherein the device further comprises:
a three-dimensional model generation component configured to generate a three-dimensional model of the environment based on the different sets of two-dimensional images and associated depth data.

19. The device of claim 1, further comprising:
a communication component configured to send the two-dimensional images and the depth data to an external device in response to capture of the two-dimensional images and the depth data, and wherein the external device is configured to generate and render a panoramic two-dimensional image based on the two-dimensional images and the depth data.

20. The device of claim 1, further comprising:
a communication component configured to send the two-dimensional images and the depth data to an external device in response to capture of the two-dimensional images and the depth data, and wherein the external device is configured to generate and render a three-dimensional model of an environment based on the two-dimensional images, the depth data, and additional two-dimensional images and associated depth data, wherein the two-dimensional images, the depth data and the additional two-dimensional images and associated depth data were captured at different locations within the environment.

21. A method comprising:
capturing, by a capture device, two-dimensional images of an environment from a fixed location of the capture device using two or more cameras within the capture device, the two or more cameras having a combined field-of-view spanning up to 360° of the environment from the fixed location;
capturing, by the capture device, sets of depth data of the environment from the fixed location of the capture device using two or more depth sensor devices within the capture device, the two or more depth sensor devices having the combined field-of-view spanning up to 360° of the environment, wherein capturing the two-dimensional images and the set of depth data are done substantially simultaneously, wherein the combined field-of-view of the plurality of cameras has a fixed relationship relative to the combined field-of-view of the plurality of depth detection components; and
projecting, by the capture device, 2D image data and 3D depth data to a common spatial 3D coordinate space based on known capture positions and orientations of each of the two or more of cameras and each of the two or more of depth sensor devices to facilitate associating 3D coordinates with respective visual features included in the 2D image data relative to the common spatial 3D coordinate space.

22. The method of claim 21, further comprising:
combining, by the capture device, the two-dimensional images based on the sets of depth data; and
generating, by the capture device, a two-dimensional panoramic image of the environment based on the combining.

23. The method of claim 22, further comprising:
sending, by the capture device, the two-dimensional panoramic image to an external device for rendering in response to capture of the two-dimensional images and the sets of depth data.

24. The method of claim 21, further comprising:
generating, by the capture device, a three-dimensional panoramic image of the environment based on the two-dimensional images and the sets of depth data.

25. The method of claim 24, wherein the three-dimensional panoramic image of the environment comprises a colored panoramic depth map or colored point cloud.

26. The method of claim 24, further comprising:
sending, by the capture device, the three-dimensional panoramic image to an external device for rendering in response to capture of the two-dimensional images and the sets of depth data.

27. The method of claim 21, further comprising:
sending, by the capture device, the two-dimensional images and the sets of depth data to an external device in response to capture of the two-dimensional images and the sets of depth data, wherein the external device is configured to generate and render a panoramic two-dimensional image of the environment based on the two-dimensional images and the sets of depth data.

28. The method of claim 21, further comprising:
sending, by the capture device, the two-dimensional images and the sets of depth data to an external device in response to capture of the two-dimensional images and the sets of depth data, and wherein the external device is configured to generate and render a three-dimensional model of the environment based on the two-dimensional images and the depth data and additional two-dimensional images and associated depth data captured at additional locations within the environment.

29. A non-transitory machine-readable storage medium, comprising executable instructions that, when executed by a processor, facilitate performance of operations, comprising:
capturing, by a capture device, two-dimensional images of an environment from a fixed location of the capture device using two or more cameras within the capture device, the two or more cameras having a combined field-of-view spanning up to 360° of the environment from the fixed location;
capturing, by the capture device, sets of depth data of the environment from the fixed location of the capture device using two or more depth sensor devices within the capture device, the two or more depth sensor devices having the combined field-of-view spanning up to 360° of the environment, wherein capturing the two-dimensional images and set of depth data are done substantially simultaneously, wherein the combined field-of-view of the plurality of cameras has a fixed relationship relative to the combined field-of-view of the plurality of depth detection components; and projecting, by the capture device, 2D image data and 3D depth data to a common spatial 3D coordinate space based on known capture positions and orientations of each of the two or more of cameras and each of the two or more of depth sensor devices to facilitate associating 3D coordinates with respective visual features included in the 2D image data relative to the common spatial 3D coordinate space.

30. The non-transitory machine-readable storage medium of claim 29, wherein the operations further comprise:
combining the two-dimensional images based on the sets of depth data; generating a two-dimensional panoramic image of the environment based on the combining; and
sending the two-dimensional panoramic image to an external device for rendering in response to capture of the two-dimensional images and the sets of depth data.

31. The non-transitory machine-readable storage medium of claim 30, wherein the operations further comprise:
sending the two-dimensional panoramic image to an external device for rendering in response to capture of the two-dimensional images and the sets of depth data.

32. The non-transitory machine-readable storage medium of claim 29, wherein the operations further comprise:
generating a three-dimensional panoramic image of the environment based on the two-dimensional images and the sets of depth data.

33. The non-transitory machine-readable storage medium of claim 32, wherein the operations further comprise:
sending, by the capture device, the three-dimensional panoramic image to an external device for rendering in response to capture of the two-dimensional images and the sets of depth data.

34. The non-transitory machine-readable storage medium of claim 29, wherein the operations further comprise:
sending the two-dimensional images and the sets of depth data to an external device in response to capture of the two-dimensional images and the sets of depth data, wherein the external device is configured to generate and render a panoramic two-dimensional image of the environment based on the two-dimensional images and the sets of depth data.

35. The non-transitory machine-readable storage medium of claim 29, wherein the operations further comprise:
sending, by the capture device, the two-dimensional images and the sets of depth data to an external device in response to capture of the two-dimensional images and the sets of depth data, and wherein the external device is configured to generate and render a three-dimensional model of the environment based on the two-dimensional images and the depth data and additional two-dimensional images and associated depth data captured at additional locations within the environment.

* * * * *